(12) United States Patent
Bhushan et al.

(10) Patent No.: US 12,112,434 B1
(45) Date of Patent: *Oct. 8, 2024

(54) MESH UPDATES IN AN EXTENDED REALITY ENVIRONMENT

(71) Applicant: SPLUNK INC., San Francisco, CA (US)

(72) Inventors: Devin Bhushan, San Jose, CA (US); Seunghee Han, San Jose, CA (US); Caelin Thomas Jackson-King, Santa Clara, CA (US); Jamie Kuppel, Sunnyvale, CA (US); Stanislav Yazhenskikh, Santa Clara, CA (US); Jim Jiaming Zhu, Scarborough (CA)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,416

(22) Filed: Dec. 27, 2022

Related U.S. Application Data

(63) Continuation of application No. 17/086,297, filed on Oct. 30, 2020, now Pat. No. 11,544,904.

(60) Provisional application No. 63/093,143, filed on Oct. 16, 2020, provisional application No. 63/093,123, filed on Oct. 16, 2020, provisional application No. 63/093,111, filed on Oct. 16, 2020.

(51) Int. Cl.
*G06T 17/20* (2006.01)
*G06F 3/14* (2006.01)

(52) U.S. Cl.
CPC .......... *G06T 17/205* (2013.01); *G06F 3/1454* (2013.01)

(58) Field of Classification Search
None
See application file for complete search history.

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |

(Continued)

FOREIGN PATENT DOCUMENTS

CA 2 294 538 A1 12/1998

OTHER PUBLICATIONS

Non Final Office Action received for U.S. Appl. No. 17/086,321 dated Mar. 1, 2023, 19 pages.

(Continued)

*Primary Examiner* — Aaron M Richer
(74) *Attorney, Agent, or Firm* — Artegis Law Group, LLP

(57) ABSTRACT

Various implementations or examples set forth a method for scanning a three-dimensional (3D) environment. The method includes generating a 3D representation of the 3D environment that includes one or more 3D meshes. The method also includes determining at least a portion of the 3D environment that falls within a current frame captured by the image sensor. The method further includes generating one or more additional 3D meshes representing the at least a portion of the 3D environment and combining the one or more additional 3D meshes with the one or more 3D meshes into an update to the 3D representation of the 3D environment.

20 Claims, 48 Drawing Sheets

(56) References Cited

U.S. PATENT DOCUMENTS

| | | | |
|---|---|---|---|
| 9,286,413 | B1 | 3/2016 | Coates et al. |
| 10,127,258 | B2 | 11/2018 | Lamas et al. |
| 10,282,898 | B1 | 5/2019 | Kuntsevich et al. |
| 2009/0303507 | A1 | 12/2009 | Abeloe |
| 2013/0038633 | A1 | 2/2013 | Maggiore |
| 2013/0314410 | A1 | 11/2013 | Gravois et al. |
| 2016/0148417 | A1 | 5/2016 | Kim et al. |
| 2017/0083572 | A1 | 3/2017 | Tankersley et al. |
| 2017/0243403 | A1 | 8/2017 | Daniels et al. |
| 2017/0344674 | A1 | 11/2017 | McCloskey et al. |
| 2018/0107876 | A1 | 4/2018 | Lee |
| 2018/0136815 | A1 | 5/2018 | Tomizuka et al. |
| 2018/0225880 | A1 | 8/2018 | Yasutake |
| 2018/0322674 | A1 | 11/2018 | Du |
| 2019/0042832 | A1 | 2/2019 | Venshtain |
| 2019/0046276 | A1 | 2/2019 | Inglese et al. |
| 2019/0065027 | A1 | 2/2019 | Hauenstein et al. |
| 2019/0098106 | A1 | 3/2019 | Mungel et al. |
| 2019/0313059 | A1 | 10/2019 | Agarawala et al. |
| 2019/0342541 | A1 | 11/2019 | Bai et al. |
| 2019/0371060 | A1 | 12/2019 | Energin et al. |
| 2019/0394103 | A1 | 12/2019 | Korkin et al. |
| 2020/0005538 | A1 | 1/2020 | Neeter |
| 2020/0043237 | A1 | 2/2020 | Desai et al. |
| 2020/0105013 | A1* | 4/2020 | Chen .................. G06V 40/166 |
| 2020/0133618 | A1 | 4/2020 | Kim |
| 2020/0134911 | A1 | 4/2020 | Van Hoff et al. |
| 2020/0221070 | A1 | 7/2020 | Godar |
| 2020/0329214 | A1 | 10/2020 | Ahn et al. |
| 2020/0342673 | A1 | 10/2020 | Ohr et al. |
| 2020/0349751 | A1 | 11/2020 | Bentovim et al. |
| 2020/0410752 | A1 | 12/2020 | Jiang et al. |
| 2021/0104090 | A1 | 4/2021 | Hur et al. |
| 2021/0142561 | A1 | 5/2021 | Aigerman |
| 2022/0044016 | A1 | 2/2022 | Pan et al. |
| 2022/0237865 | A1* | 7/2022 | Ohashi .................. G06T 17/20 |

OTHER PUBLICATIONS

Notice of Allowance received for U.S. Appl. No. 17/086,321 dated Jun. 16, 2023, 15 pages.
Splunk Enterprise 8.0.0 Overview, available online, retrieved on May 20, 2020 from docs.splunk.com, 17 pages.
Splunk Cloud 8.0.2004 User Manual, available online, retrieved on May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved on May 20, 2020, 6 pages.
Carraso, David, "Exploring Splunk," published by CITO Research, New York, NY, Apr. 2012, 156 pages.
Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.
Dong et al., "Real-Time Re-Textured Geometry Modeling Using Microsoft Hololens", IEEE, Mar. 18-22, 2018, pp. 231-237.
3GPP TR 26.928, "3rd Generation Partnership Project; Technical Specification Group Services and System Aspects; Extended Reality (XR) in 5G (Release 16)", URL:ftp://ftp.3gpp.org/Specs/archive/26_series/26.928/26928-123.zip26.928-123-editor-r2.docx, vol. SA WG4, No. V1.2.3, Feb. 13, 2020, 130 pages.
Notice of Allowance received for U.S. Appl. No. 17/086,318 dated May 22, 2023, 13 pages.
Notice of Allowance received for U.S. Appl. No. 18/088,387 dated May 22, 2023, 25 pages.
Notice of Allowance received for U.S. Appl. No. 17/479,946 dated Jan. 5, 2023, 13 pages.
Notice of Allowance received for U.S. Appl. No. 17/086,318 dated Feb. 1, 2023, 13 pages.
Advisory Action received for U.S. Appl. No. 17/086,321 dated Feb. 6, 2023, 4 pages.
Notice of Allowance received for U.S. Appl. No. 17/086,325 dated Feb. 10, 2023, 14 pages.
Non Final Office Action received for U.S. Appl. No. 18/479,688 dated Jun. 26, 2024, 23 pages.

* cited by examiner

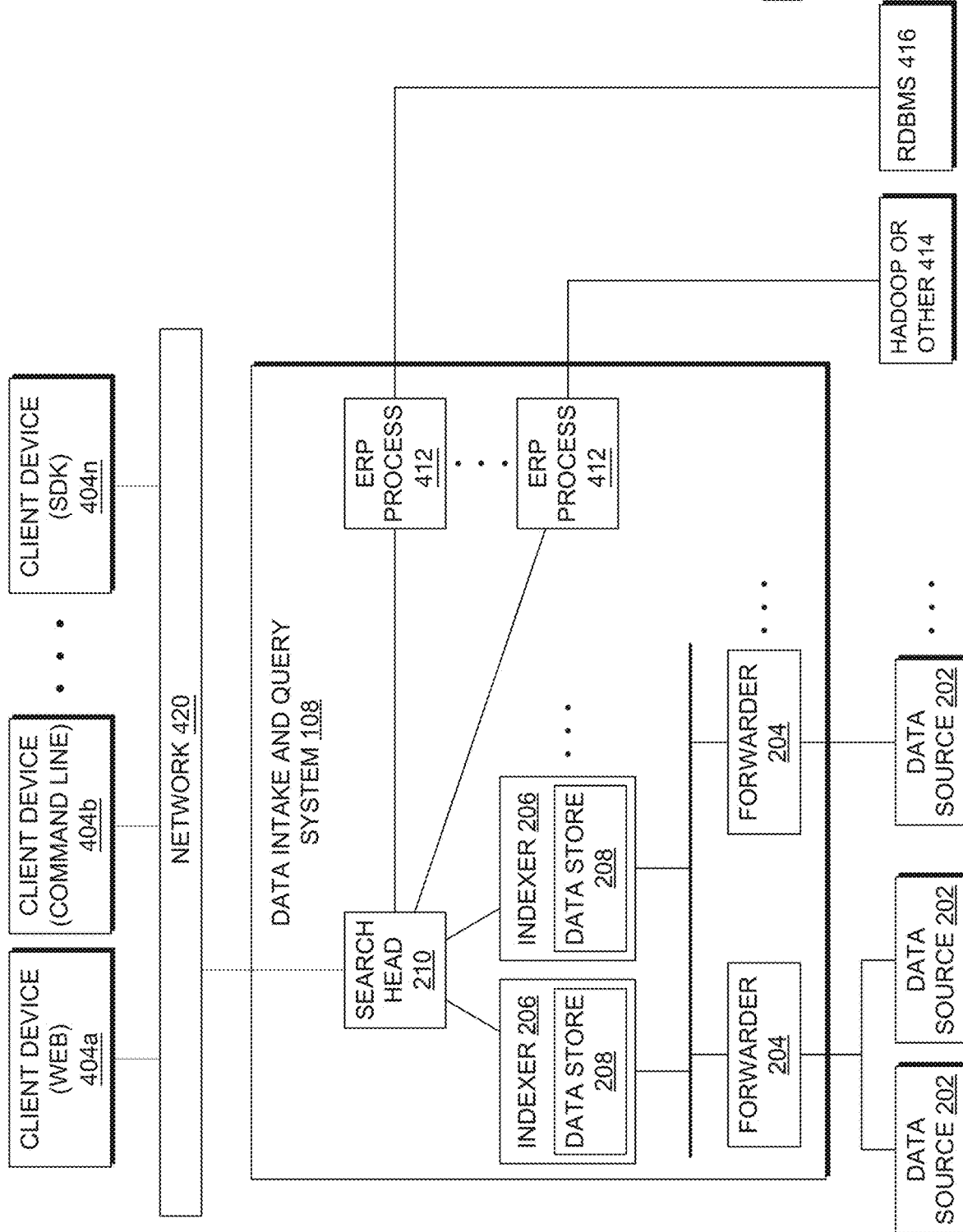

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Row | Time | Host | Source | Source Type | Event |
|---|---|---|---|---|---|
| 55000 | 10/10/2016 1:55 p.m. | www1 | access.log | access_combined | 127.0.0.1 - frank [10/Oct/2016:13:55:36 -0700] "GET /apache.gif HTTP/1.0" 200 2326 0.0947 — 731 |
| 55001 | 10/10/2016 1:56 p.m. | www2 | access.log | access_combined | 127.0.0.2 - bob [10/Oct/2016:13:56:36 -0700] "GET /mickey_mouse.gif HTTP/1.0" 200 2980 0.0899 |
| 55002 | 10/10/2016 1:57 p.m. | www2 | access.log | access_combined | 127.0.0.1 - carlos [10/Oct/2016:13:57:36 -0700] "GET /donald_duck.gif HTTP/1.0" 200 2980 0.0857 — 732 |
| 55003 | 10/10/2016 1:58 p.m. | www2 | error.log | apache_error | [Sunday Oct 10 1:58:33 2016] [error] [client 127.10.1.1.015]: File does not exist: /home/reba/public_html/images/dairy_duck.gif |
| 55004 | 10/10/2016 1:59 p.m. | www1 | access.log | access_combined | 127.0.0.3 - virgil [10/Oct/2016:13:59:36 -0700] "GET /donald_duck.gif HTTP/1.0" 200 2900 0.0887 |
| 55005 | 10/10/2016 2:00 p.m. | www1 | access.log | access_combined | 127.0.0.1 - matt [10/Oct/2016:14:00:36 -0700] "GET /goofy.gif HTTP/1.0" 200 2920 0.0987 — 733 |
| 55006 | 10/10/2016 2:01 p.m. | www2 | error.log | apache_error | [Sunday Oct 10 2:01:33 2016] [error] [client 127.10.1.1.03]: File does not exist: /home/public_html/images/furby.gif |
| 55007 | 10/10/2016 2:02 p.m. | www1 | access.log | access_combined | 127.0.0.1 - jack [10/Oct/2016:14:02:36 -0700] "GET /muppets.gif HTTP/1.0" 200 5500 0.0667 — 734 |

723

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

722

| Event Reference Value | Field Name | Field Value | User ID |
|---|---|---|---|
| 55000 | clientip | 127.0.0.1 | frank |
| 55005 | clientip | 127.0.0.1 | matt |

725

Data Summary

| Hosts (5) | Sources (8) | Sourcetypes (3) | | | ✕ | filter

| Host ◊ | | Count ◊ | Last Update ◊ |
|---|---|---|---|
| mailsv | ▪ ⌄ | 9,829 | 4/29/14 1:32:47.000 PM |
| vendor_sales | ▪ ⌄ | 30,244 | 4/29/14 1:32:46.000 PM |
| www1 | ▪ ⌄ | 24,221 | 4/29/14 1:32:44.000 PM |
| www2 | ▪ ⌄ | 22,595 | 4/29/14 1:32:47.000 PM |
| www3 | ▪ ⌄ | 22,975 | 4/29/14 1:32:45.000 PM |

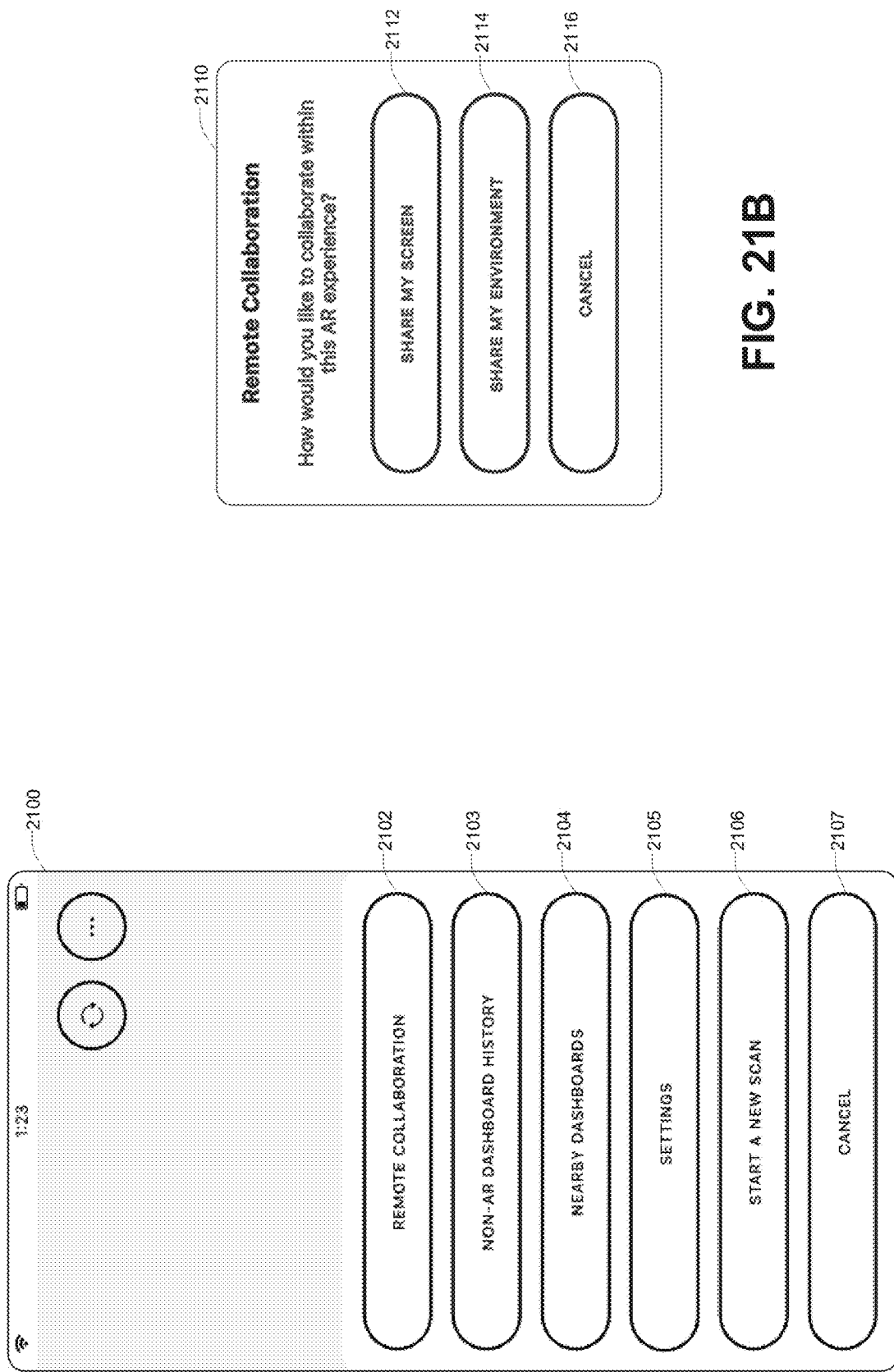

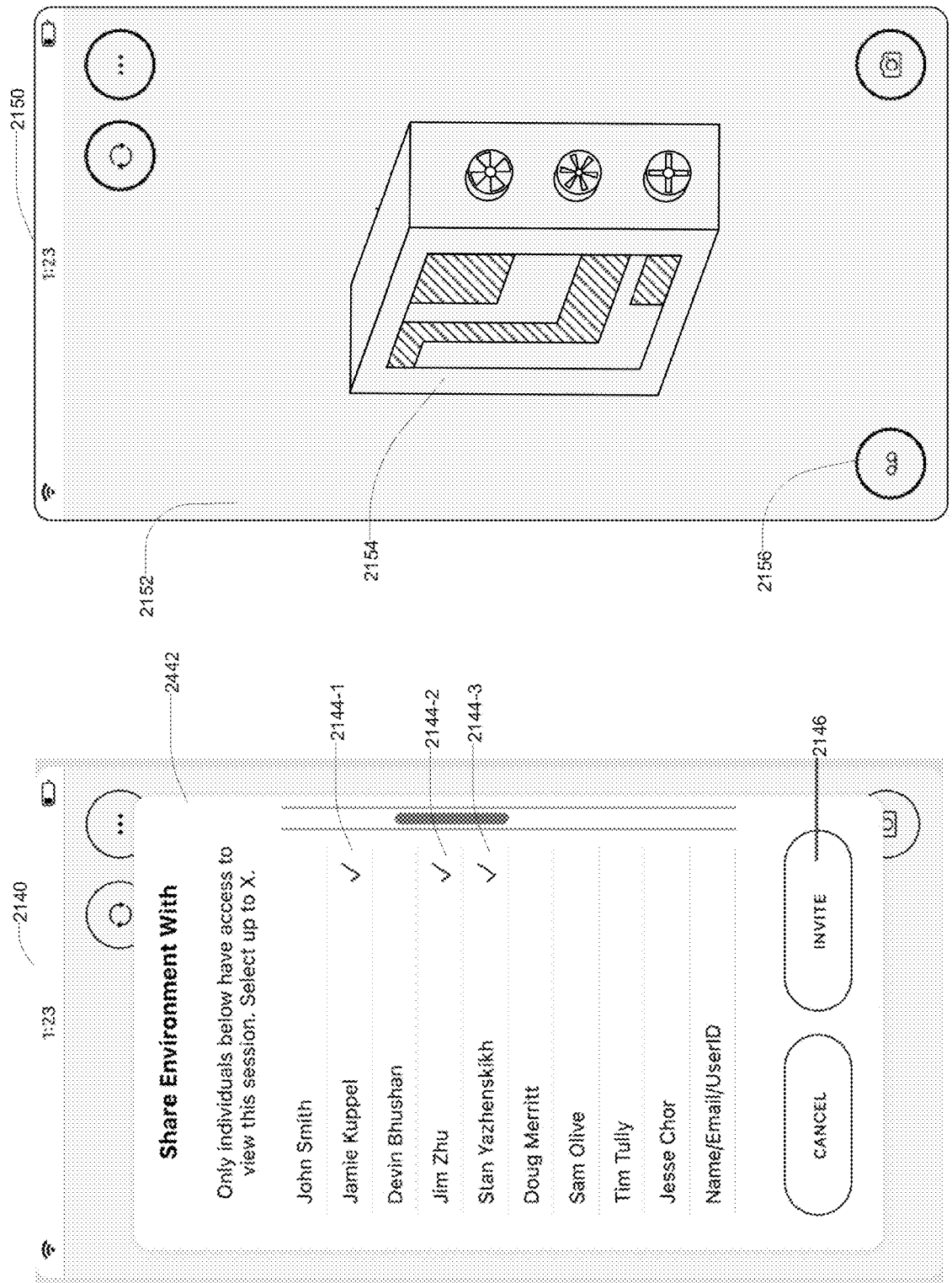

MESH UPDATES IN AN EXTENDED REALITY ENVIRONMENT

CROSS-REFERENCE TO RELATED APPLICATIONS

This application is a continuation of the U.S. patent application titled "MESH UPDATES IN AN EXTENDED REALITY ENVIRONMENT" Ser. No. 17/086,297, filed Oct. 30, 2020, which claims the benefit of the United States provisional application having Ser. No. 63/093,111, filed on Oct. 16, 2020, the United States provisional application having Ser. No. 63/093,123, filed on Oct. 16, 2020, and the United States provisional application having Ser. No. 63/093,143, filed on Oct. 16, 2020. The subject matter of these related applications is hereby incorporated by reference.

BACKGROUND

Description of Related Art

The present disclosure relates generally to computer networks, and more specifically, to sharing physical data for remote collaboration in extended reality environments.

Many information technology (IT) environments enable the access of massive quantities of diverse data stored across multiple data sources. For example, an IT environment could enable users to access text documents, user-generated data stored in a variety of relational database management systems, and machine-generated data stored in systems, such as SPLUNK® ENTERPRISE systems. While the availability of massive quantities of diverse data provides opportunities to derive new insights that increase the usefulness and value of IT systems, a common problem associated with IT environments is that curating, searching, and analyzing the data is quite technically challenging.

In particular, multiple users have difficulty interacting with real-world environments remotely. Various conventional approaches enable one user to capture an image or video and share a stream of the video with remote users via remote devices. However, the remote user is limited by the view that is presented by the host, limiting the ability of the remote user to analyze a physical object using the remote device.

As the foregoing illustrates, what is needed in the art are more efficient techniques of remote interaction with a real-world environment.

BRIEF DESCRIPTION OF THE DRAWINGS

FIG. 4 is a block diagram of an example data intake and query system that performs searches across external data systems, in accordance with one or more examples or implementations;

FIG. 5C provides a visual representation of the manner in which a pipelined search language or query operates, in accordance with one or more examples or implementations;

FIG. 7C illustrates an example of creating and using an inverted index, in accordance with one or more examples or implementations;

FIG. 8B is an interface diagram of an example user interface for a data summary dialog that enables a user to select various data sources, in accordance with one or more examples or implementations;

FIGS. 9-15 are interface diagrams of example report generation user interfaces, in accordance with one or more examples or implementations;

FIG. 17B is an interface diagram of an example user interface of an incident review dashboard, in accordance with one or more examples or implementations;

FIG. 21A illustrates a menu with selectable icons to conduct various operations associated with the real-world environment and/or data processing service, in accordance with example implementations.

FIG. 21B illustrates a menu with selectable icons to initiate a remote collaboration, in accordance with example implementations.

FIG. 21E illustrates an invitation menu for a potential participant in a remote collaboration session, in accordance with example implementations.

FIG. 21F illustrates a portion of a remote environment during a remote collaboration session, in accordance with example implementations.

DETAILED DESCRIPTION

Figure 1:
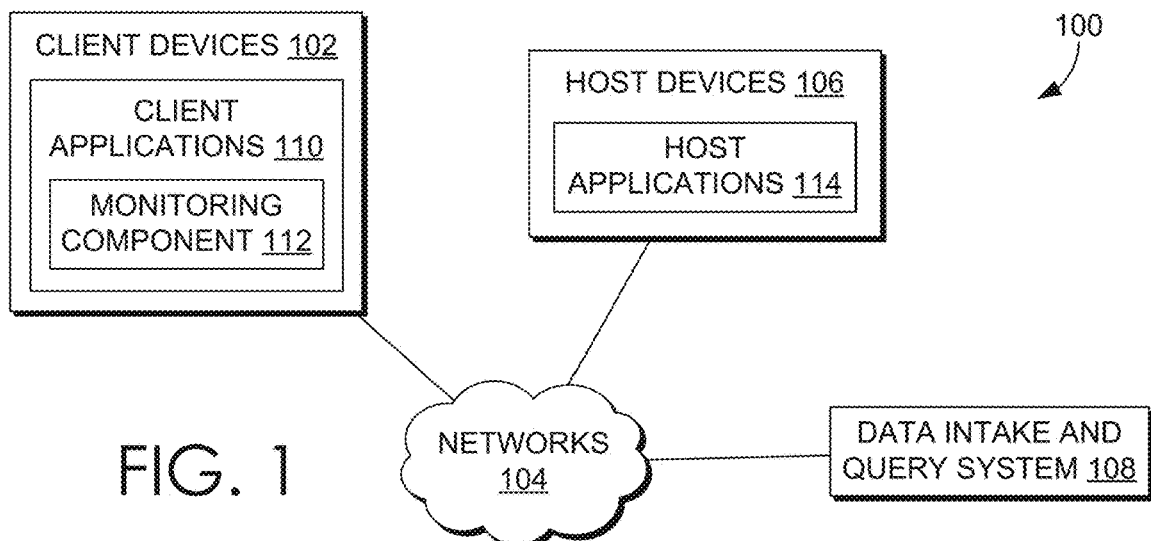
FIG. 1 is a block diagram of an example networked computer environment, in accordance with one or more examples or implementations.

In the following description, numerous specific details are set forth to provide a more thorough understanding of the various implementations. However, it will be apparent to one of skilled in the art that the inventive concepts may be practiced without one or more of these specific details.

Implementations are described herein according to the following outline:
1 General Overview . . . 9
2 Operating Environment . . . 14
   2.1 Host Devices . . . 15
   2.2 Client Devices . . . 16
   2.3 Client Device Applications . . . 16
   2.4 Data Server System . . . 20
   2.5 Cloud-Based System Overview . . . 21
   2.6 Searching Externally-Archived Data . . . 23
      2.6.1 ERP Process Features . . . 27
   2.7 Data Ingestion . . . 31
      2.7.1 Input . . . 31
      2.7.2 Parsing . . . 33
      2.7.3 Indexing . . . 36
   2.8 Query Processing . . . 52
   2.9 Pipelined Search Language . . . 54
   2.10 Field Extraction . . . 57
   2.11 Example Search Screen . . . 66
   2.12 Data Models . . . 67
   2.13 Acceleration Technique . . . 73
      2.13.1 Aggregation Technique . . . 74
      2.13.2 Keyword Index . . . 75
      2.13.3 High-Performance Analytics Store . . . 75
      2.13.4 Extracting Event Data Using Posting Values . . . 82
      2.13.5 Accelerating Report Generation . . . 86
   2.14 Data Center Monitoring . . . 91
3 Sharing Physical Data for Remote Collaboration Sessions . . . 93
   3.1 Networked Remote Collaboration System . . . 95
   3.2 Mesh Updates in an Augmented Reality Environment . . . 133

1 General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log including machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IOT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event including one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID."

In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some implementations, a common field name may be used to reference two or more fields including equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2 Operating Environment

FIG. 1 is a block diagram of an example networked computer environment 100, in accordance with example implementations. Those skilled in the art would understand that FIG. 1 represents one example of a networked computer system and other implementations may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some implementations, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1 Host Devices

In the illustrated implementation, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated implementation, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2 Client Devices

Client devices 102 of FIG. 1 represent any computing device capable of interacting with one or more host devices 106 via a network 104. Examples of client devices 102 may include, without limitation, smartphones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3 Client Device Applications

In some implementations, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some implementations, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some implementations, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some implementations, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some implementations, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some implementations, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data included within the packets, for example, and other aspects of data packets can be analyzed to determine a number of network performance statistics. Monitoring network traffic may enable information to be gathered particular to the network performance associated with a client application 110 or set of applications.

In some implementations, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some implementations, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some implementations, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4 Data Server System

Figure 2:
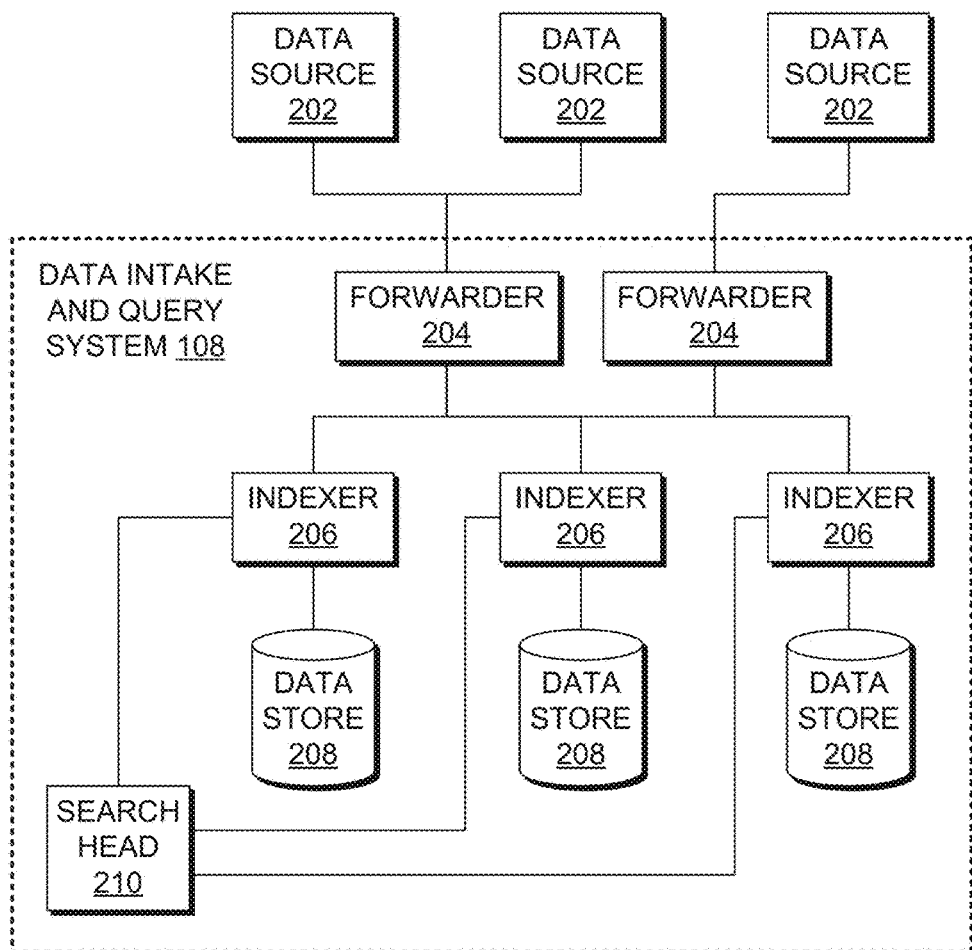
FIG. 2 is a block diagram of an example data intake and query system, in accordance with one or more examples or implementations.

FIG. 2 is a block diagram of an example data intake and query system 108, in accordance with example implementations. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some implementations, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may include events derived from machine data from a variety of sources all pertaining to the same component in an IT environment, and this data may be produced by the machine in question or by other components in the IT environment.

2.5 Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one implementation, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
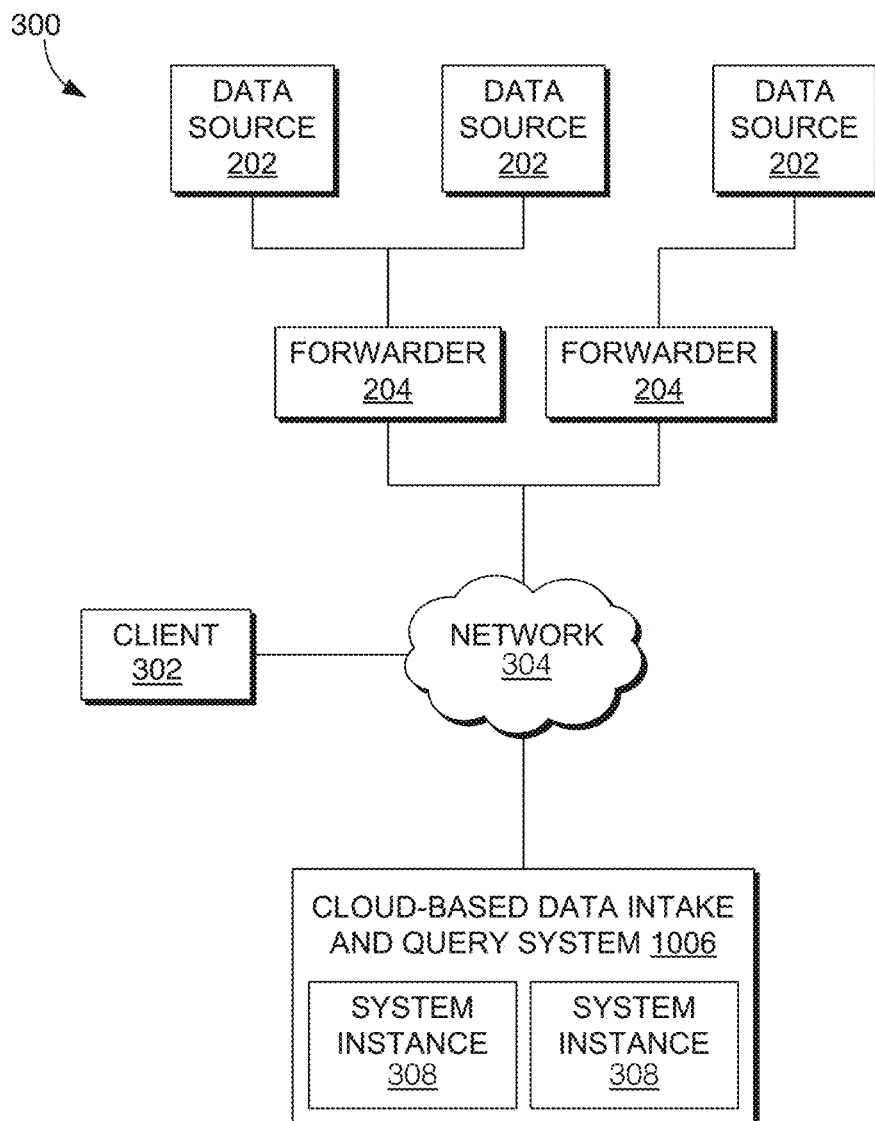
FIG. 3 is a block diagram of an example cloud-based data intake and query system, in accordance with one or more examples or implementations.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304.

Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some implementations, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6 Searching Externally-Archived Data

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, California. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LAN, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For Retrieving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1 ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7 Data Ingestion

Figure 5A:
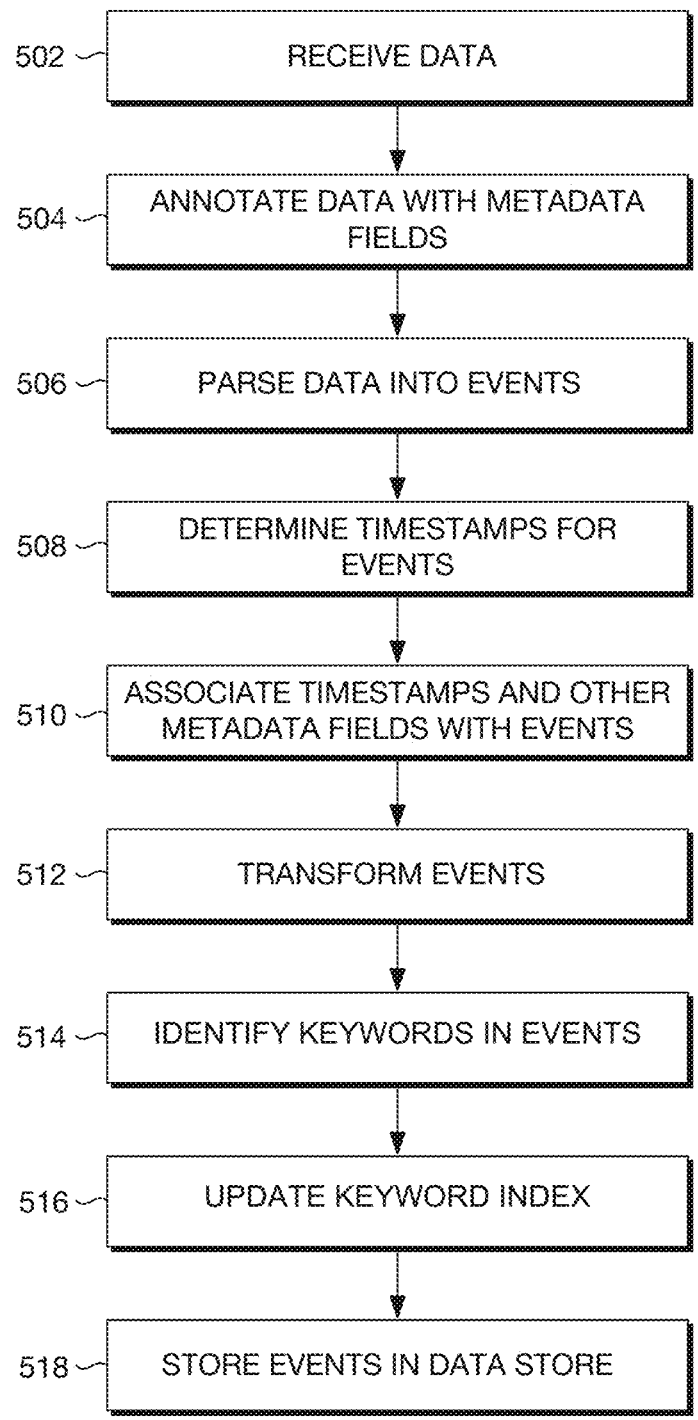
FIG. 5A is a flowchart of an example method that illustrates how indexers process, index, and store data received from forwarders, in accordance with one or more examples or implementations.

FIG. 5A is a flow chart of an example method that illustrates how indexers process, index, and store data received from forwarders, in accordance with example implementations. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1 Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some implementations, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may include a value identifying a host name or IP address of a device that generated the data. A source field may include a value identifying a source of the data, such as a pathname of a file or a protocol and port related to received network data. A source type field may include a value specifying a particular source type label for the data. Additional metadata fields may also be included during the input phase, such as a character encoding of the data, if known, and possibly other values that provide information relevant to later processing steps. In some implementations, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some implementations, a forwarder may include the essential components needed to forward data. A forwarder can gather data from a variety of inputs and forward the data to an indexer for indexing and searching. A forwarder can also tag metadata (e.g., source, source type, host, etc.).

In some implementations, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

At block 506, an indexer receives data blocks from a forwarder and parses the data to organize the data into events. In some implementations, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field including the timestamp determined for the event. In some implementations, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed implementations. In other implementations, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various implementations described herein. In one particular implementation, machine data can be stored in a compressed or encrypted formatted. In such implementations, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in implementations in which the portion of machine data included in an event is unprocessed or otherwise unaltered, it is referred to herein as a portion of raw machine data. In other implementations, the port of machine data in an event can be processed or otherwise altered. As such, unless certain information needs to be removed for some reasons (e.g. extraneous information, confidential information), all the raw machine data included in an event can be preserved and saved in its original form. Accordingly, the data store in which the event records are stored is sometimes referred to as a "raw record data store." The raw record data store includes a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various implementations of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3 Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events including that keyword (or to locations within events where that keyword is located, other location identifiers, etc.). When an indexer subsequently receives a keyword-based query, the indexer can access the keyword index to quickly identify events including the keyword.

In some implementations, the keyword index may include entries for field name-value pairs found in events, where a field name-value pair can include a pair of keywords connected by a symbol, such as an equals sign or colon. This way, events including these field name-value pairs can be quickly located. In some implementations, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some implementations, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets including the most recent events can be stored in flash memory rather than on a hard disk. In some implementations, each bucket may be associated with an identifier, a time range, and a size constraint.

Each indexer 206 may be responsible for storing and searching a subset of the events included in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some implementations, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some implementations, an indexer may also have a quarantine bucket that includes events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some implementations, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
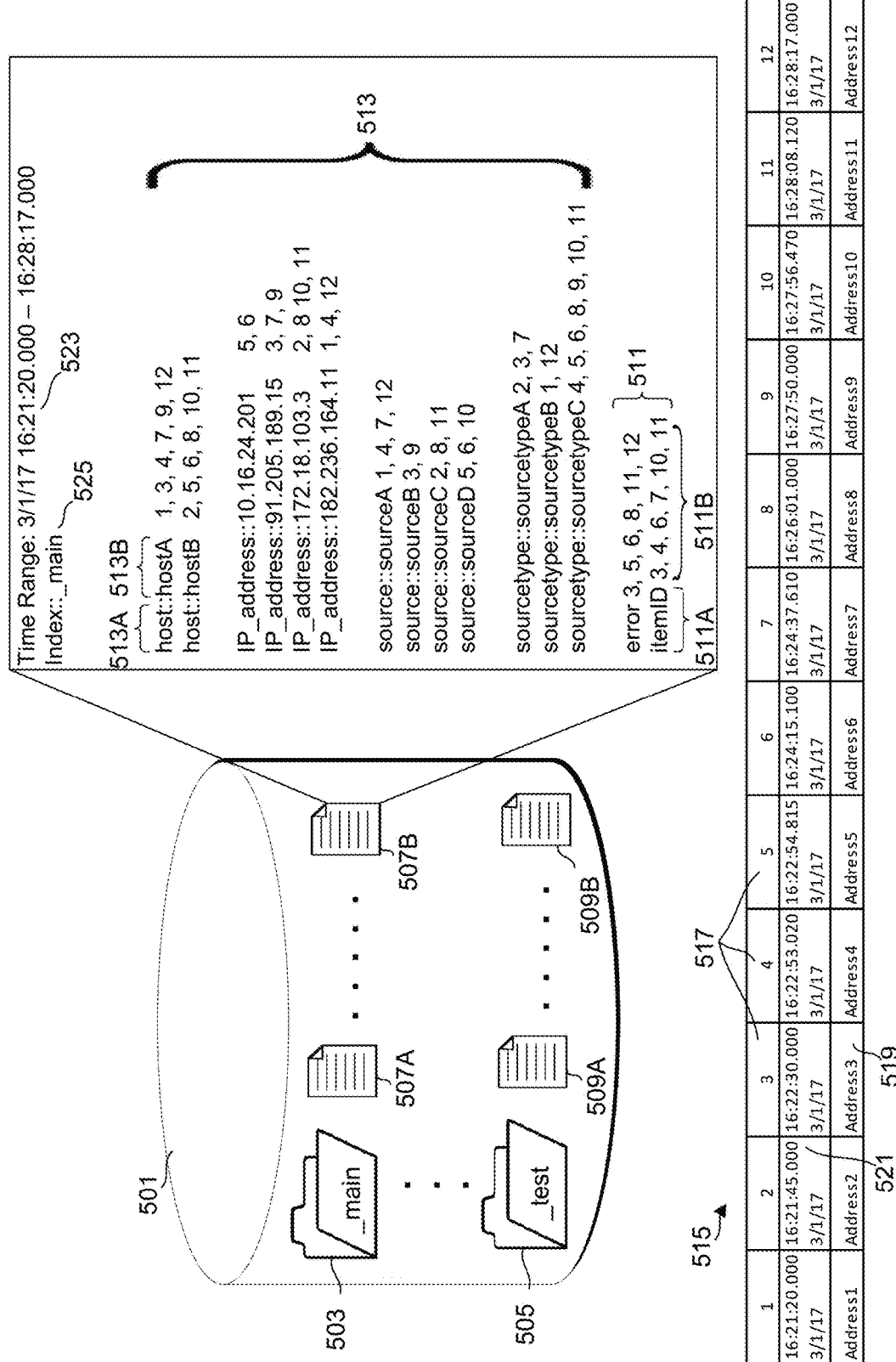
FIG. 5B is a block diagram of a data structure in which time-stamped event data can be stored in a data store, in accordance with one or more examples or implementations.

FIG. 5B is a block diagram of an example data store 501 that includes a directory for each index (or partition) that includes a portion of data managed by an indexer. FIG. 5B further illustrates details of an implementation of an inverted index 507B and an event reference array 515 associated with inverted index 507B.

The data store 501 can correspond to a data store 208 that stores events managed by an indexer 206 or can correspond to a different data store associated with an indexer 206. In the illustrated implementation, the data store 501 includes a_main directory 503 associated with a_main index and a_test directory 505 associated with a test index. However, the data store 501 can include fewer or more directories. In some implementations, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated implementation of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some implementations, the inverted index 507A . . . 507B, and 509A . . . 509B can correspond to a distinct time-series bucket that is managed by the indexer 206 and that includes events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some implementations inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain implementations, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated implementation of FIG. 5B, the error token entry includes the identifiers 3, 5, 6, 8, 11, and 12 corresponding to events managed by the indexer 206 and associated with the index_main 503 that are located in the time-series bucket associated with the inverted index 507B.

In some cases, some token entries can be default entries, automatically determined entries, or user specified entries. In some implementations, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated implementation of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated implementation of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated implementation of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated implementation of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some implementations, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some implementations, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain implementations, if the filter criteria include a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some implementations, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:

28.00.000, sourcetype=sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the_main directory 503 and the time range associated with it. For sake of simplicity in this example, the indexer 206 determines that no other inverted indexes in the_main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some implementations, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated implementation and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some implementations, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some implementations, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some implementations, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8 Query Processing

Figure 6A:
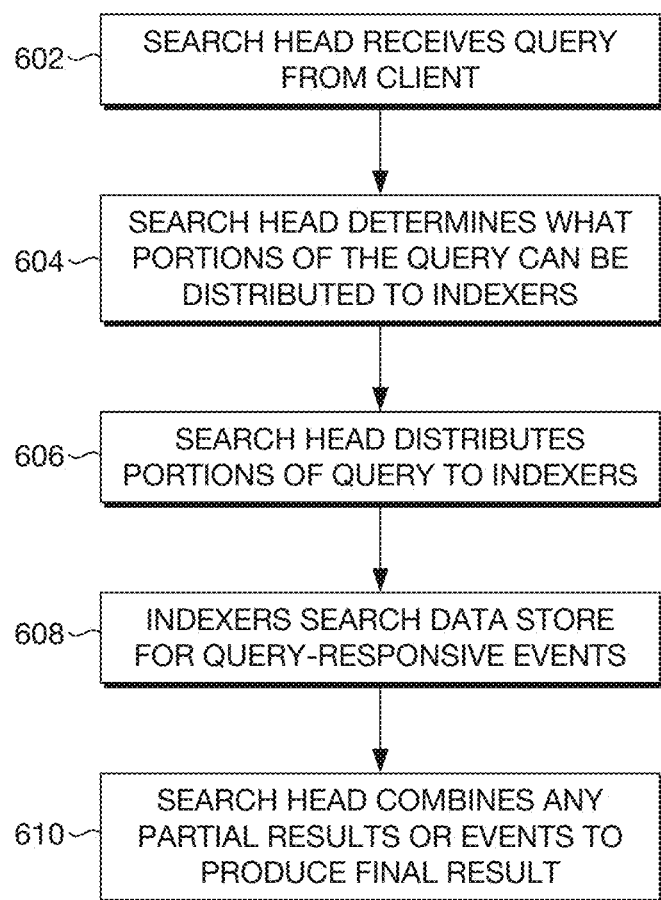
FIG. 6A is a flow diagram of an example method that illustrates how a search head and indexers perform a search query, in accordance with one or more examples or implementations.

FIG. 6A is a flow diagram of an example method that illustrates how a search head and indexers perform a search query, in accordance with example implementations. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some implementations, a search head cluster may take the place of an independent search head where each search head in the search head cluster coordinates with peer search heads in the search head cluster to schedule jobs, replicate search results, update configurations, fulfill search requests, etc. In some implementations, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some implementations, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9 Pipelined Search Language

Various implementations of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various implementations, a query can be formulated as a command sequence defined in a command line of a search UI. In some implementations, a query can be formulated as a sequence of SPL commands. Some or all of the SPL commands in the sequence of SPL commands can be separated from one another by a pipe symbol "I". In such implementations, a set of data, such as a set of events, can be operated on by a first SPL command in the sequence, and then a subsequent SPL command following a pipe symbol "I" after the first SPL command operates on the results produced by the first SPL command or other set of data, and so on for any additional SPL commands in the sequence. As such, a query formulated using SPL comprises a series of consecutive commands that are delimited by pipe "I" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various implementations described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some implementations, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various implementations is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events including the word "warn-ing" or filter out all events where a field value associated with a field "clientip" is "10.0.1.2."

The results obtained or generated in response to a command in a query can be considered a set of results data. The set of results data can be passed from one command to another in any data format. In one implementation, the set of result data can be in the form of a dynamically created table. Each command in a particular query can redefine the shape of the table. In some implementations, an event retrieved from an index in response to a query can be considered a row with a column for each field value. Columns include basic information about the data and also may include data that has been dynamically extracted at search time.

Figure 6B:
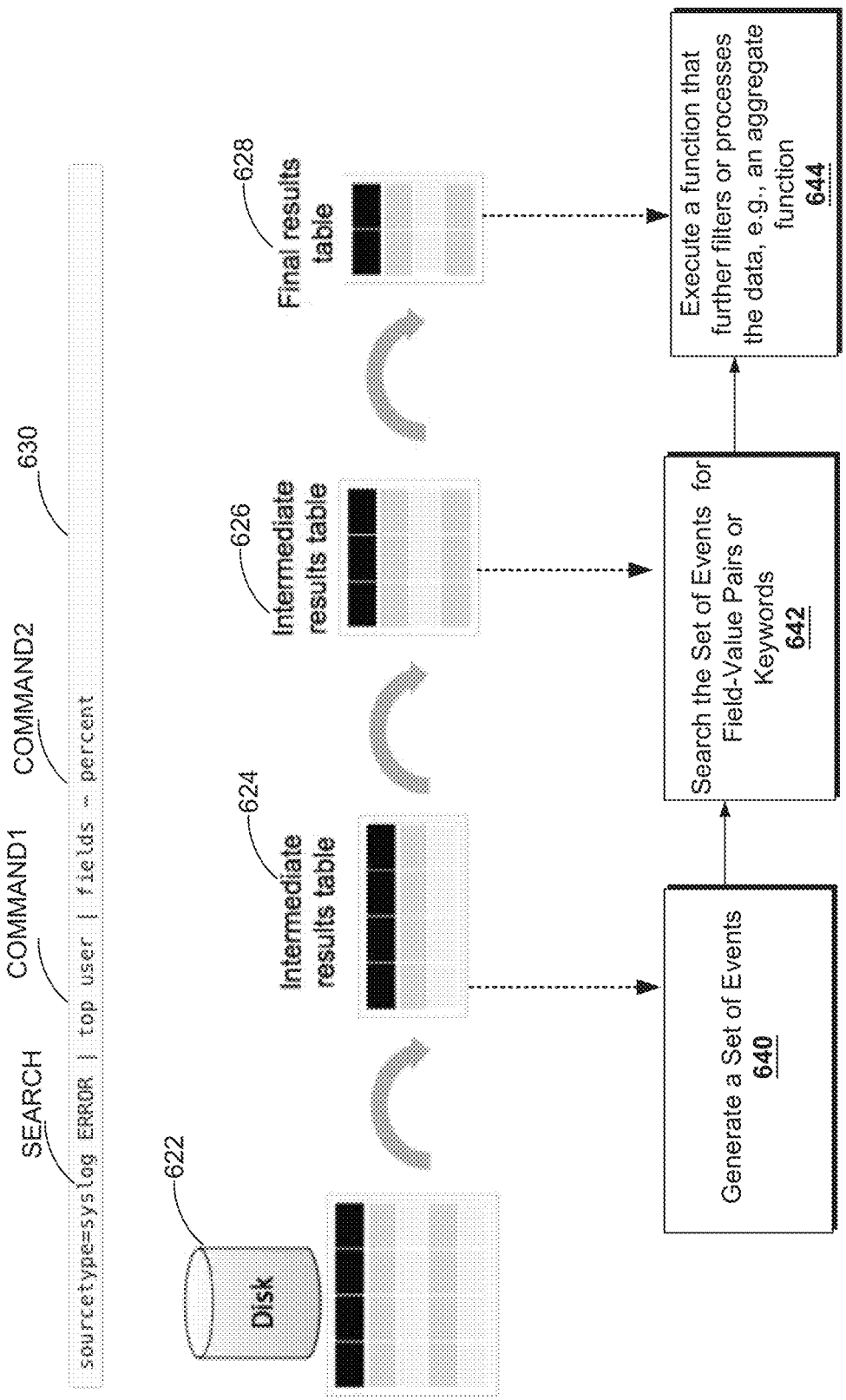
FIG. 6B provides a visual representation of an example manner in which a pipelined command language or query operates, in accordance with one or more examples or implementations.

FIG. 6B provides a visual representation of the manner in which a pipelined command language or query operates in accordance with the disclosed implementations. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which may summarize the events into a list of the top 10 users and may display the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different implementations, other query languages, such as the Structured Query Language ("SQL"), can be used to create a query.

2.10 Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
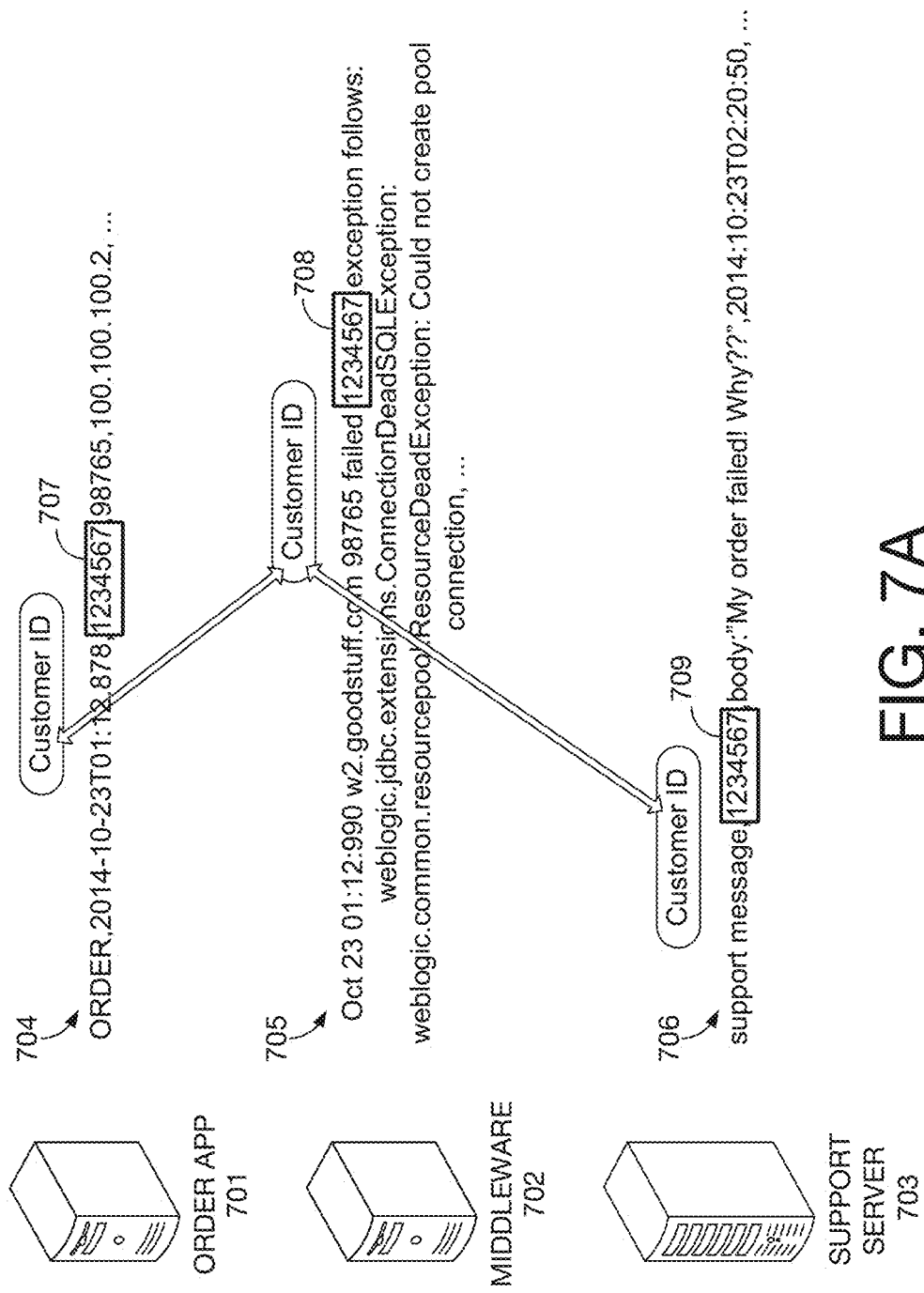
FIG. 7A is a diagram of an example scenario where a common customer identifier is found among log data received from three disparate data sources, in accordance with one or more examples or implementations.

FIG. 7A is a diagram of an example scenario where a common customer identifier is found among log data received from three disparate data sources, in accordance with example implementations. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report including the values, a visualization (e.g., a graph or chart) generated from the values, and the like.

Figure 7B:
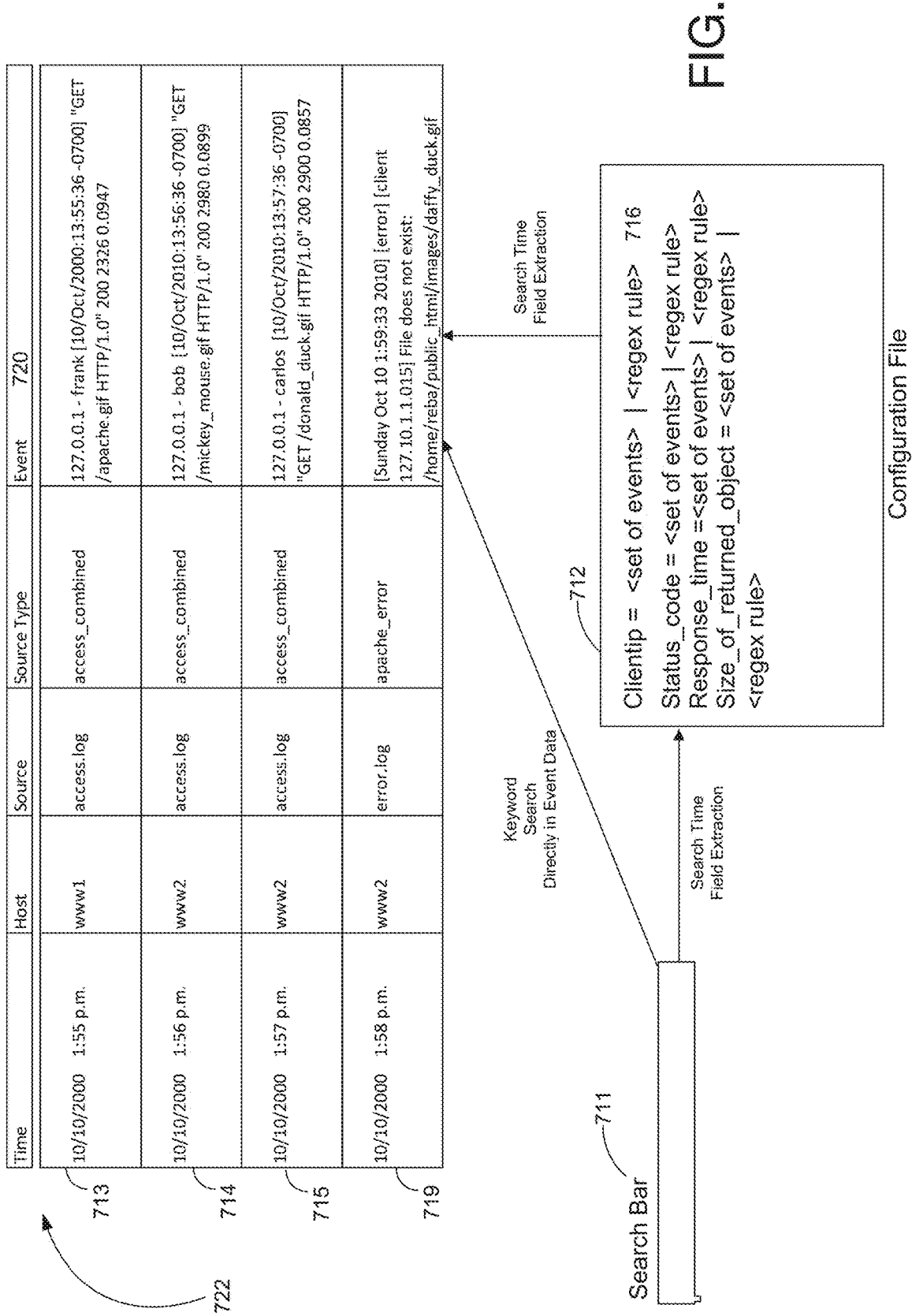
FIG. 7B illustrates an example of processing keyword searches and field searches, in accordance with one or more examples or implementations.

The search system enables users to run queries against the stored data to retrieve events that meet criteria specified in a query, such as including certain keywords or having specific values in defined fields. FIG. 7B illustrates the manner in which keyword searches and field searches are processed in accordance with disclosed implementations.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may include records for millions of events.

As disclosed above, an indexer can optionally generate a keyword index to facilitate fast keyword searching for event data. The indexer includes the identified keywords in an index, which associates each stored keyword with reference pointers to events including that keyword (or to locations within events where that keyword is located, other location identifiers, etc.). When an indexer subsequently receives a keyword-based query, the indexer can access the keyword index to quickly identify events including the keyword. For example, if the keyword "HTTP" was indexed by the indexer at index time, and the user searches for the keyword "HTTP", events 713 to 715 will be identified based on the results returned from the keyword index. As noted above, the index includes reference pointers to the events including the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will include a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data including one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events including other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may include events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed implementations. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more implementations, need to locate configuration file 712 during the execution of the search as shown in FIG. 7B.

Configuration file 712 may include extraction rules for all the various fields that are not metadata fields, e.g., the "clientip" field. The extraction rules may be inserted into the configuration file in a variety of ways. In some implementations, the extraction rules can comprise regular expression rules that are manually entered in by the user. Regular expressions match patterns of characters in text and are used for extracting custom fields in text.

In one or more implementations, as noted above, a field extractor may be configured to automatically generate extraction rules for certain field values in the events when the events are being created, indexed, or stored, or possibly at a later time. In one implementation, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some implementations, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more implementations, the extraction rule in configuration file 712 will also need to define the type or set of events that the rule applies to. Because the raw record data store will include events from multiple heterogeneous sources, multiple events may include the same fields in different locations because of discrepancies in the format of the data generated by the various sources. Furthermore, certain events may not include a particular field at all. For example, event 719 also includes "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and includes a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries including field criteria in addition to queries including keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events included in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search including field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11 Example Search Screen

Figure 8A:
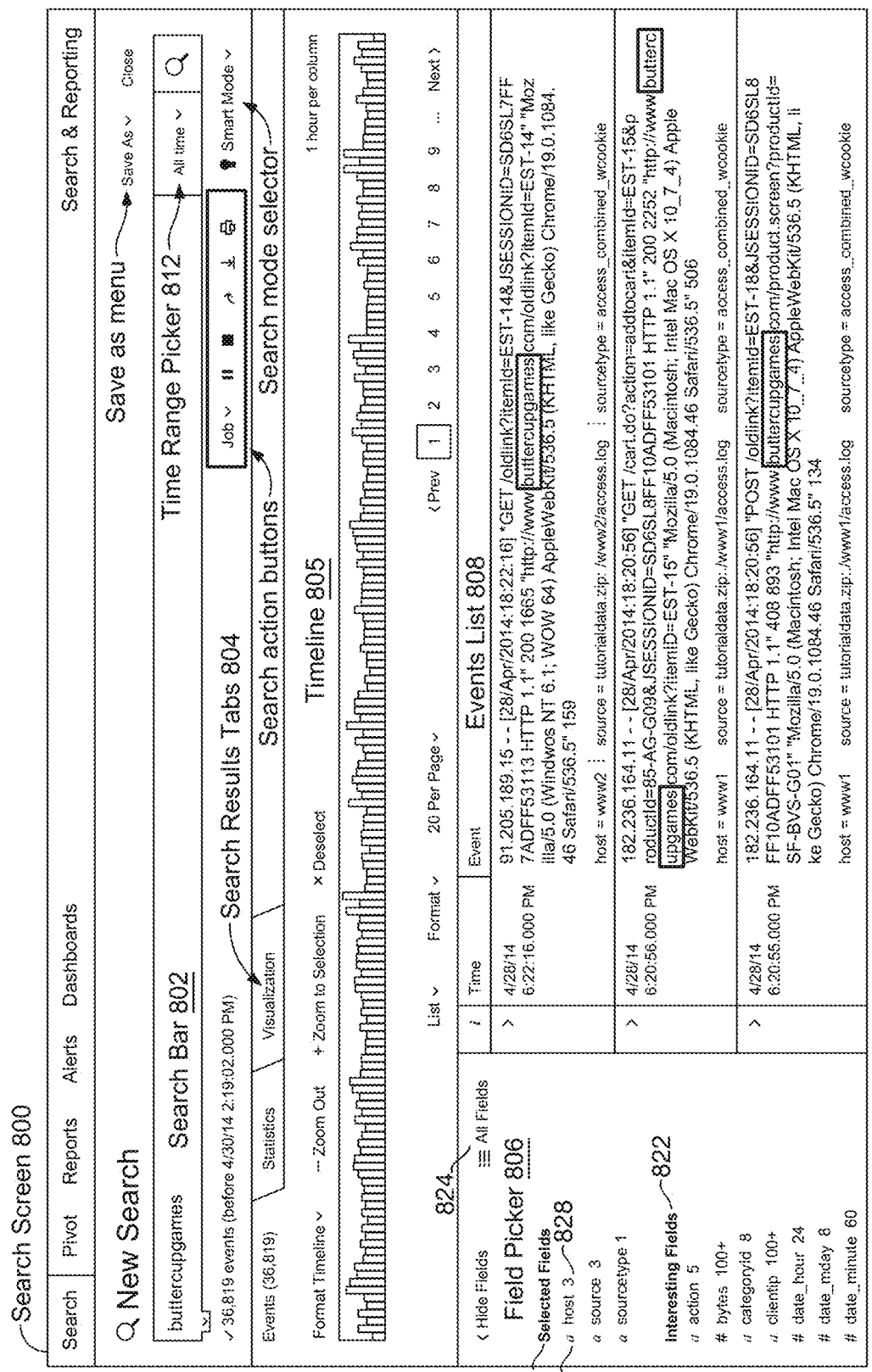
FIG. 8A is an interface diagram of an example user interface for a search screen, in accordance with one or more examples or implementations.

FIG. 8A is an interface diagram of an example user interface for a search screen 800, in accordance with example implementations. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially may display a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that may display various information about events returned by the search; a "statistics tab" that may display statistics about the search results; and a "visualization tab" that may display various visualizations of the search results. The events tab illustrated in FIG. 8A may display a timeline graph 805 that graphically illustrates the number of events that occurred in one-hour intervals over the selected time range. The events tab also may display an events list 808 that enables a user to view the machine data in each of the returned events.

The events tab additionally may display a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12 Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 March, 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some implementations, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example implementations. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
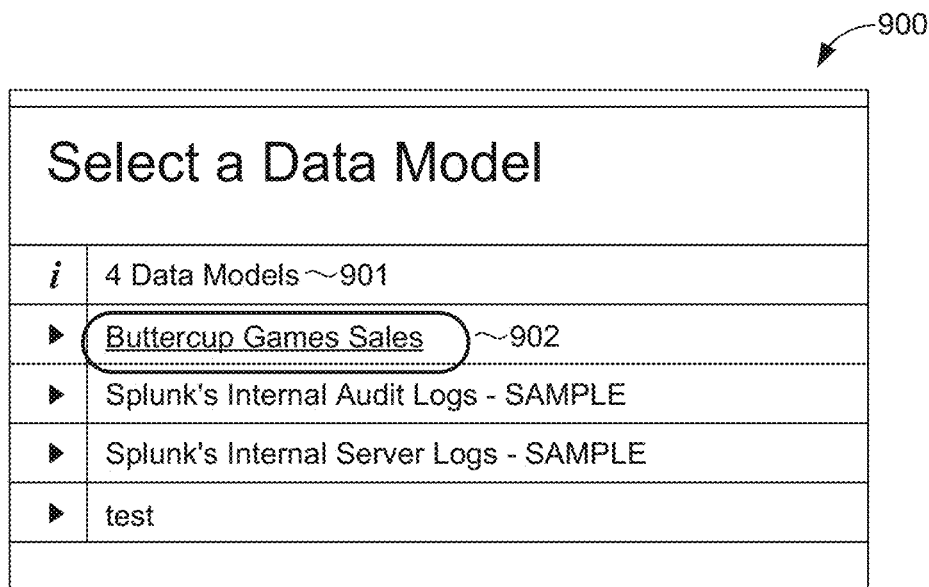

The selection of a data model object for use in driving a report generation may be facilitated by a data model object selection interface. FIG. 9 illustrates an example interactive data model selection graphical user interface 900 of a report editor that may display a listing of available data models 901. The user may select one of the data models 902.

Figure 10:
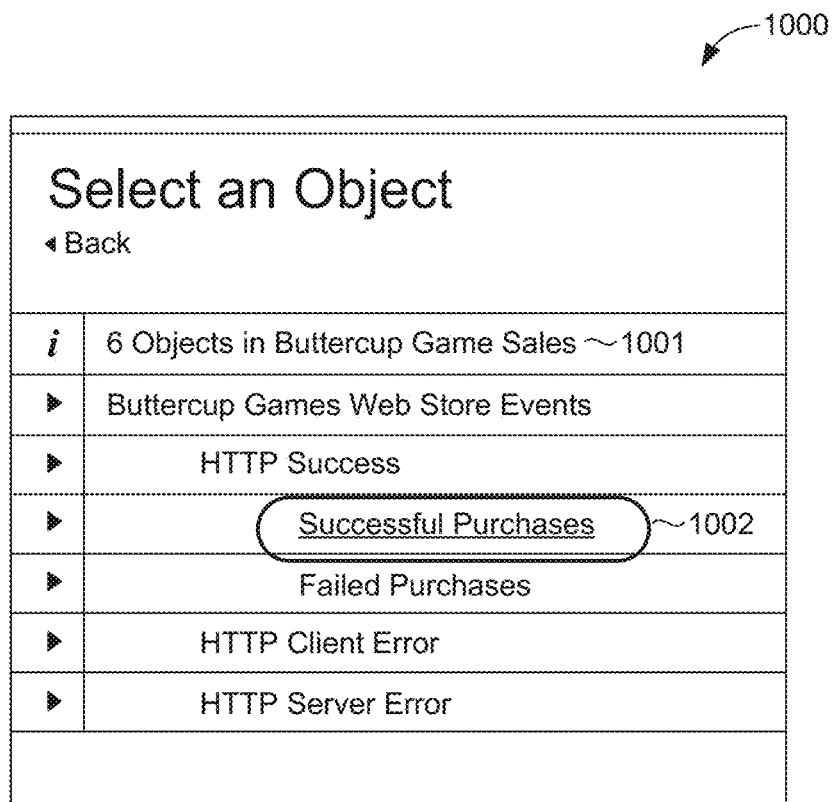

FIG. 10 illustrates an example data model object selection graphical user interface 1000 that may display available data objects 1001 for the selected data object model 902. The user may select one of the displayed data model objects 1002 for use in driving the report generation process.

Figure 11A:
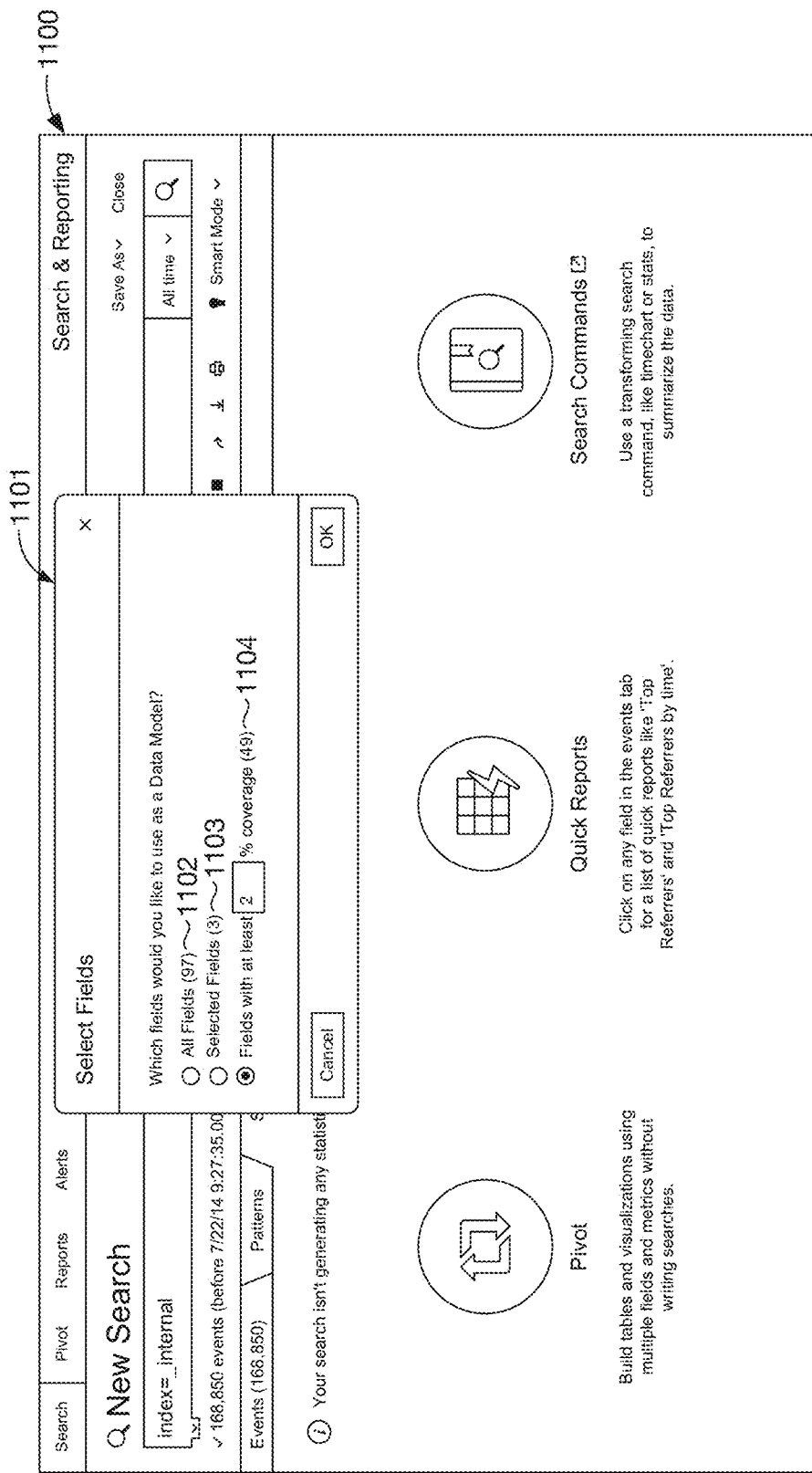

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
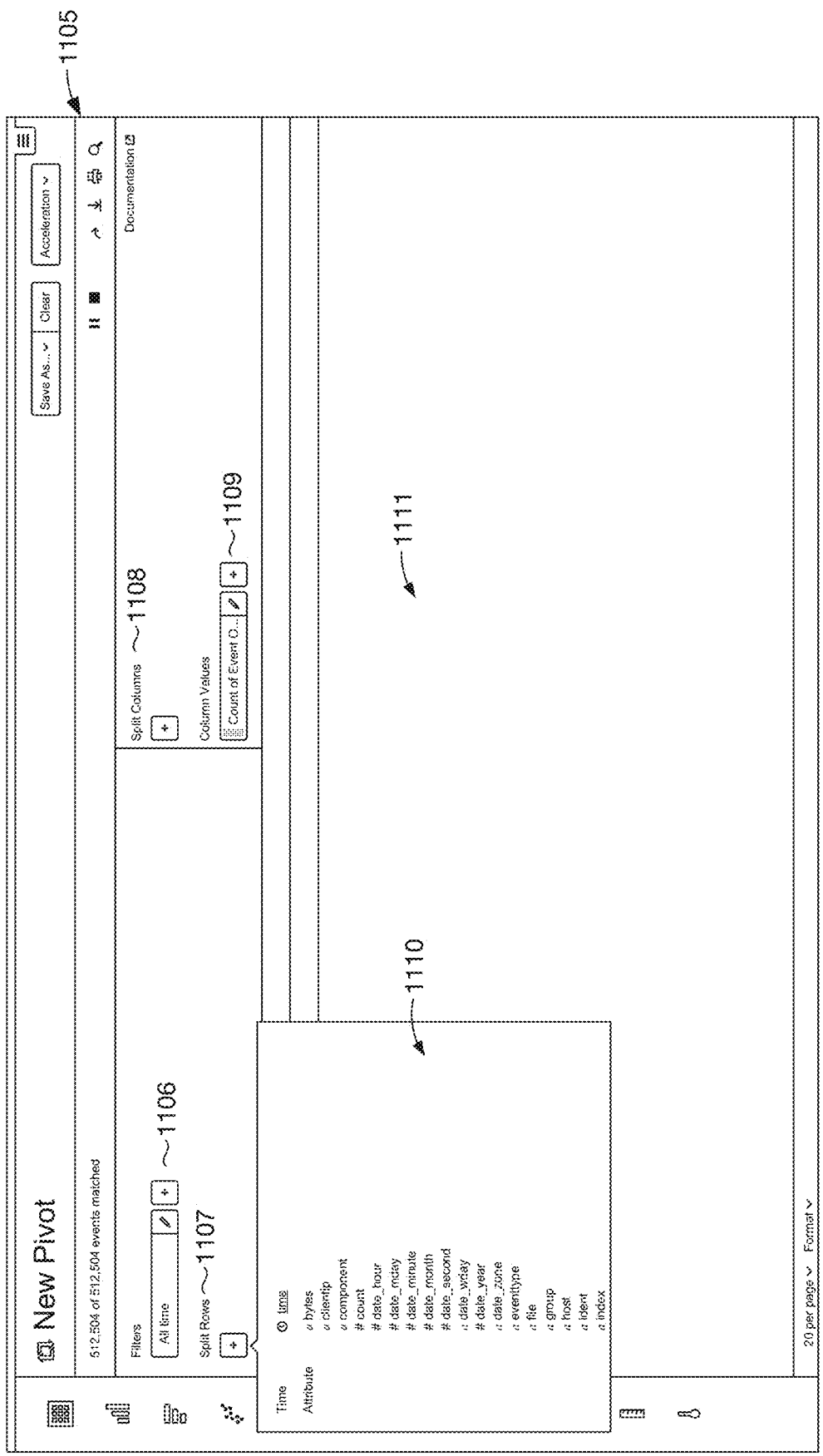
Figure 11C:
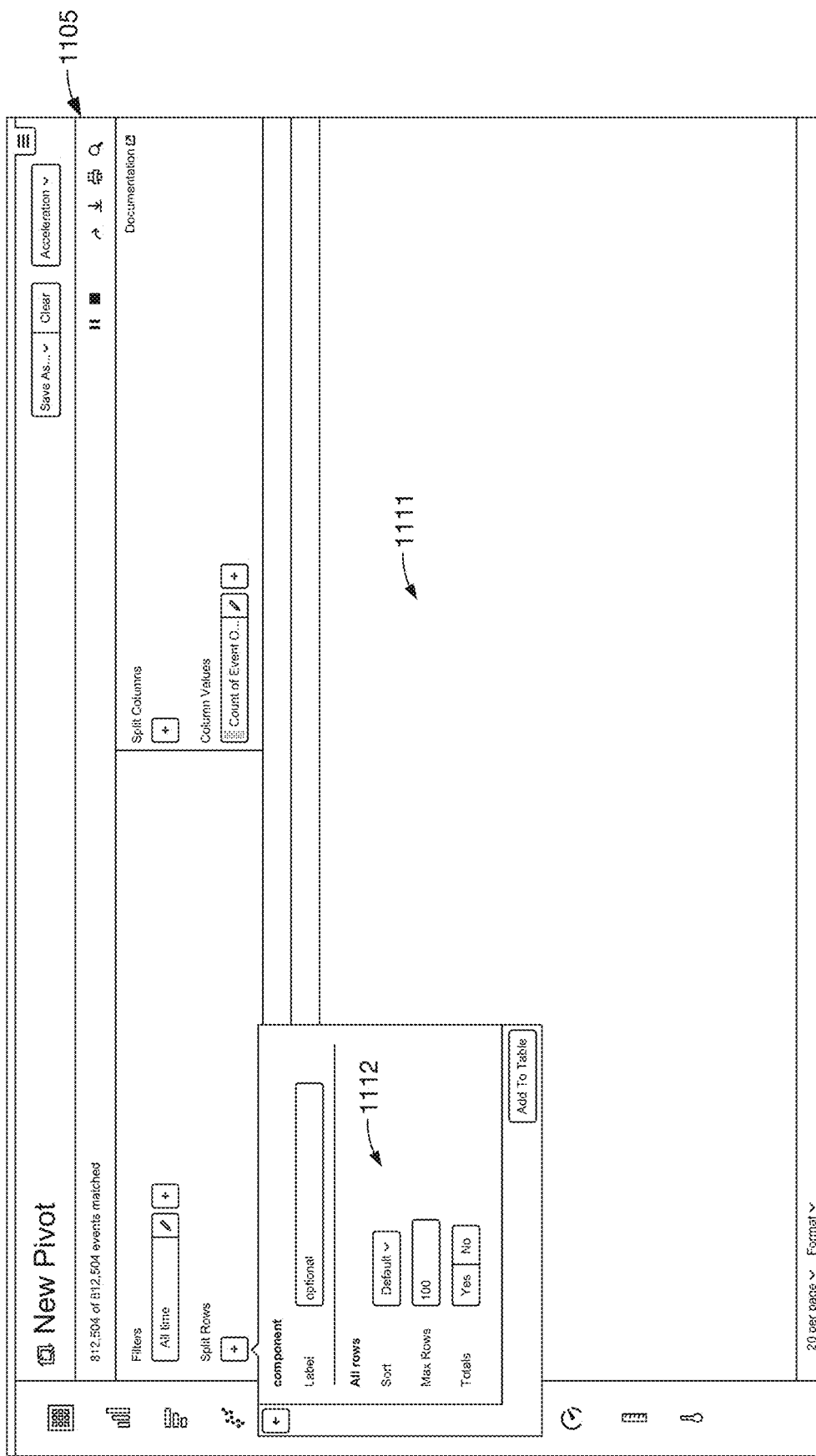

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
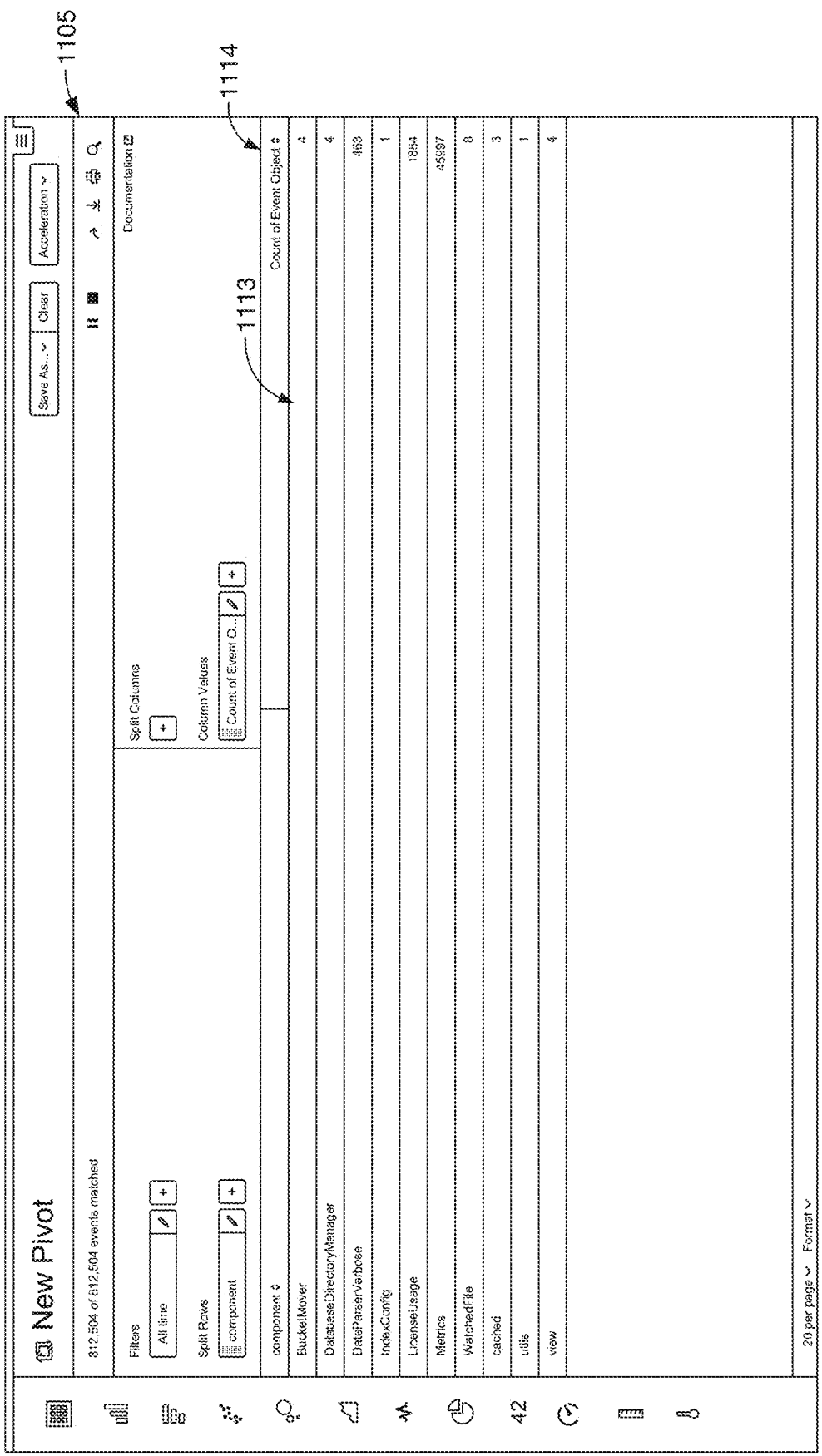

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
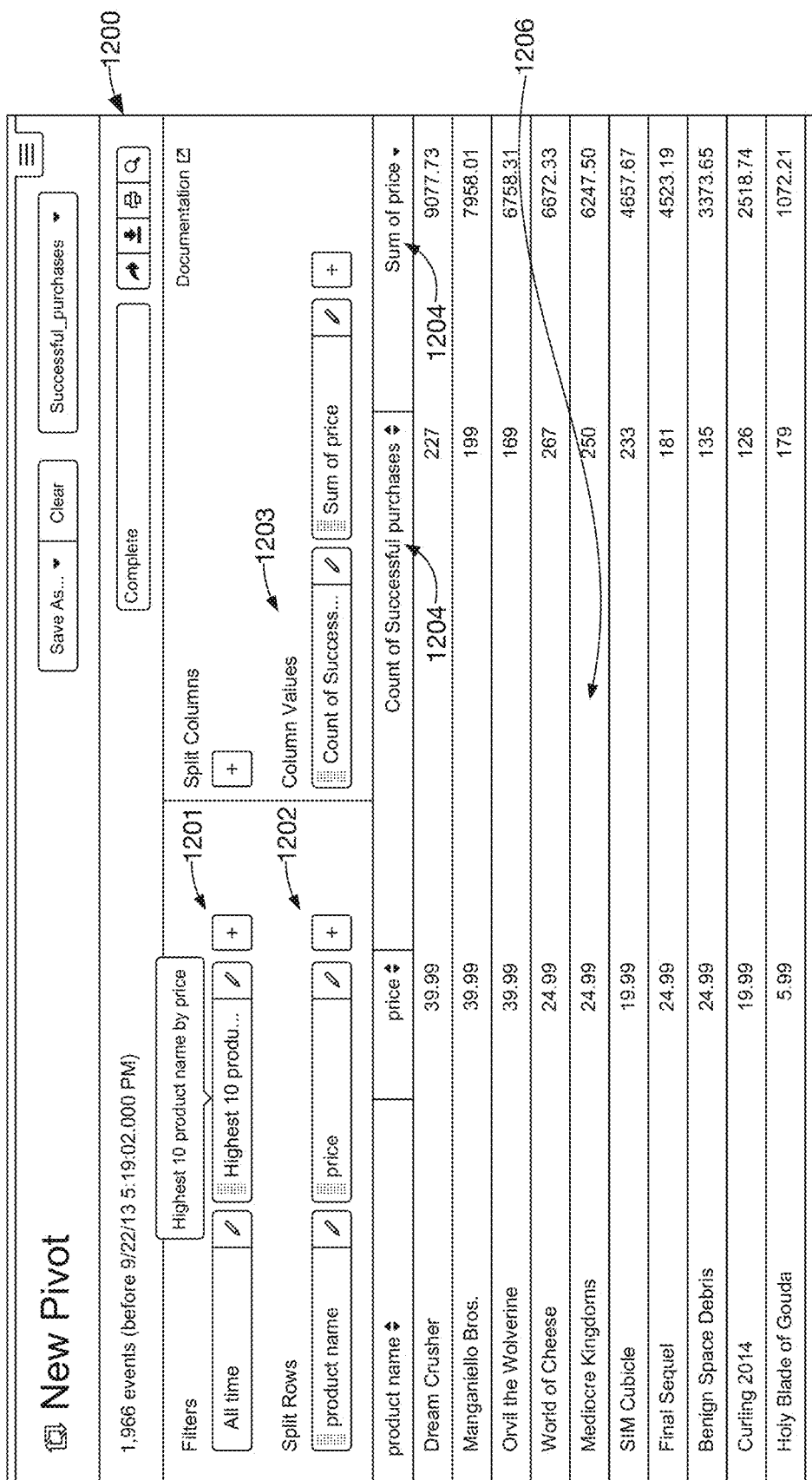

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
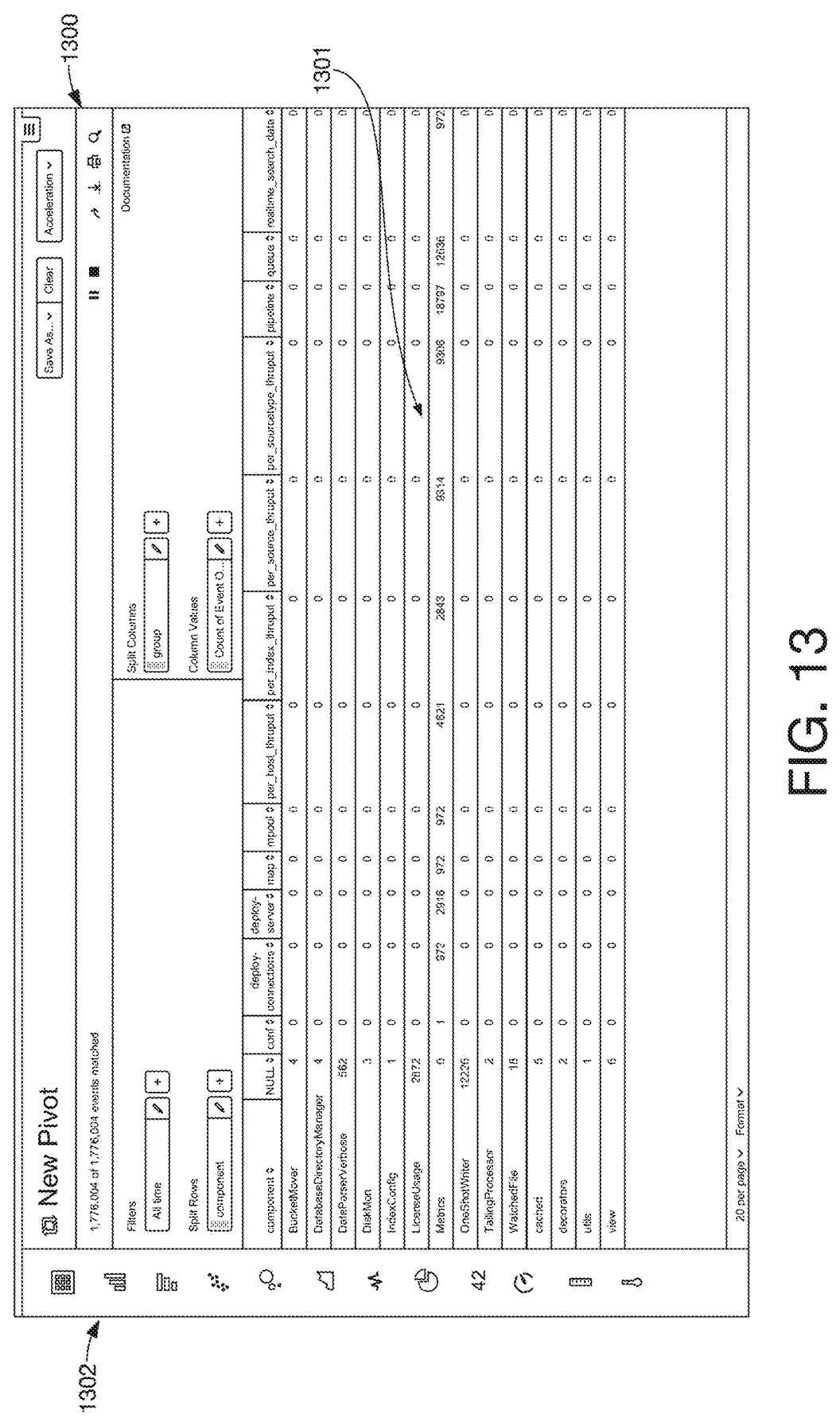
Figure 14:
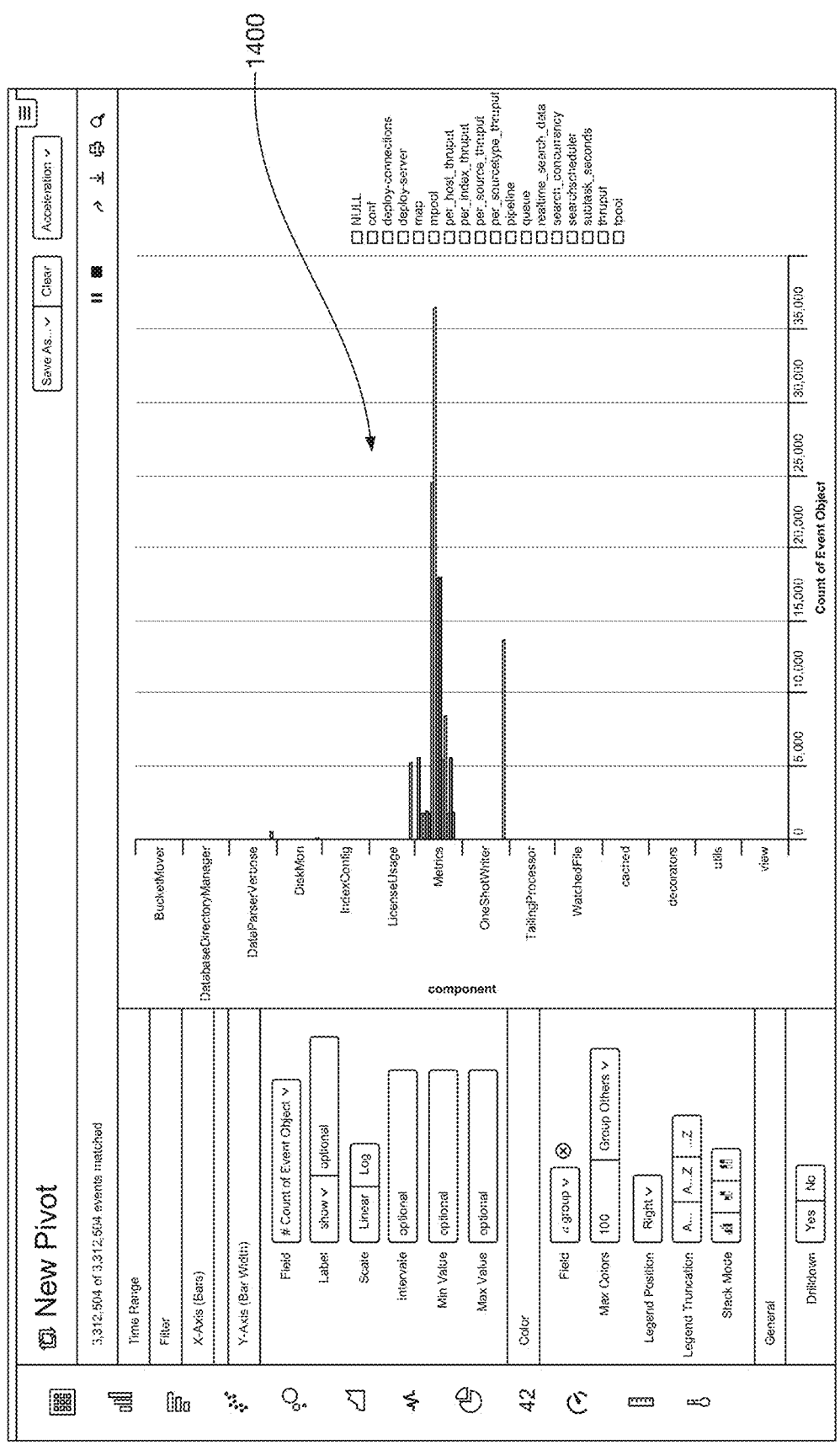
Figure 15:
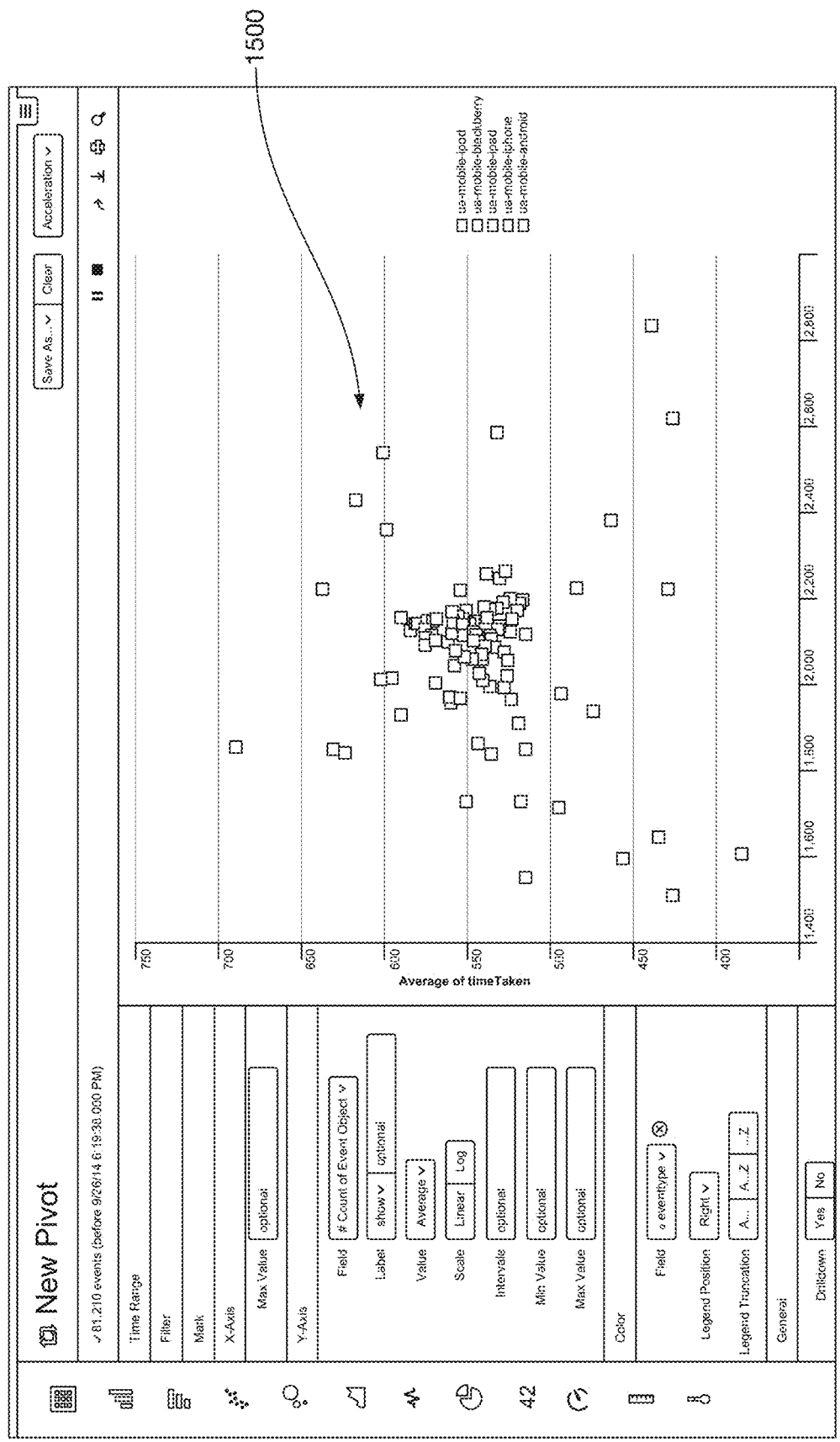

The reporting application allows the user to create graphical visualizations of the statistics generated for a report. For example, FIG. 13 illustrates an example graphical user interface 1300 that may display a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13 Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1 Aggregation Technique

Figure 16:
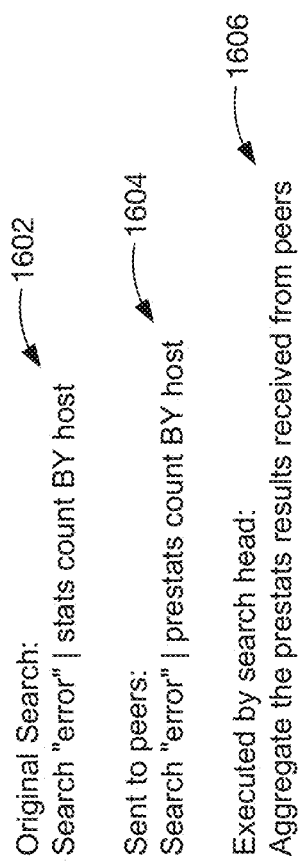
FIG. 16 is an example search query received from a client and executed by search peers, in accordance with one or more examples or implementations.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example implementations. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2 Keyword Index

As described above with reference to the flow charts in FIG. 5A and FIG. 6A, data intake and query system 108 can construct and maintain one or more keyword indices to quickly identify events including specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events including that keyword, or to locations within events where that keyword is located. When an indexer subsequently receives a keyword-based query, the indexer can access the keyword index to quickly identify events including the keyword.

2.13.3 High-Performance Analytics Store

To speed up certain types of queries, some implementations of system 108 create a high performance analytics store, which is referred to as a "summarization table," that includes entries for specific field-value pairs. Each of these entries keeps track of instances of a specific value in a specific field in the events and includes references to events including the specific value in the specific field. For example, an example entry in a summarization table can keep track of occurrences of the value "94107" in a "ZIP code" field of a set of events and the entry includes references to all of the events that include the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some implementations, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "Distributed High Performance Analytics Store", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some implementations of system 108 create a high performance analytics store, which is referred to as a "summarization table," (also referred to as a "lexicon" or "inverted index") that includes entries for specific field-value pairs. Each of these entries keeps track of instances of a specific value in a specific field in the event data and includes references to events including the specific value in the specific field. For example, an example entry in an inverted index can keep track of occurrences of the value "94107" in a "ZIP code" field of a set of events and the entry includes references to all of the events that include the value "94107" in the ZIP code field. Creating the inverted index data structure avoids needing to incur the computational overhead each time a statistical query needs to be run on a frequently encountered field-value pair. In order to expedite queries, in most implementations, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some implementations, the reference value may include additional information about each record, such as timestamps, record size, meta-data, or the like. Each reference value may be a unique identifier which may be used to access the event data directly in the field searchable data store. In some implementations, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more implementations, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more implementation, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed implementations. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more implementations, if one or more of the queries is a collection query, the responsive indexers may generate summarization information based on the fields of the event records located in the field searchable data store. In at least one of the various implementations, one or more of the fields used in the summarization information may be listed in the collection query and/or they may be determined based on terms included in the collection query. For example, a collection query may include an explicit list of fields to summarize. Or, in at least one of the various implementations, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may include an explicit definition for the field name "clientip" which may obviate the need to reference the configuration file at search time.

In one or more implementations, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some implementations, the inverted indexes that include fields, values, and reference value (e.g., inverted index 722) for event records may be included in the summarization information provided to the user. In other implementations, a user may not be interested in specific fields and values included in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some implementations, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more implementations, if one or more of the queries is a stats query, each indexer may generate a partial result set from previously generated summarization information. The partial result sets may be returned to the search head that received the query and combined into a single result set for the query.

As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some implementations, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more implementations, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "Distributed High Performance Analytics Store", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.4 Extracting Event Data Using Posting Values

In one or more implementations, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one implementation, include syntax that can direct the initial filtering step in a query to an inverted index. In one implementation, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one implementation, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one implementation, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one implementation, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more implementations, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one implementation, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
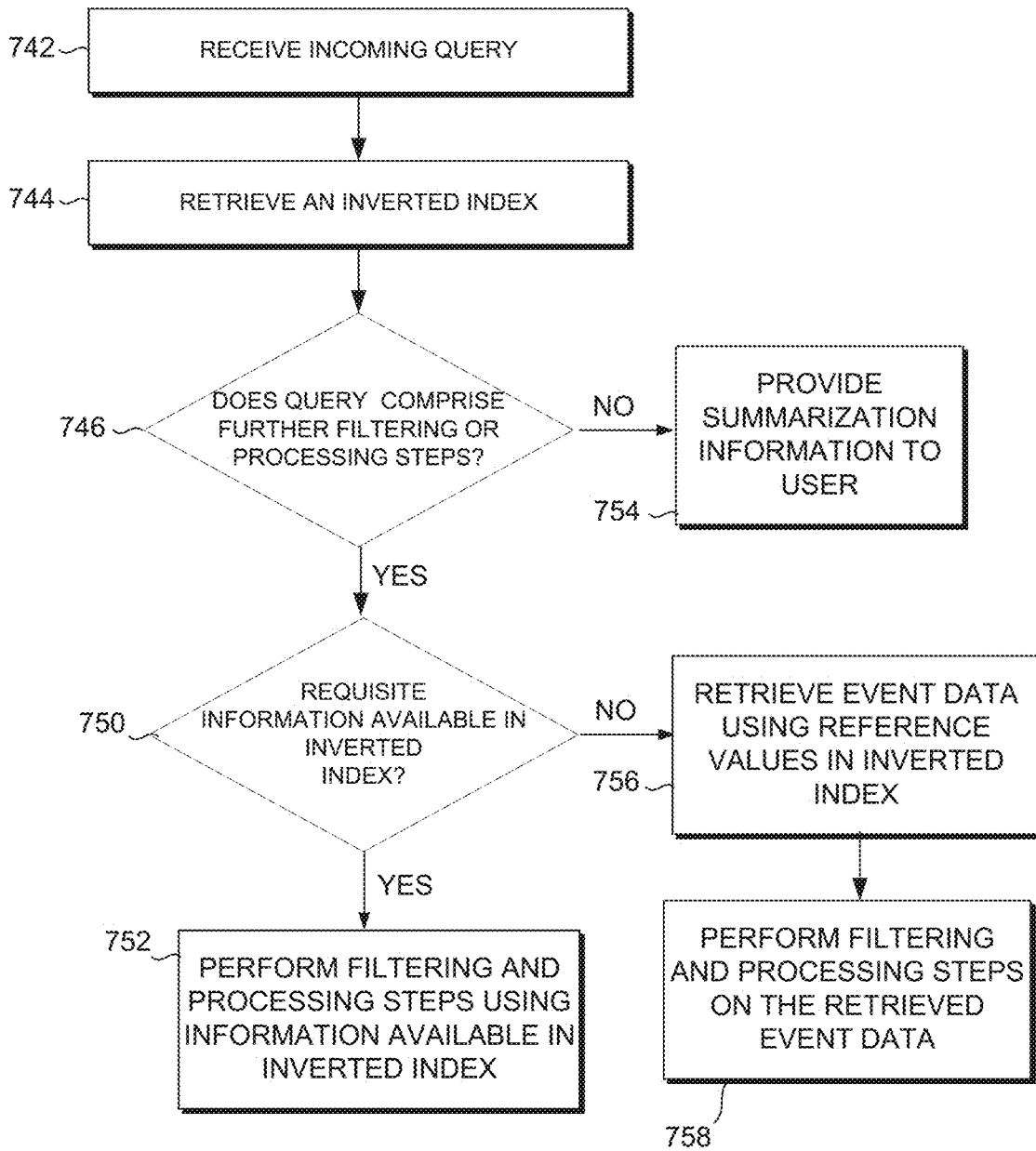
FIG. 7D depicts a flowchart of example use of an inverted index in a pipelined search query, in accordance with one or more examples or implementations.

FIG. 7D presents a flowchart illustrating how an inverted index in a pipelined search query can be used to determine a set of event data that can be further limited by filtering or processing in accordance with the disclosed implementations.

At block 742, a query is received by a data intake and query system. In some implementations, the query can be received as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events including the specific value in the specific field. In order to expedite queries, in most implementations, the search engine will employ the inverted index separate from the raw record data store to generate responses to the received queries.

At block 746, the query engine determines if the query includes further filtering and processing steps. If the query includes no further commands, then, in one implementation, summarization information can be provided to the user at block 754.

If, however, the query does include further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.5 Accelerating Report Generation

In some implementations, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information included in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "Compressed Journaling In Event Tracking Files For Metadata Recovery And Replication", issued on 19 Nov. 2013, U.S. Pat. No. 8,412,696, entitled "Real Time Searching And Reporting", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations including security-related information. Also, alerts can be generated to notify system operators when important notable events are discovered.

Figure 17A:
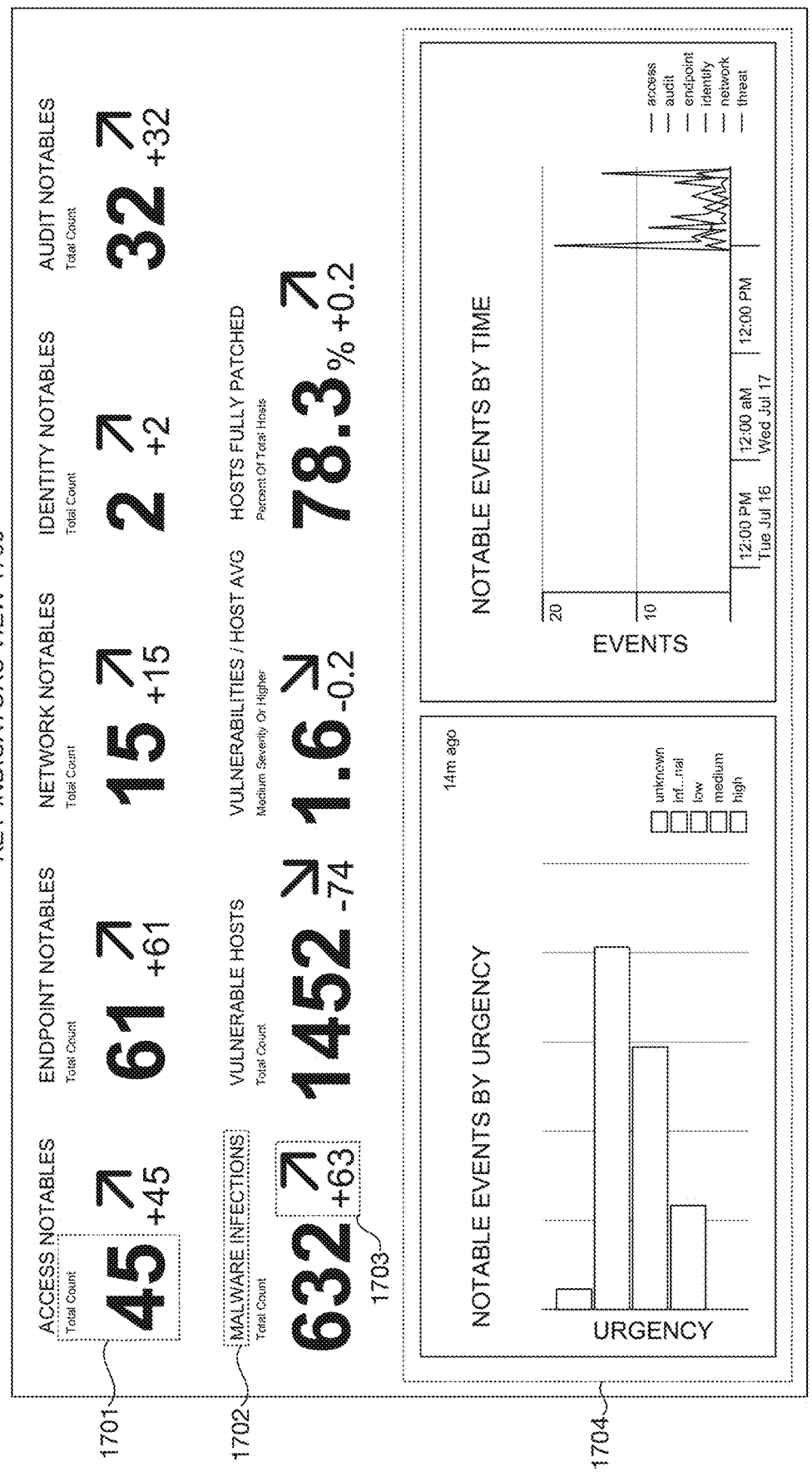
FIG. 17A is an interface diagram of an example user interface of a key indicators view, in accordance with one or more examples or implementations.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "Key Indicators View", filed on 31 Jul. 2013, and which is hereby incorporated by reference in its entirety for all purposes.

Figure 17B:
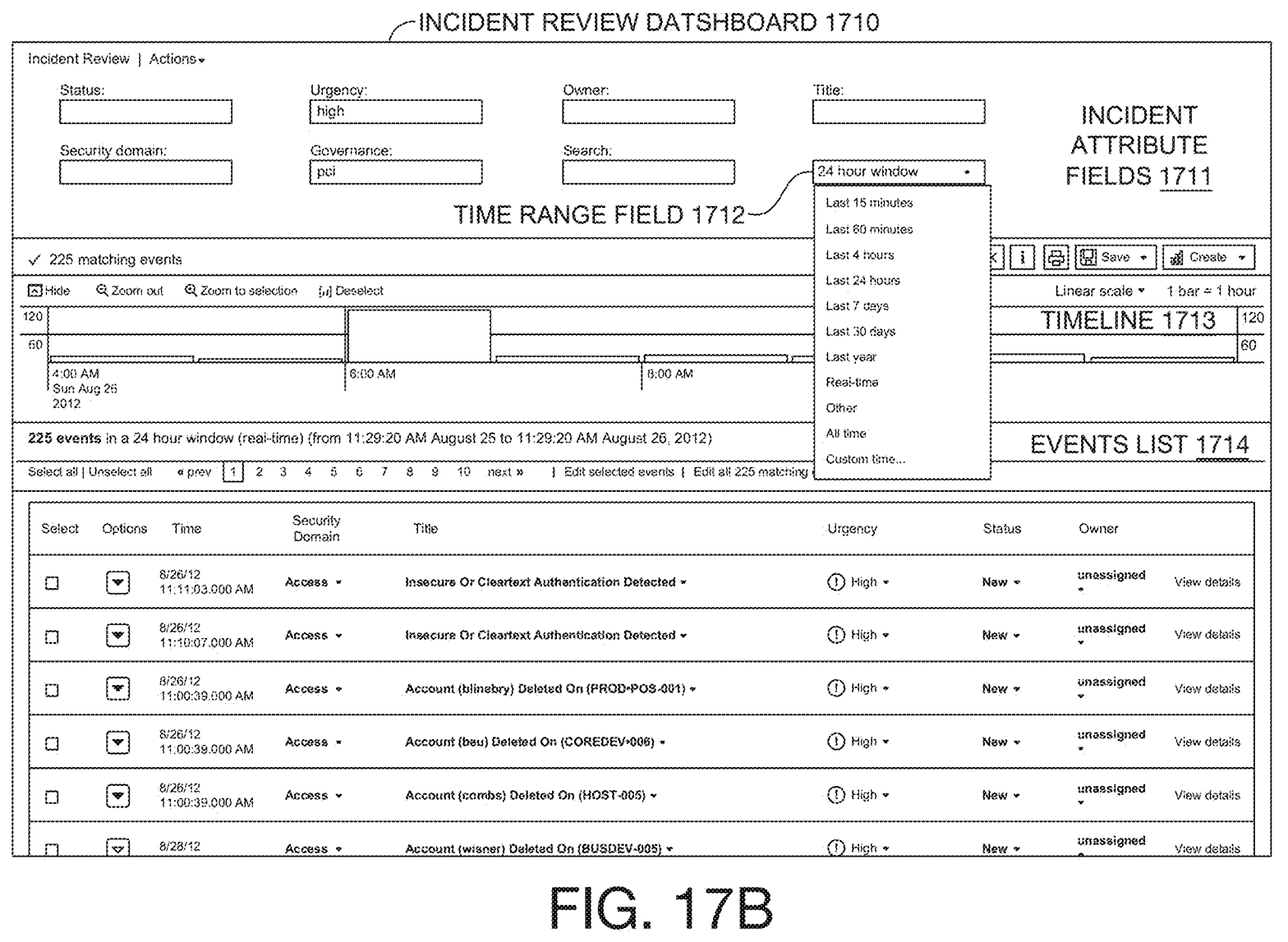

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.14 Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
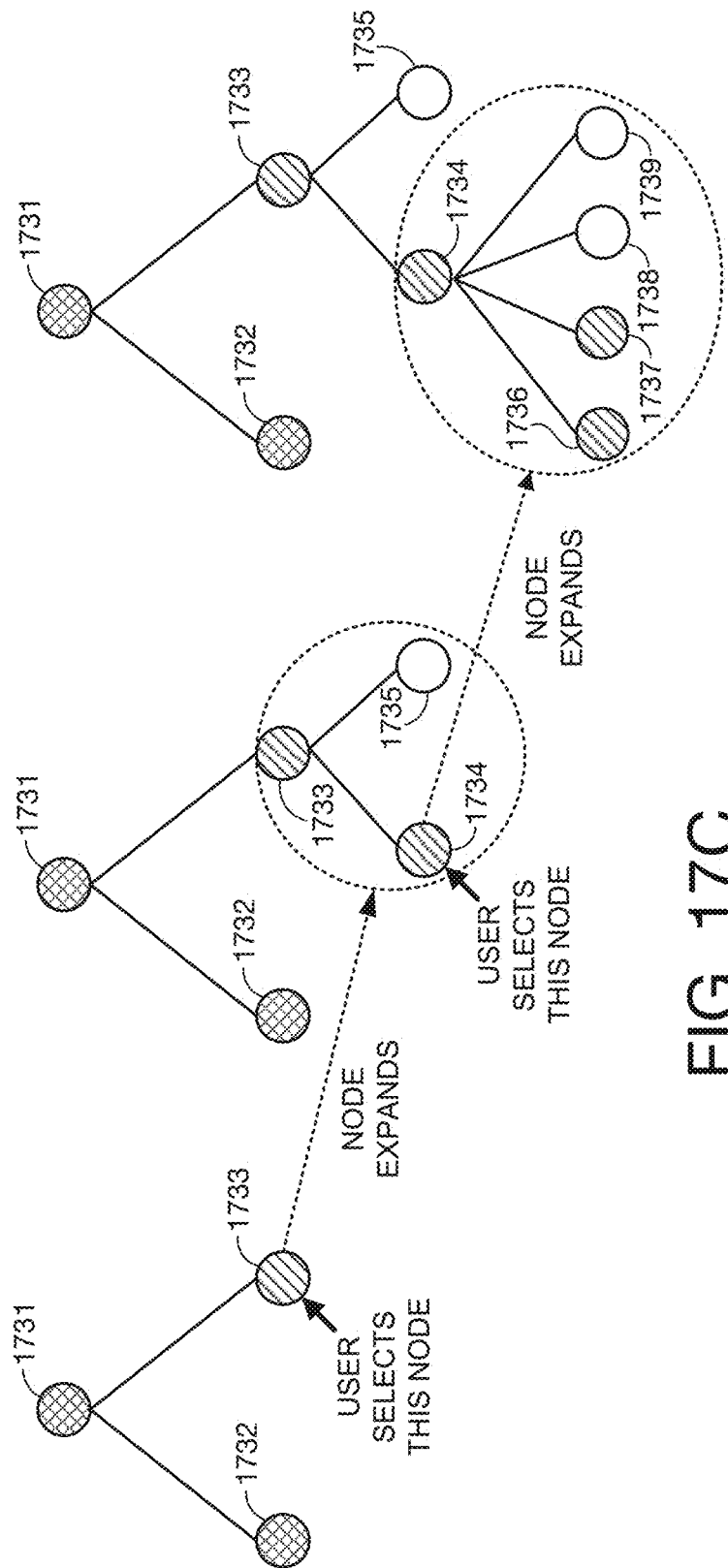
FIG. 17C is a tree diagram of an example a proactive monitoring tree, in accordance with one or more examples or implementations.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
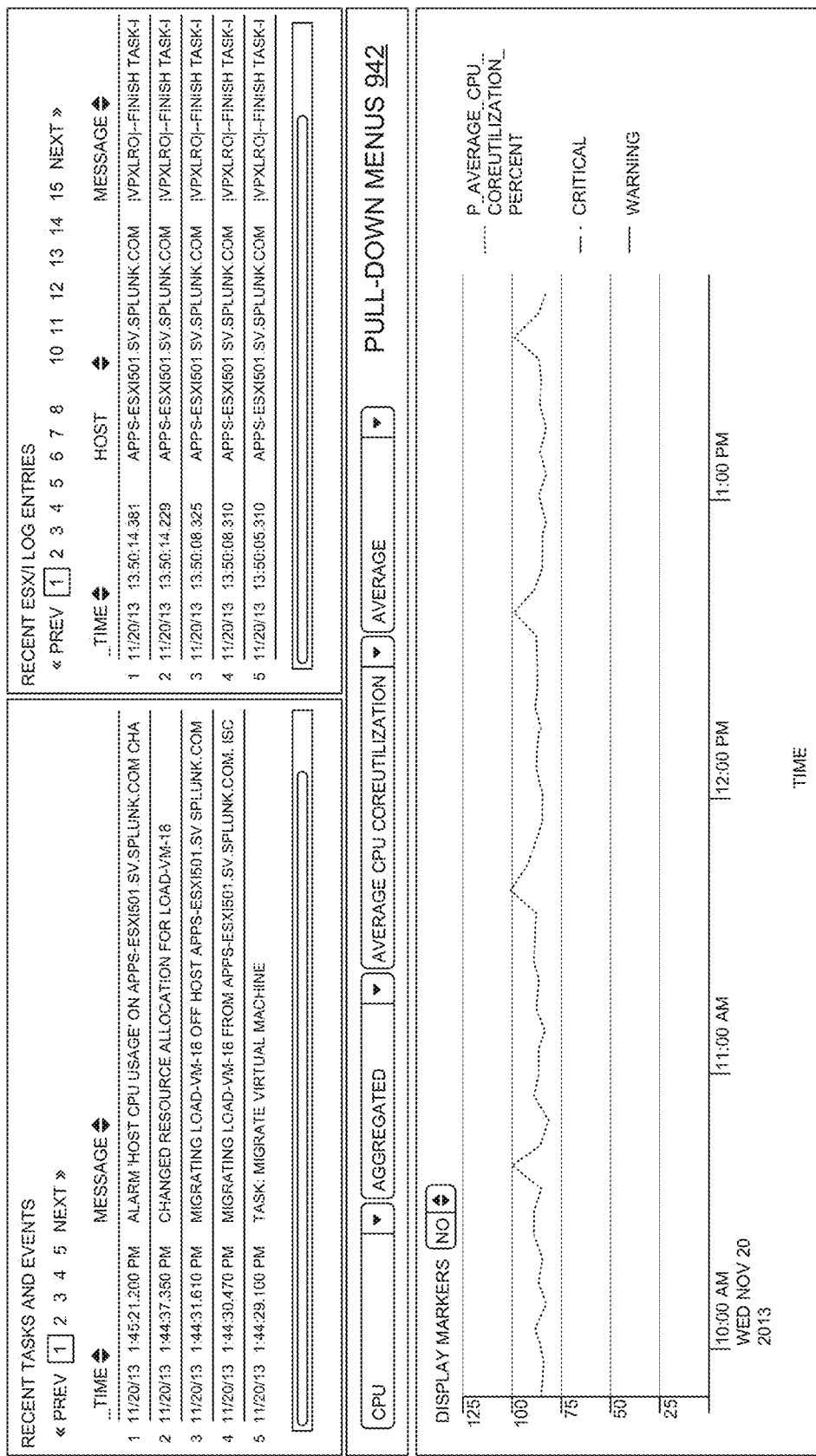
FIG. 17D is an interface diagram of an example a user interface displaying both log data and performance data, in accordance with one or more examples or implementations.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

3 Sharing Physical Data for Remote Collaboration Sessions

At least one problem with conventional approaches for multi-user collaboration of real-world environments is that devices remote to a given location have difficulty providing a complete, useful, or controllable view of the environment. For example, a host user may use a host device to share image data or video data captured by a camera at a given location. However, upon receiving the shared image data or video data, the remote user is limited to the view that is presented by the host, which in turn limits the ability of the remote user to view and interact with the physical object using the remote device. As a result, the remote user may be forced to provide instructions to a host user to reposition the camera. Further, the remote device provides limited controls for interacting with the portions of the real-world environment. Consequently, the remote user must rely on the host user to interact with physical objects on behalf of the remote user. Further, the remote user may provide standardized guidance that is overly vague, limiting the actions that the host user performs on portions of the environment. In instances where the host user cannot sufficiently guide the remote user to perform actions, the remote user must travel to the real-world environment.

Accordingly, in various implementations disclosed herein, a networked computing environment includes a host device and one or more remote devices that interact in a common remote collaboration session. In particular, a host device uses various sensors to scan a scene that is a portion of a real-world environment. For example, the host device may scan the environment using a depth sensor to acquire three-dimensional (3D) depth data, and an imaging sensor to acquire two-dimensional (2D) surface data. The host device combines correlated 2D surface data and 3D depth data into an extended reality (XR) stream and transmits the XR stream to a remote device.

The remote device receives the XR stream and renders, based on the correlated 2D surface data and 3D depth data encapsulated in the XR stream, a portion of the real-world environment for presentation at the location of the remote device. In various embodiments, the remote environment includes a digital representation of a real-world asset that is included in the real-world environment. In various embodiments, the remote device retrieves data associated with the real-world asset and presents the data within the remote environment. Further, the remote device enables the user to navigate and interact with portions of the reproduced scene independent of the portion of the scene that the host device is currently viewing. These techniques are described below in further detail in conjunction with FIGS. 18A-30.

3.1 Networked Remote Collaboration System

Figure 18A:
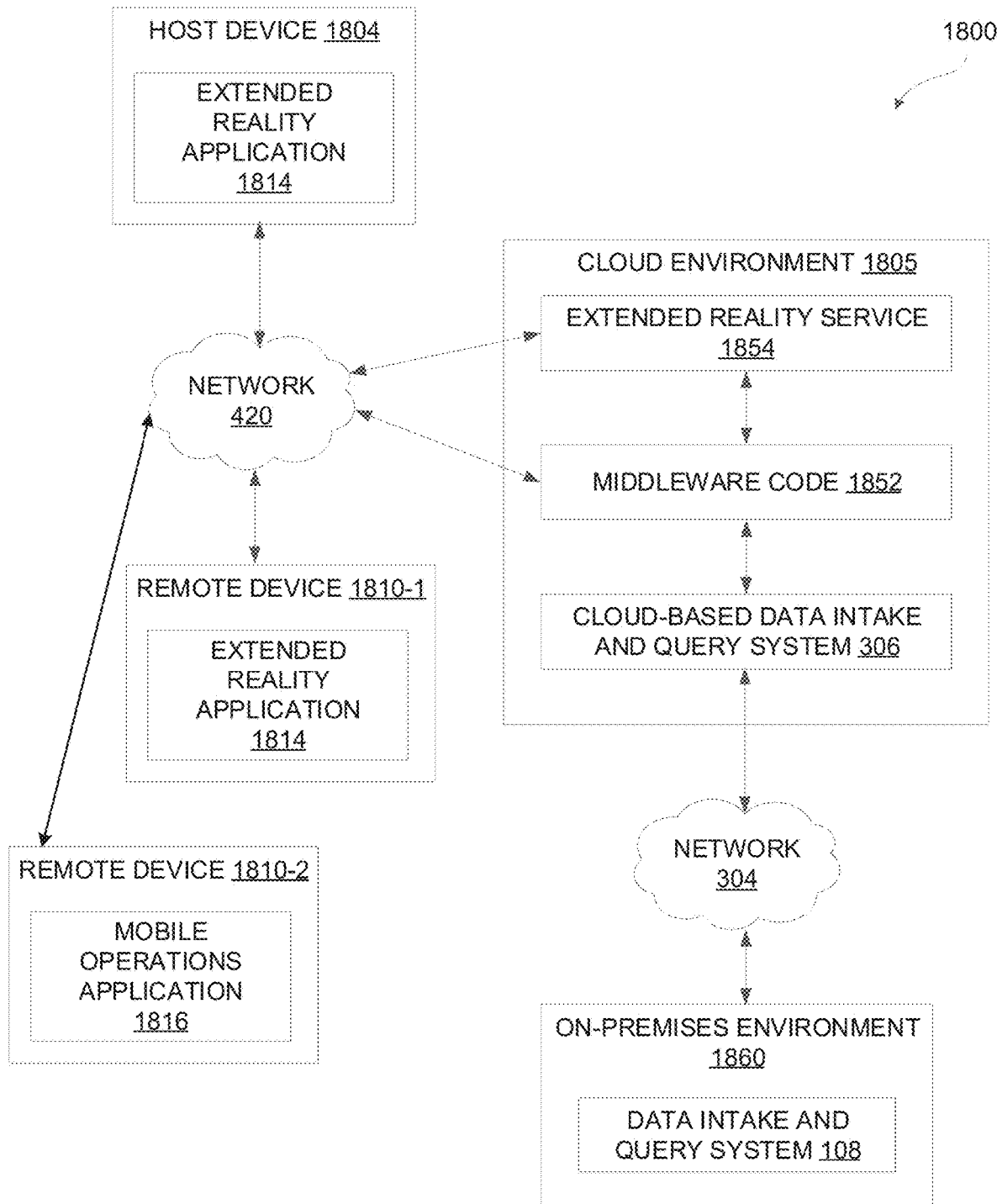
FIG. 18A illustrates a network architecture that enables secure communications between an extended reality application, a mobile operations application, and an on-premises environment for the data intake and query system, in accordance with example implementations.

FIG. 18A illustrates a network architecture that enables secure communications between an extended reality application, a mobile operations application, and an on-premises environment for the data intake and query system, in accordance with example implementations.

In various embodiments, cloud-based data intake and query system 306, executing in cloud environment 1805, may serve as a secure bridge between extended reality (XR) application 1814 and an on-premises environment 1860. In other implementations, the on-premises environment 1860 may be omitted and the entire computational process may be carried out in one or more aspects or components of cloud environment 1805. In various embodiments, cloud environment 1805 may include cloud-based data intake and query system 306, which communicates with data intake and query system 108 via network 304. Cloud environment 1805 may further include middleware code 1852 and/or push notification service 1854, which communicate with extended reality application 1814 via network 420. In various embodiments, network 304 and network 420 may be the same network or may include one or more shared network components that communicate with both network 304 and network 420.

In various embodiments, an asset (e.g., physical object, machine, particular area, etc.) may have a tag that encodes or otherwise includes data. The data in the tag includes a textual and/or numerical string that operates as a unique identifier (UID). The tag is provided by an entity that owns or operates the environment in which the asset resides. Additionally or alternatively, the entity may assign the UID to the asset without encoding the UID in a tag. Host device 1804 scans the asset and/or tags associated with the asset, determines the unique identifier for the asset and uses the unique identifier to receive field values, extracted from events, which are associated with the asset. In various embodiments, host device 1804, remote device 1810 (e.g., 1810-1, 1810-2, etc.) and/or data intake and query system 108 may generate content (e.g., schemas, dashboards, cards, and/or visualizations) based on the extracted field values.

Extended reality application 1814 and/or mobile operations application 1816 may display the content to the user via host device 1804 and/or remote device 1819. For example, XR application 1814 may generate an extended reality workspace that encapsulates the asset and presents data values that are associated with the unique identifier. Portions of the XR workspace may include panels that display the content. For example, one or more display panels may include various schemas, dashboards, cards, and/or visualizations generated from the extracted field values. In some embodiments, XR application 1814 may cause the content to be displayed in a continuous manner, as host device 1804 and/or remote device 1810 view different portions of the extended reality environment. Additionally or alternatively, the XR workspace may also include directional indicators, such as pointers at the edge of the display device, indicating the position of an asset and/or portions of the XR workspace relative to the position and/or orientation of the camera.

In this manner, a user may move through an environment and visually determine the status of various entities, such as machines, people, and/or assets, in that environment. For example, the user may be able to scan a particular asset or tag of the particular asset in order to obtain information related to the asset. Upon receiving various visualizations based on the obtained information, the user may then analyze the information to determine whether the asset needs attention, repair, or replacement.

In various embodiments, mobile operations application 1816 executing on one or more remote devices 1810 (e.g., remote device 1810-2) may present a non-XR environment that corresponds to an XR environment presented by XR application 1814. In such instances, a user may navigate the non-XR environment without physically moving remote device 1810-2. Instead, the user may select various navigation controls to change the position of mobile device 1810-2 within the non-XR environment, changing the virtual perspective of mobile device 1810-2 in relation to one or more assets included in the non-XR environment.

In some embodiments, XR application 1814 and/or mobile operations application 1816 executing on host device 1804 and/or remote device 1810 may establish secure, bidirectional communications with data intake and query system 108. For example, in some embodiments, a persistent, always-open, asynchronous socket for bidirectional communications (e.g., a WebSocket connection) through a firewall of on-premises environment 1860 may be established between data intake and query system 108 and cloud-based data intake and query system 306. Cloud-based data intake and query system 306 may then communicate with XR application 1814 and/or mobile operations application 1816 via middleware code 1852 executing in cloud environment 1805.

Additionally or alternatively, in some embodiments, cloud-based data intake and query system 306 and/or middleware code 1852 may communicate with XR application 1814 and/or mobile operations application 1816 via a push notification service 1854, such as Apple Push Notification service (APNs) or Google Cloud Messaging (GCM). For example, data intake and query system 108 may, based on the unique identifier, output to one or more devices 1804, 1810 content that includes real-time data associated with a particular asset. The content may then be presented by one or more devices 1804, 1810.

For example, mobile operations application 1816 may present the content in a window provided by remote device 1810-2. In some embodiments, XR application 1814 may display the content in relation to the real-world asset, in conjunction with an XR workspace, as discussed below in further detail. Additionally or alternatively, various playbooks, insights, predictions, annotations, and/or runbooks that include set of commands and/or simple logic trees (e.g., if-then-else) associated with an asset and possible actions (e.g., "if the operating temperature is above 100 degrees Celsius, then show options for activating fans") may be implemented and/or presented to the user.

In some embodiments, in order to authenticate an instance of XR application 1814 and/or mobile operations application 1816 associated with a particular user and/or device 1804, 1810 XR application 1814 and/or mobile operations application 1816 may present a unique identifier associated with the user and/or device 1804, 1810 on a display device (e.g., on a display of host device 1804). The user may then register the unique identifier with cloud-based data intake and query system 306 and/or data intake and query system 108, such as by entering the unique identifier into a user interface (e.g., a web portal) associated with cloud-based data intake and query system 306 or data intake and query system 108. In response, XR application 1814 and/or mobile operations application 1816 may receive credentials that can be used to access real-time data outputted by data intake and query system 108. Additional queries transmitted by the authenticated device 1804, 1810 to data intake and query system 108 may then implement the credentials associated with the unique identifier. In this manner, secure, bidirectional communications may be established between a given device 1804, 1810 and data intake and query system 108.

Once the communications connection is established, a given user may cause a given device 1804, 1810 to acquire data associated with a given asset. For example, during a remote collaboration session, host device 1804 may scan a physical space that includes an asset. Host device 1804 may retrieve a unique asset identifier (ID) that corresponds to the particular asset. Once host device 1804 obtains the unique asset ID, host device 1804 transmits queries to data intake and query system 108 requesting one or more values associated with the asset. Additionally or alternatively, remote device 1810 may receive the unique asset ID and transmit separate queries to data intake and query system 108.

For example, host device 1804 may send a request for specific field values for the asset included in a given physical space. Host device 1804 may include the unique asset ID in the request sent to data intake and query system 108. In response, data intake and query system 108 may retrieve events associated with the unique asset ID and may use extraction rules to extract values for fields in the events being searched, where the extracted values include the requested field values. Data intake and query system 108 may then transmit the field values associated with the unique asset ID to host device 1804.

In various embodiments, data intake and query system 108 may transmit the raw data retrieved from the field values included in the event data. Alternatively, data intake and query system 108 may filter, aggregate, or otherwise process the raw data prior to transmitting the field values. For example, in some embodiments, data intake and query system 108 may generate a dashboard associated with the unique asset ID. The dashboard may include a filtered subset of data values, where the subset of data values is filtered based on additional criteria, such as user role (e.g., a user role identifier value associated with the host user), location, type of device (e.g., whether host device 1804 is a smart phone, tablet, AR headset, etc.), and/or time.

XR application 1814 receives the field values from data intake and query system 108, where the field values represent the values of one or more metrics associated with the unique asset ID. In an implementation, the field values are extracted from fields that are defined post-ingestion (e.g., at search time), as has been previously described (e.g., with a late-binding schema). The field values transmitted by data intake and query system 108 may be in any technically-feasible format.

In various embodiments, data intake and query system 108 generates a dashboard that includes one or more visualizations of the underlying textual and/or numerical information based on the retrieved field values. In various embodiments, mobile operations application 1816 may display one or more visualizations included in the dashboard received from data intake and query system 108. Additionally or alternatively, XR application 1814 may generate an XR workspace that includes one or more display panels, where the one or more display panels include the visualizations included in the dashboard as a portion of the XR workspace. In some embodiments, the dashboard may also include a portion of the field values as a data set. In such instances, XR application 1814 and/or mobile operations application 1816 may generate visualizations based on the field values included in the data set.

In various embodiments, data intake and query system 108 may generate a runbook (e.g., a playbook) that includes set of commands and/or simple logic trees (e.g., if-then-else) associated with an asset and possible actions that may be implemented and/or presented to the user. In such instances, data intake and query system 108 may transmit the generated runbook to XR application 1814 and/or mobile operations application 1816 in order to present and/or run commands associated with the asset or visualizations associated with the asset. In some embodiments, data intake and query system 108 may generate a context-sensitive runbook that is only presented when a specific set of criteria are met. In such instances, XR application 1814 and/or mobile operations application 1816 may only present the context-sensitive runbook upon all of the set of criteria being met.

Figure 18B:
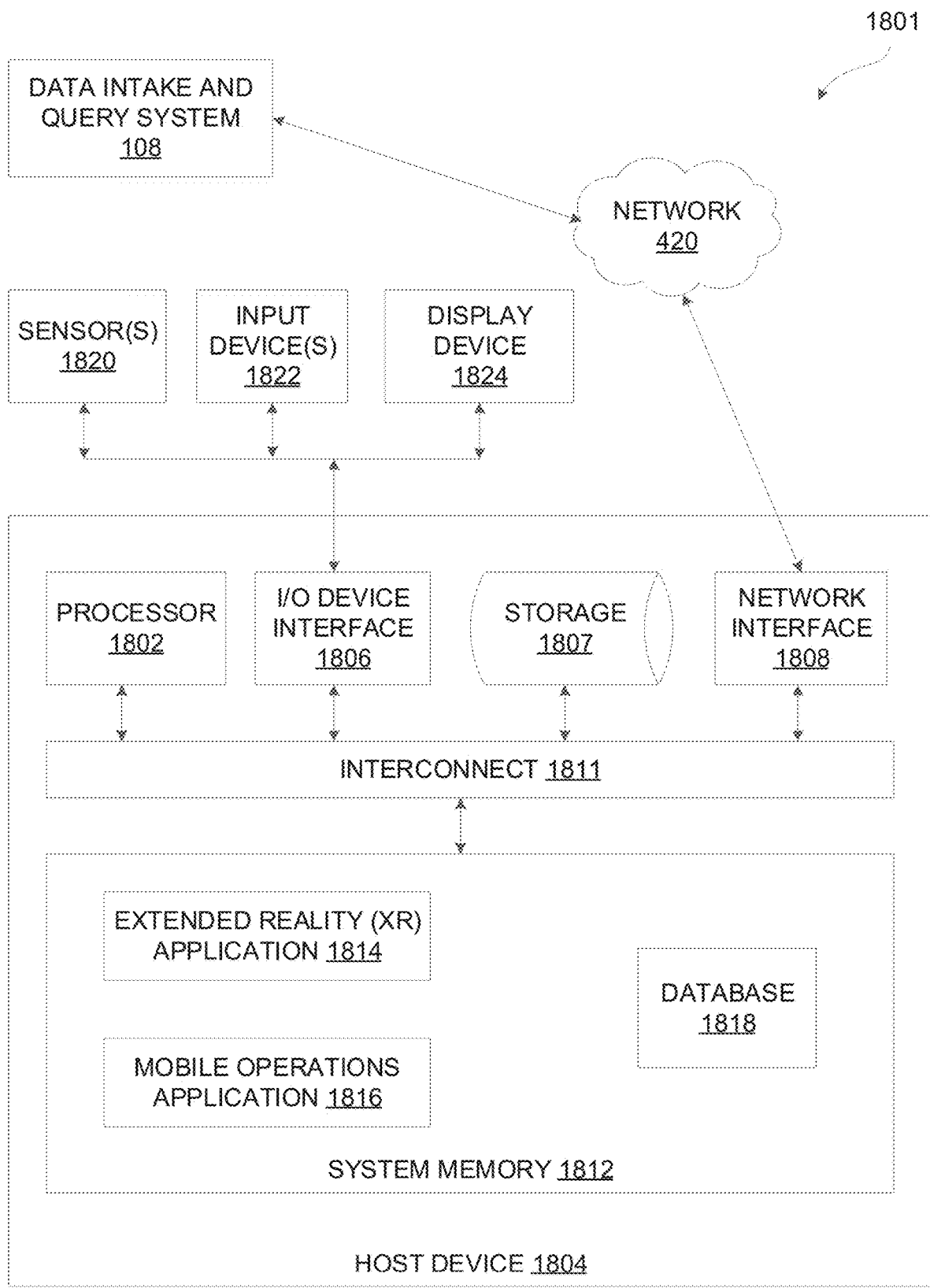
FIG. 18B illustrates a more-detailed view of the example networked computer environment of FIG. 1, in accordance with example implementations.

FIG. 18B illustrates a more-detailed view of the example networked computer environment 100 of FIG. 1, in accordance with example implementations. As shown, the networked computer environment 1801 may include, without limitation, data intake and query system 108 and host device 1804 communicating with one another over one or more networks 420. Data intake and query system 108 and host device 1804 function substantially the same as described in conjunction with FIGS. 1 and 4, except as further described herein. Examples of host device 1804 may include, without limitation, a smartphone, a tablet computer, a handheld computer, a wearable device, a virtual reality (VR) console, an augmented reality (AR) console, a laptop computer, a desktop computer, a server, a portable media player, a gaming device, and so forth.

Host device 1804 may include, without limitation, processor 1802, storage 1807, input/output (I/O) device interface 1806, network interface 1808, interconnect 1811, and system memory 1812. System memory 1812 includes extended reality (XR) application 1814, mobile operations application 1816, and database 1818. Additionally, while networked computer environment 1801 illustrates components of host device 1804, remote device 1810 may include one or more similar components to those described in relation to host device 1804.

In some implementations, host device 1804 may be a drone, or a device attached, e.g., mounted, to a drone or other carrier, and may be operated remotely (either at the site of remote device 1810, or at a separate site completely) or may operate autonomously. Such implementations may be useful where it is inconvenient or unsafe to bring a person to an actual site, e.g., in case of a biological outbreak, or high likelihood of disease transmission, or presence of fire or toxic gases, etc. In such implementations, host device 1804 and/or the carrier may be operated by a user that is remote from host device 1804, or host device 1804 may operate without user control, e.g., programmed to carry out a specific task, with varying levels of adaptability and specificity of the task dependent on the sophistication of host device 1804 and/or a carrier of host device 1804, e.g., a drone. In some implementations, host device 1804 may be set to keep its sensors on, or toggled on and off, and then mounted to a carrier that is controlled remotely, e.g., a drone.

In general, processor 1802 may retrieve and execute programming instructions stored in system memory 1812. Processor 1802 may be any technically-feasible form of processing device configured to process data and execute program code. Processor 1802 may be, for example, a central processing unit (CPU), a graphics processing unit (GPU), an application-specific integrated circuit (ASIC), a field-programmable gate array (FPGA), and so forth. Processor 1802 stores and retrieves application data residing in the system memory 1812. Processor 1802 is included to be representative of a single CPU, multiple CPUs, a single CPU having multiple processing cores, and the like. In operation, processor 1802 is the master processor of client device 404, controlling and coordinating operations of other system components.

System memory 1812 stores software application programs and data for use by processor 1802. For example, system memory 1812 may include, without limitation, extended reality application 1814, mobile operations application 1816, and/or database 1818. Processor 1802 executes software application programs stored within system memory 1812 and optionally an operating system. In particular, processor 1802 executes software and then performs one or more of the functions and operations set forth in the present application.

Storage 1807 may be a disk drive storage device. Although shown as a single unit, the storage 1807 may be a combination of fixed and/or removable storage devices, such as fixed disc drives, floppy disc drives, tape drives, removable memory cards, or optical storage, network attached storage (NAS), or a storage area-network (SAN). Processor 1802 communicates to other computing devices and systems via network interface 1808, where network interface 1808 is configured to transmit and receive data via one or more communications networks 420.

Interconnect 1811 facilitates transmission, such as programming instructions and application data, between processor 1802, input/output (I/O) device interface 1806, storage 1807, network interface 1808, and system memory 1812. I/O device interface 1806 is configured to receive input data from user I/O devices. These I/O devices include, without limitation, sensor(s) 1820 (e.g., one or more cameras, location sensor(s), etc.), input device(s) 1822 (e.g., a keyboard, stylus, microphone, etc.), and/or a display device 1824. Display device 1824 generally represents any technically-feasible means for generating an image for display. For example, display device 1824 may be a liquid crystal display (LCD) display, organic light-emitting diode (OLED) display, or a digital light processing (DLP) display. Camera 1820 acquires images via a lens and converts the images into digital form. The images acquired by the camera 1820 may be stored in storage 1807 and/or system memory 1812. An acquired image may be displayed on the display device 1824, either alone or in conjunction with one or more other acquired images, graphical overlays, and/or other data.

Sensor(s) 1820 enable host device 404 to acquire sensor data that enable one or more applications to perform various operations. For example, sensor(s) 1820 may include location sensors that enable host device 1804 to determine a specific physical location and/or orientation. In some embodiments, location sensor(s) 1820 may include a network-based sensor that communicates with data intake and query system 108 via one or more network(s) 420, which may be part of a production-monitoring network. In some embodiments, location sensor(s) 1820 may include a network-based sensor that communicates with one or more data intake and query systems 108 via a local area network and/or a wide area network. In various embodiments, the production-monitoring environment may include multiple assets and/or multiples devices 1804, 1810 each of which may communicate with data intake and query system 108, and each of which is capable of identifying one or more assets within a real-world environment based on identifier tags, geofences, and/or any other object-identification technique disclosed herein.

In various embodiments, sensor(s) 1820 may include various imaging sensors that acquire sensor data relating to the real-world environment. For example, host device 1804 may include one or more cameras that scan a given physical space and acquire two-dimensional (2D) data of surfaces of the physical space. Additionally or alternatively, sensor(s) 1820 may include one or more depth cameras that scan the given physical space and acquire three-dimensional (3D) data of the physical space. In some embodiments, host device 1804 may process the 2D data and/or 3D data in order to identify assets included in the physical space.

Input device(s) 1822 include one or more devices that receive inputs from the user and/or other devices. For example input device(s) 1822 may include a microphone that acquires audio signals for storage and analysis. Additional examples of I/O device(s) 1822 (not explicitly shown) may include one or more buttons, a keyboard, and a mouse or other pointing device. I/O device interface 1806 may also include an audio output unit configured to generate an electrical audio output signal, and the additional user I/O devices may further include a speaker configured to generate an acoustic output in response to the electrical audio output signal.

Figure 19:
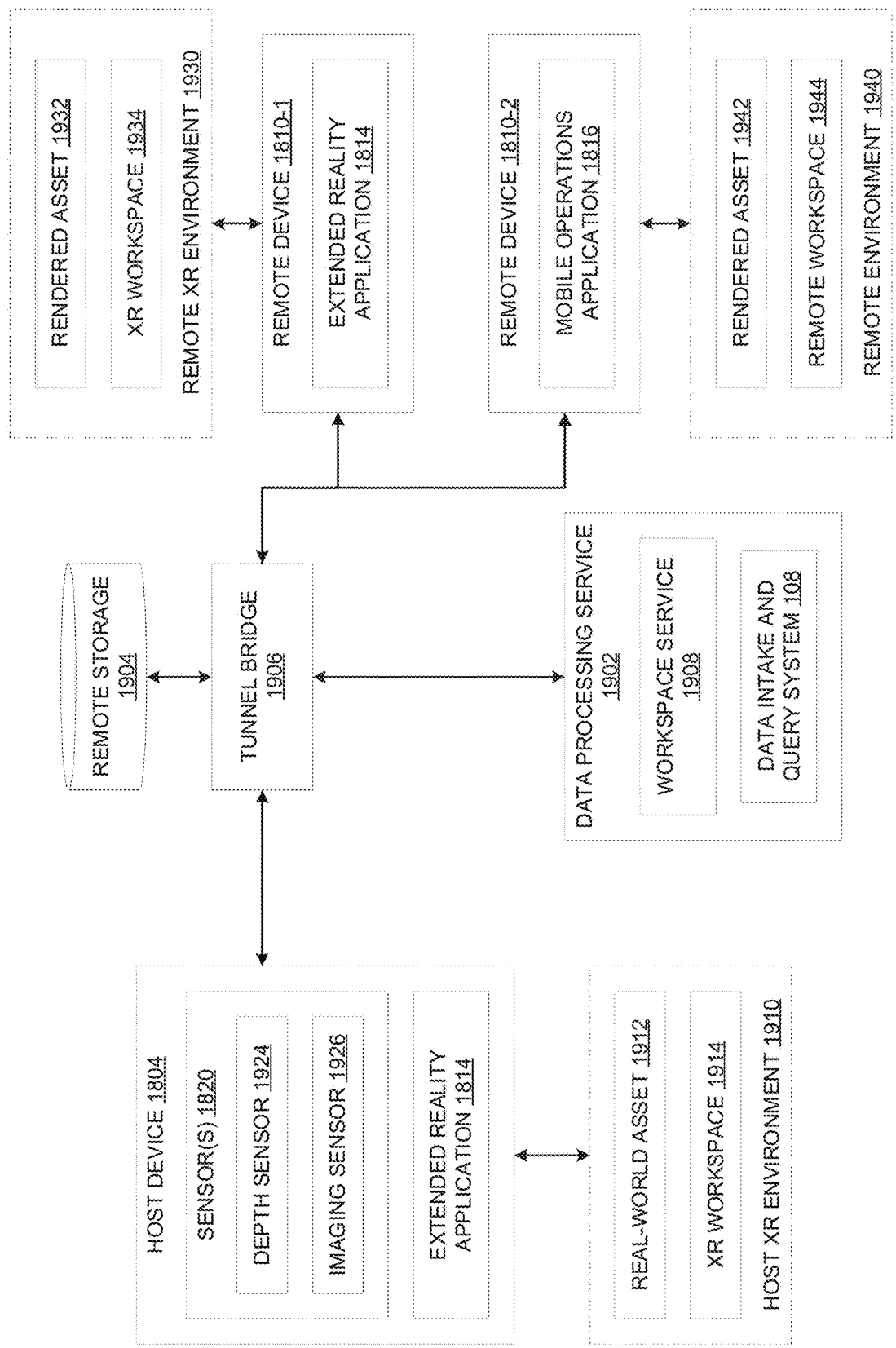
FIG. 19 illustrates a block diagram of an example networked computer environment of FIG. 1, in accordance with example implementations.

FIG. 19 illustrates a block diagram of an example networked computer environment 1900, in accordance with example implementations. As shown, a networked computer environment 1900 may include, without limitation, host device 1804, one or more remote devices 1810, data processing service 1902, remote storage 1904, tunnel bridge 1906, host extended reality (XR) environment 1910, remote XR environment 1930, coupled to remote device 1810-1 and remote environment 1940 coupled to remote device 1810-2. Host device 1804 includes depth sensor 1924, imaging sensor 1926, and XR application 1814. Host XR environment 1910 includes real-world asset 1912 and XR workspace 1914. Remote XR environment 1930 includes rendered asset 1932 and XR workspace 1934. Remote environment 1940 includes rendered asset 1942 and remote workspace 1944. Data processing service 1902 includes workspace service 1908 and data intake and query service 108.

In various embodiments, host device 1804 functions substantially the same as client device 102, 404 described in conjunction with FIGS. 1 and 4, except as further described herein. Examples of host device 1804 may include, without limitation, a smartphone, a tablet computer, a handheld computer, a wearable device, an XR console, a laptop computer, a desktop computer, a server, a portable media player, a gaming device, and so forth. In some embodiments, host device 1804 executes one or more applications that present, compute, or generate data based on data received from data processing service 1902. In some embodiments, host device 1804 may include, without limitation, smartphones, tablet computers, handheld computers, wearable devices, laptop computers, desktop computers, servers, portable media players, gaming devices, an Apple TV® devices, and so forth.

For example, host device 1804 may execute an extended reality (e.g., augmented reality (AR), mixed reality (MR), and/or virtual reality (VR)) application, which presents a portion of a real-world environment, performance metrics associated with assets in the real-world environment, and/or other data as provided by data intake and query system 108 and/or data processing application 1902. In various embodiments, XR application 1814 included in host device 1804 may generate host XR environment 1910 based on sensor data acquired from sensor(s) 1820. For example, XR application 1814 may include imaging data acquired by imaging sensor 1926 when generating host XR environment 1910.

Sensor(s) 1820 includes various sensors that acquire data about the real-world environment. In various embodiments, host device 1804 may include sensor(s) 1820. For example, host device 1804 that includes depth sensor 1924 and imaging sensor 1926. Additionally or alternatively, host device 1804 may control one or more sensor(s) 1820 that are communicatively coupled to host device 1804. For example, host device 1804 may be a desktop computer that controls the movement and operation of one or more wireless cameras. In various embodiments, sensor(s) 1820 may include additional sensors, such as audio sensors, position sensors (e.g., an accelerometer and/or an inertial measurement unit (IMU)), motion sensors, and so forth.

Depth sensor 1924 includes one or more sensors that acquire sensor data relating to the depth of objects within an environment. For example, depth sensor 1924 may be one or more (e.g., camera array) light detection and ranging (LiDAR) cameras that generate depth information based on reflected light. In various embodiments, depth sensor 1924 generates depth sensor data using on or more depth imaging techniques, such as triangulation, structured light imaging, time-of-flight imaging, stereo imaging, laser scan, and so forth. In some embodiments, host device 1804 may compute various depth properties of the environment using the sensor data and generate 3D depth data that includes the computed depth properties. Additionally or alternatively, host device 1804 may transmit the 3D depth data to remote device(s) 1810 for further processing. In some embodiments, depth sensor 1924 may include one or more infrared sensors, time-of-flight depth sensors, stereo depth sensors, audio depth sensors (e.g., RADAR sensors, sonograms, etc.), and so forth.

Imaging sensor 1926 includes one or more optical sensors, such as RGB cameras, infrared cameras, and/or camera arrays, which includes two or more of such cameras. Other imaging sensors may include imagers and/or lasers sensors. In various embodiments, host device 1804 may generate 2D surface data from the image sensor data acquired by imaging sensor 1926.

In various embodiments, host device 1804 may provide updates to the imaging data (e.g., depth sensor data and image sensor data) associated with real-world environments. For example, host device 1804 may update the 2D surface data and the 3D depth data associated with a real-world environment by re-scanning the real-world environments (e.g., re-scanning every 10 seconds) using imaging sensor 1926 and depth sensor 1924. Such re-scanning may be triggered in multiple ways. For example, host device 1804 may be triggered to attempt a rescan at periodic intervals (e.g., a setting to attempt a rescan every 20 seconds, every 5 minutes. etc.), in response to a change in the location of host device 1804, and/or in response to actions taken by remote device 1810 (e.g., receiving a message requesting a re-scan). Additionally or alternatively, host device 1804 may receive a user input to rescan a portion of the environment. In such instances, host device 1804 may acquire new depth sensor data from depth sensor 1924 and image sensor data from imaging sensor 1926 in response to the user input.

XR application 1814 included in host device 1804 acquires environmental data for the real-world environment for use in a remote collaboration session. In various embodiments, XR application 1814 may receive the depth sensor data and image sensor data and generate respective 3D depth data and 2D surface data. In such instances, XR application 1814 may combine correlated 3D depth data and 2D surface data to generate an XR stream and transmit the XR stream to one or more recipients (e.g., remote devices 1810, remote storage 1904, etc.). In some embodiments, XR application 1814 may generate an adaptable 3D representation of the real-world environment (e.g., determining coordinates corresponding to the 3D depth data and/or 2D surface data and storing the set of coordinates as a scene) corresponding to a scene of the physical space and transmit the adaptable 3D representation to one or more recipients.

In some embodiments, host device 1804 may convert the adaptable 3D representation of the real-world environments, included in the XR stream, into geometry data that represents the scene being shared by host device 1804. In such embodiments, host device 1804 may convert correlated 3D depth data and 2D depth data into coordinate-based sets of vertices, edges, and textures. Host device 1804 may then group the sets of vertices, edges, and textures into geometry data for other devices to reconstruct. In some embodiments, host device 1804 may set an anchor point as the origin of a scene and may determine coordinate data (e.g., x-axis, y-axis, and z-axis coordinates) from the anchor point for portions of the 3D depth data and/or 2D surface data. Based on the determined coordinates, host device 1804 may convert the 2D surface data and/or the 3D depth data into a set of vertices at specific coordinates, a set of faces comprising edges between pairs of vertices, and texture data for specific coordinates.

For example, host device 1804 may convert determined coordinates for portions of 3D depth data included in the XR stream. Host device 1804 may then use the coordinates to determine sets of triangles that form faces of a combined mesh. A given triangle may have vertices defined as coordinates that have the anchor point as an origin. Host device 1804 may also convert the 2D surface data into one or more sets of textures, where a given texture corresponds to a specific face, by correlating the image data from the image sensor to the depth data. In various embodiments, remote device 1810 may render the scene by generating meshes that have faces formed by the triangles included in the geometry data. Remote device 1810 may then apply textures to the corresponding faces (e.g., fill a triangle with the texture that has the corresponding coordinates).

In some embodiments, XR application 1814 may generate the XR stream for a real-time remote collaboration session. In such instances, XR application 1814 may first determine a correlation between the 3D depth data and the 2D surface data. In some implementations, the 2D surface data is clipped to match the 3D depth data, and the relative locations of the 2D surface data and the 3D depth data are correlated such that the 2D surface data may be made into texture data that can be applied to the 3D depth data. For example, XR application 1814 may determine that a section of the 2D surface data shares common coordinates with a section of the 3D depth data. Based on the correlation between the 3D depth data and the 2D surface data, XR application 1814 may combine the 3D depth data and the 2D surface data to generate the XR stream. Host device 1804 may then transmit the XR stream via tunnel bridge 1906 to remote devices 1810 for reproduction. In some embodiments, the XR stream includes rendered assets 1932, 1942, which are digital reproductions of real-world asset 1912 included in the real-world environment. Alternatively, remote device 1810-1 may use data included in the XR stream to generate rendered asset 1932 (e.g., a 3D model of real-world asset 1912) in remote XR environment 1930, while remote device 1810-2 may use data included in the XR stream to generate rendered asset 1942 (e.g., a 2D model of real-world asset 1912) in remote environment 1940.

Host XR environment 1910 includes real-world asset 1912 and XR workspace 1914. In various embodiments, XR application 1814 produces host XR environment 1910 for presentation via a display device associated with host device 1804. For example, XR application 1814 may generate host XR environment 1910 and present a portion of host XR environment 1910 via display device 1824. In such instances, host device 1804 may present at least a portion of real-world asset 1912.

In some embodiments, XR application 1814 may generate an XR workspace 1814 that includes one or more augmented reality (AR) elements. Such AR elements may include one or more display panels that are associated with portions of the environment. For example, real-world asset 1912 may be registered with data processing service 1902 and may stream data to data processing service 1902, where data processing service 1902 ingests and stores the data via data intake and query system 108. When generating XR workspace 1914, XR application 1814 may send one or more queries to receive data values, dashboards, playbooks, and so forth, to present within XR workspace 1914. Any AR elements may be included, such as panels that display the content (e.g., schemas, dashboards, cards, and/or visualizations generated from the extracted field values), directional indicators (e.g., pointers at the edge of the display device indicating the position of portions of the AR workspace relative to the position and/or orientation of imaging sensor 1926). Other example AR elements include a full graphics overlay, a partial graphics overlay, text data (e.g., alerts, runbooks, playbooks, etc.), numerical data, color information, and/or icon data (e.g., a skull-and-crossbones symbol indicating that a machine that has failed), and/or one or more virtual objects.

In various embodiments, XR workspace 1914 may include various collaboration tools that enable the user to interact with portions of the host XR environment 1910. For example, XR workspace 1914 may include graphical pointers that highlight a small portion of the host XR environment 1910. Other collaboration tools may include, for example, a color palette, a map of host XR environment 1910, a set of highlight pins, and so forth. In some embodiments, XR application 1814 may provide a specific set of AR elements based on the user of host device 1804. For example, a user may be associated with a user identifier, role identifier and/or other criteria that correspond to a specific XR workspace 1914. In such instances, XR application 1814 may generate XR workspace 1914 based on the specific criteria associated with the host user.

Remote device(s) 1810 (e.g., 1810-1, 1810-2, etc.) functions substantially the same as client device 102, 404 described in conjunction with FIGS. 1 and 4, except as further described herein. Examples of remote device 1810 may include, without limitation, a smartphone, a tablet computer, a handheld computer, a wearable device, an XR console, a laptop computer, a desktop computer, a server, a portable media player, a gaming device, and so forth. In some embodiments, host device 1804 executes one or more applications that present, compute, or generate data based on data received from data processing service 1902. In some embodiments, host device 1804 may include, without limitation, smartphones, tablet computers, handheld computers, wearable devices, laptop computers, desktop computers, servers, portable media players, gaming devices, an Apple TV® devices, and so forth. It is noted that "remote" in this context means located at a different location, relative to host device 1804. In various embodiments, what constitutes "remote" may differ based on the use case, but no minimum or maximum distance is specified here or required. There may be implementations in which remote device 1810 is in the next room from the host device, or implementations where the remote device is thousands of miles away.

In various embodiments, remote device 1810 may generate a digital reproduction of a portion of the real-world environment based on data included in the XR stream provided by host device 1804. In some embodiments, remote device 1810 may receive the XR stream as a set of serialized chunks that are below a specific data size (e.g., below 1 MB). In such instances, remote device 1810 may combine the set of serialized chunks into the XR stream and retrieve data from the XR stream.

Remote device 1810-1 executes an instance of XR application 1814 to generate remote XR environment 1930. In various embodiments, XR application 1814 may extract the 3D depth data and the 2D surface data included in the XR stream and may generate an adaptable 3D representation of the real-world environment. The adaptable 3D representation corresponds to the scene of the physical space and may include rendered asset 1932, which is a digital representation of real-world assets 1912 that is included in the real-world environment. XR application 1814 may also generate an XR workspace 1934 within remote XR environment 1930. In some embodiments, remote device 1810-1 may also render one or more portions of a background that correspond to areas proximate to real-world asset 1912 (e.g., the texture of the floor surrounding real-world asset 1912).

While in some embodiments, XR workspace 1934 may be the same as XR workspace 1914, in other embodiments, XR workspace 1934 may be different. For example, in some embodiments, XR workspace 1934 may include different AR elements than AR elements included in the XR workspace 1914 included in the host XR environment 1910. For example, a technician may operate host device 1804, where XR workspace 1914 includes a first set of display panels, while an expert may operate remote device 1810-1, where XR workspace 1934 includes a second set of display panels. XR workspaces 1914, 1934 may differ based on a number of different factors, for example, XR workspaces 1914, 1934 may be adjusted based on a type of remote device 1810-1, or based on a user or a profile of a user that operates the various devices 1804 and 1810. For example, a local technician operating host device 1804 may not have sufficient access to see certain XR environment information, so those informational elements may be blocked or otherwise not shown in XR workspace 1914, but may be visible to a higher-privileged user or user role of a user working in XR workspace 1934 in remote device 1810.

In other implementations, the system may be designed to simplify the information displayed in XR workspace 1914 to more clearly illustrate the instructions and information given to the user of host device 1804. In some embodiments, such access control and XR environment decisions may be made by data processing service 1902. In other embodiments, data processing service 1902 may send the same environments to host devices 1804 and 1810, and the respective XR applications 1814 of host device 1804 and 1810 may perform some processing to determine what elements to display in XR workspaces 1914 and 1934, respectively. In still other embodiments, it may be a combination of data processing serviced 1902 and extended reality applications 1814, working in concert at various times, to determine the specific layouts and elements of XR workspaces 1914 and 1934. In various embodiments, remote device 1810-1 may generate remote XR environment 1930 in real time.

In various embodiments, XR application 1814 may provide controls that enable the remote user to navigate remote XR environment 1930 independent of the position of host device 1804. In various embodiments, host device 1804 may initially scan a portion of the real-world environment that includes real-world asset 1912. Host device 1804 may provide the 3D depth data and 2D surface data in the XR stream, where XR application 1814 generates a scene that is a digital reproduction of the scanned portion. Upon generating the scene, XR application 1814 may respond to navigation inputs (e.g., physically moving remote device 1810-1, applying navigation inputs) by changing the viewing position of remote device 1810-1 within the remote XR environment 1930 and presenting a different portion of the scene.

In various embodiments, XR application 1814 in remote device 1810 may receive data from the XR stream based on host device 1804 rescanning at least a portion of the real-world environment. In such instances, XR application 1814 may update the remote XR environment 1930 by re-generating the corresponding portion of the digital representation of the updated portion while maintaining the digital representation of the non-updated portions. In some embodiments, XR application 1814 may first compare the differences between the existing scene and the updated 2D surface data and 3D depth data and may only regenerate the scene upon the determining that the changes are above a threshold level.

In some embodiments, XR application 1814 may generate rendered asset 1932 by combining portions of the 3D depth data and 2D surface data included in the XR stream. For example, XR application 1814 may apply a portion of the 2D surface data as a texture to a corresponding portion of the 3D depth data. In some embodiments, XR application 1930 may separate rendered asset 1932 from other portions of the scene. Alternatively, remote device 1810-1 may combine the 3D depth data and 2D surface data included in the XR stream. In such instances, XR application 1814 may generate the scene without specifically identifying rendered asset 1932.

XR workspace 1934 includes one or more augmented reality elements, such as dashboards and other interaction and/or collaboration tools. In various embodiments, when generating XR workspace 1934, XR application 1814 included in remote device 1810-1 may send one or more queries (via tunnel bridge 1906) to receive data values, dashboards, playbooks, and so forth, to present within XR workspace 1934. Additionally or alternatively, XR workspace 1934 may include various collaboration tools that enable the remote user to interact with portions of the remote XR environment 1810. In such instances, XR application 1814 may transmit data to data processing service 1902 and/or host device 1804 based on the identified interaction.

In one example, the remote user may use the color palette interaction tool to change the color of a specific portion of rendered asset 1932 (e.g., changing the color of a non-functioning fan). XR application 1814 may send data to host device 1804 that causes the host XR workspace 1914 to add highlighted region 2816 over the corresponding portion of real-world asset 1912. In another example, XR application 1814 may receive an input that requests updated data for a display panel included in XR workspace 1934. XR application 1814 may then respond to the data request by sending a query to data processing service 1902 that processes the data query via data intake and query service 108.

In some embodiments, remote device 1810 may generate an environment for remote collaboration other than an extended reality environment. For example, a remote user may use a web browser to view a two-dimensional reproduction of the real-world environment. In such instances, remote device 1810-2 may execute a different application (e.g., mobile operations application, a web browser, a VR application, etc.) to view a non-XR environment. In some embodiments, remote device 1810-2 may generate a non-XR remote environment 1940 while remote device 1810-1 generates remote XR environment 1930. In some such environments, in which remote device 1810-2 is a non-XR environment, the XR environment that would have been displayed may be translated into a non-XR environment to the extent possible, e.g., multimedia files may be displayed as popups, text may be displayed as tooltips, runbooks may be executed on mouse button click, or any combination thereof.

In various embodiments, mobile operations application 1816 may enable a different remote user to navigate and interact with remote environment 1940 independent of host device 1804 and/or remote device 1810-1. For example, after mobile operations application 1816 generates remote environment 1940, mobile operations application 1816 may provide navigational controls that enable the remote user to change the position of remote device 1810-2 within remote environment 1940 independent of the position of host device 1804.

Mobile operations application 1816 generates remote environment 1940, where remote environment 1940 includes rendered asset 1942 and remote workspace 1944. In some embodiments, rendered asset 1942 may have a different format than rendered asset 1932. For example, rendered asset 1932 may be a 3D mesh representation of real-world asset 1912, while rendered asset 1942 may be a 2D photograph or icon of real-world asset 1912, or a flattened version of the 3D mesh representation of real-world asset 1912. Mobile operations application 1816 also generates remote workspace 1944. In some embodiments, remote workspace 1944 includes display panels and/or interaction tools within an adaptable 3D representation of the real-world environment. Alternatively, remote workspace may include display panels and/or interaction tools that are positioned outside the adaptable representation. For example, remote environment 1940 may present the adaptable representation of the real-world environment in a first window, and present one or more display panels, displaying data associated with the real-world asset, in a second window.

Data processing service 1902 processes data associated with a remote collaboration session. In various embodiments, data processing asset 2002 includes a workspace service 1908 that manages actions performed by host device 1804 and/or remote device(s) 1810 in relation to the remote collaboration session. Data intake and query system 108 manages the retrieval and transmission of data values associated with one or more real-world assets 1912 included in the real-world environment.

In various embodiments, data processing service 1902 receives data from one or more real-world assets 1912. In some embodiments, data processing service 1902 may be a data ingestion application, such as a data stream processor (DSP) that ingests sensor data transmitted by one or more real-world assets 1912 in real time. In such instances, data processing service 1902 may generate a processed data set and transmit the processed data set to data intake and query system 108 for storage in one or more data stores. Additionally or alternatively, data processing service 1902 responds to data requests by retrieving field values via the data intake and query system 108, where the field values represent the values of one or more metrics associated with a particular real-world asset 1912. In an implementation, the field values are extracted from fields that are defined post-ingestion (e.g., at search time), as has been previously described (e.g., with a late-binding schema). The field values transmitted by data intake and query system 108 may be in any technically-feasible format.

In various embodiments, data intake and query system 108 generates a dashboard that includes one or more visualizations of the underlying textual and/or numerical information based on the retrieved field values. In various embodiments, the dashboard may present in one or more visualizations included in the dashboard received from data intake and query system 108. One or more workspaces 1914, 1934, 1944 include one or more display panels that present the visualizations included in the dashboard. In some embodiments, the dashboard may also include a portion of the field values as a data set. In such instances, XR application 1814 and/or mobile operations application 1816 may generate visualizations based on the field values included in the data set.

Workspace service 1908 manages actions performed by host device 1804 and/or remote device(s) 1810 in relation to the remote collaboration session. In various embodiments, one or more remote devices 1810 may register or subscribe to receive the XR stream generated by host device 1804 for a given remote collaboration session. In such instances, workspace service 1908 may cause data chunks corresponding to the XR stream to be transmitted to subscribed recipients. Additionally or alternatively, workspace service 1908 may cause the XR stream and/or other interaction data (e.g., recorded audio, actions performed by host device 1804 and/or remote device(s) 1810) to be stored in remote storage 1904. In some embodiments, workspace service 1908 may send notifications to a target recipient (e.g. remote device 1810-1) to join a remote collaboration session.

Remote storage 1904 includes one or more data stores that store information associated with a remote collaboration session. In various embodiments, host device 1804 may transmit the XR stream to remote storage 1904, where remote storage stores the XR stream as a combination of 2D surface data and 3D depth data. In such instances, the stored 2D surface data and 3D depth data is much smaller in data size than an equivalent high-definition video clip. Remote storage 1904 may also store other data associated with the XR stream. For example, remote storage 1904 may receive and store one or more activity logs from host device 1804 and/or remote devices 1810. In some embodiments, remote storage 1904 may store an initial set of data chunks and subsequent sets of update chunks. In such instances, subsequent update data chunks may overwrite previous update chunks.

In some embodiments, a device may subsequently download data from remote storage 1904 and may replay the remote collaboration session. In such instances, the device may navigate the adaptable 3D representation of the real-world environment, as well as view actions performed by participants, e.g., as recorded in the activity log. For example, a quality assurance technician may replay the remote collaboration session to determine how experts explained an issue during a recorded remote collaboration session by viewing how an expert, e.g., a user operating remote device 1810-1, identified an issue and used the interaction tools to notify other participants during the recorded remote collaboration session.

In some embodiments, the XR workspace 1934 may be stored as part of the remote collaboration session. In other embodiments, when the remote collaboration session is played back, the system may contact data processing service 1902 and re-generate the XR workspace 1934 as part of the playback. In such implementations, XR workspace 1934 may show the data, e.g., data from dashboards, as it appeared when the remote collaboration session was created. In other implementations, XR workspace 1934 may show a same or similar XR workspace 1934 as when the remote collaboration session was created, but updated with all or partial new data from the time that the remote collaboration session is played back. These features can be toggled or changed when the remote collaboration session is played back, depending on the use case, for example, some use cases may want to see the XR workspace 1934 data the same as when the session was created, e.g., for security incidents or other instances where the session is to be replayed exactly or stored for audit purposes. In other use cases, the remote collaboration session may show updated data, such as when an unskilled technician wants to view the session with updated data, e.g., to check on the status of an industrial IoT (Internet of Things) environment, such as a factory floor, assembly line, or any other connected workspace, e.g., an airport security area.

Tunnel bridge 1906 is a device that establishes communications with one or more devices included in the networked computer environment 1900. For example, tunnel bridge 1906 may establish one or more WebSocket connections with host device 1804, remote devices 1810, data processing service 1902, and/or remote storage 1904. In some embodiments, tunnel bridge 1906 may be a trusted service that establishes trust with one or more devices in order to establish secure WebSocket connections with such devices. In some embodiments, tunnel bridge 1906 may perform authentication operations with other devices in order to establish trust, and may then establish secure communications channels with the other devices, where tunnel bridge 1906 and/or other devices and transmit secure communications using the secure communications channels.

In some embodiments, tunnel bridge 1906 enables E2EE communications between two separate devices by forwarding one or more encrypted data packets without fully decrypting the encrypted data packet. For example, tunnel bridge 1906 may receive an encrypted data packet that was encrypted and signed using multiple encryption keys. The trusted tunnel bridge 1906 may determine whether the encrypted data packet was validly signed with one of the encryption keys without decrypting the encrypted data packet.

Figure 20:
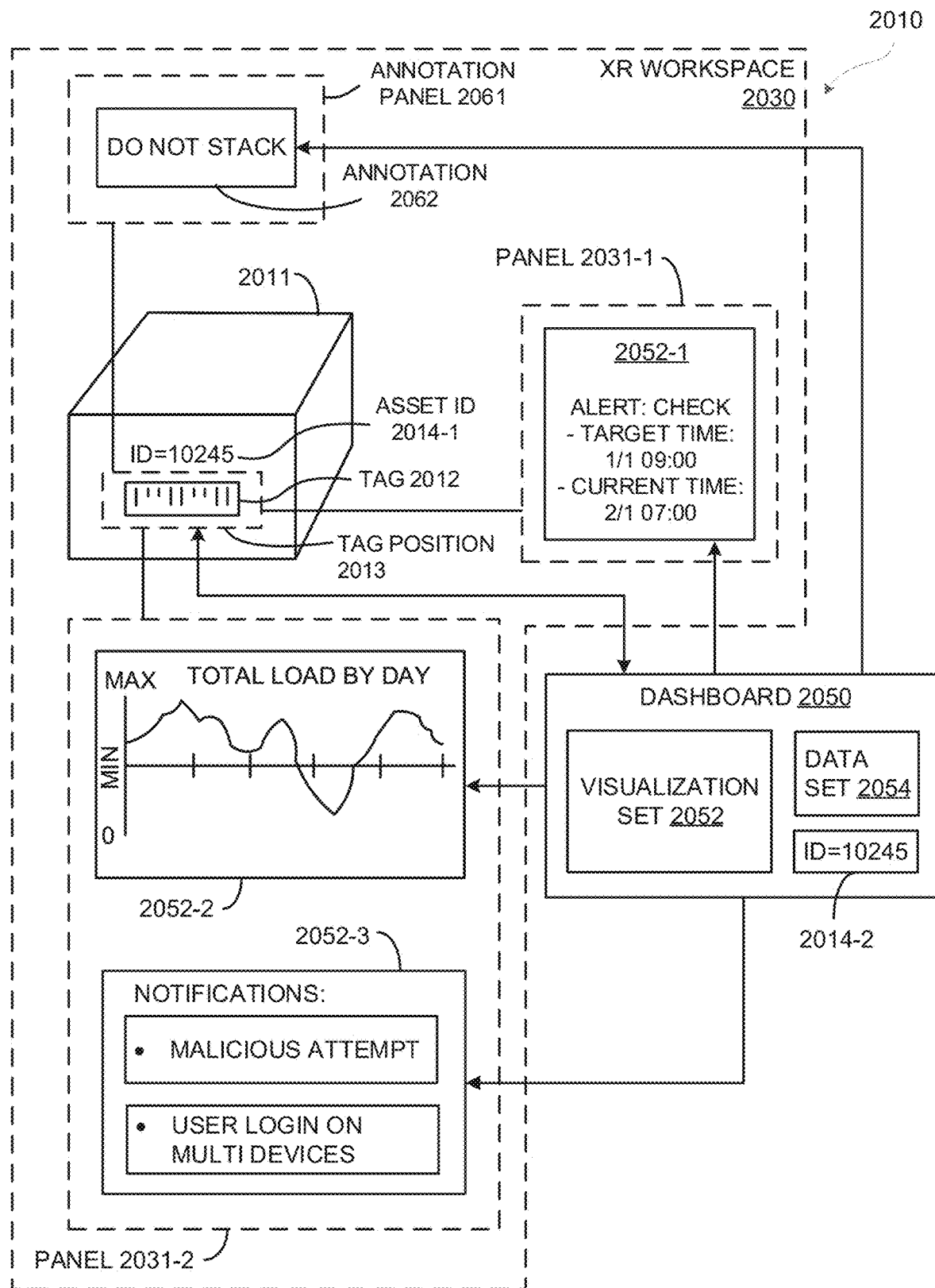
FIG. 20 illustrates an example extended reality environment that presents information using the networked computer environment, in accordance with example implementations.

FIG. 20 illustrates an example extended reality environment that presents information using the networked computer environment, in accordance with example implementations. As shown, remote collaboration system 2010 includes asset 2011, XR workspace 2030, and dashboard 2050. Asset 2011 includes tag 2012 that includes unique asset ID 2014 at tag position 2013. XR workspace 2030 includes a plurality of panels 2031 (e.g., 2031-1, 2031-2) and/or annotation panel(s) 2061. Dashboard 2050 includes visualization set 2052, data set 2054, and a copy of unique asset ID 2014-2.

In various embodiments, XR application 1814 may identify a given asset 2011 that has been registered with data processing service 1902, where data intake and query service 108 ingests and stores sets of data values associated with the asset (e.g., performance metrics associated with the operation of asset 2011). In some embodiments, XR application 1814 generates XR workspace 2030 within a given environment (e.g., host XR environment 1910, remote XR environment 1930, etc.) and presents various images in one or more panels 2031 within XR workspace 2030 on display device 1824 of host device 1804 and/or remote device 1810.

Each of the panels 2031, 2061 is positioned within XR workspace 2030 relative to tag position 2013. In some embodiments, XR application 1814 may scan tag 2012 in order to receive XR workspace 2030 and/or dashboard 2050 from data intake and query system 108. In other implementations, XR application 1814 may respond to scanning tag 2012 by requesting one or more field values associated with unique asset ID 2014 encoded in the tag 2012 from data intake and query system 108. In such instances, XR application 1814 responds to receiving the field values by generating XR workspace 2030 and/or dashboard 2050 from the one or more received field values. Dashboard 2050 includes visualization set 2052 (e.g., 2052-1, 2052-2, etc.) and/or data set 2054. Dashboard 2050 provides one or more visualizations included in visualization set 2052 to present within one or more panels 2031 of XR workspace 2030.

Extended reality (XR) workspace 2030 includes one or more portions of graphics overlays (e.g., panels 2031 and/or annotation panel 2061) and/or indicators within the extended reality environment. In various embodiments, XR workspace 2030 may include a full graphics overlay, or a partial graphics overlay. Additionally or alternatively, portions of XR workspace 2030 may include text data, numerical data, color information, and/or icon data (e.g., a skull-and-crossbones symbol indicating that a machine has failed). For example, a portion of an overlay within XR workspace 2030 may include a highlighted portion, signifying information of particular interest to the user.

In some embodiments, the field values provided by data intake and query system 108 may include only the underlying textual and/or numerical information. In such instances, XR application 1814 may generate graphical overlays locally based on the underlying textual and/or numerical information. In various embodiments, the one or more overlays within XR workspace 2030 may be static, or may be dynamically updated. For example, panel 2031-1 may include visualization 2052-2 that illustrates a total data load in relation to the operation of asset 2011. In this instance, XR application 1814 may send multiple requests to data intake and query system 108 while viewing XR workspace 2030 in order to receive updated field values. XR application 1814 may dynamically update visualization 2052-2 based on the updated field values received from data intake and query system 108. In some implementations, one or more overlays may include interactive hooks to allow an operator of the system to interact with the one or more overlays.

Although various embodiments disclosed herein are described in conjunction with extended-reality techniques (e.g., generating XR overlays), each extended-reality technique also may be implemented in a non-XR environment. Further, specific XR techniques (e.g., virtual-reality techniques, augmented-reality techniques, etc.) disclosed herein also may be implemented in other environments. For example, for clarity of explanation, various embodiments disclosed herein are described in conjunction with AR overlays (e.g., field values, images, dashboards, cards, etc.). However, each of these embodiments may also be implemented by generating such overlays in a VR environment. Accordingly, the term extended reality (XR) may be used to refer to techniques that can be performed in an AR environment, a VR environment, and/or any combination thereof.

In various embodiments, XR application 1814 superimposes XR workspace 2030 onto the image(s) acquired via camera 1820. For example, one or more panels 2031-1, 2031-2 and/or annotation panel 2061 may be overlaid at positions relative to tag position 2013 corresponding to tag 2012, such as next to tag position 2013 and/or in front of tag position 2013. XR application 1814 causes the images superimposed with XR workspace 2030 to be presented on display device 1824.

In some embodiments, XR application 1814 may cause XR workspace 2030 to be presented on display device 1824 without presenting the acquired image. In general, XR application 1814 superimposes portions of XR workspace 2030 based on any of one or more determined dimensions and/or positions of asset 2011, the known size of tag 2012, the three-dimensional location and/or orientation of tag position 2013, and the detected plane of tag position 2013. In some embodiments, XR application 1814 places portions of XR workspace 2030 over portions of the adaptable 3D environment. For example, XR application 1814 may superimpose portions of XR workspace 2030 over portions of rendered asset 1932.

In some embodiments, XR application 1814 may receive additional information from data intake and query system 108 and may present the additional information on display device 1824. This additional information may be in any technically-feasible format. For example, data intake and query system 108 may transmit content (e.g., various schemas, dashboards, cards, playbooks, runbooks, and/or visualizations) to XR application 1814. The contents include data, including real-time data (e.g., near real-time data) associated with asset 2011 retrieved by data intake and query system 108 based on unique asset ID 2014. XR application 1814 may then display the content in conjunction with the real-world asset 2011 using XR workspace 2030.

For example, XR application 1814 may request data relating to asset 2011 by generating a data request that includes unique asset ID 2014-1 and sending the data request to data intake and query system 108. XR application 1814 may then receive dashboard 2050 from data intake and query system 108 that includes data set 2054, which includes one or more field values retrieved by data intake and query system 108 in response to the data request. In some embodiments, dashboard 2050 may include various insights, predictions, and/or annotations associated with asset 2011. For example, data intake and query system 108 may employ various machine-learning (ML) algorithms to generate one or more predictions associated with field values included in data set 2054. Additionally or alternatively, dashboard 2050 may include one or more annotations 2062 provided by one or more users in relation to asset 2011. Data intake and query system 108 may associate the one or more annotations 2062 to asset 2011 and store the one or more annotations 2062. Data intake and query system 108 may then include the one or more annotations 2062 as a portion of data set 2054.

In various embodiments, dashboard 2050 also includes visualization set 2052 that includes one or more visualizations relating to portions of data set 2054. In some embodiments, dashboard 2050 may include visualizations associated with asset ID 2014-2 that are presented when the asset ID 2014-2 is provided as an input into the dashboard 2050. In such instances, dashboard 2050 may automatically use asset ID 2014-2 as an input (e.g., a form input into a schema) to generate one or more visualizations included in visualization set 2052. In various embodiments, each visualization corresponds to applicable portions of data set 2054. For example, a portion of data set 2054 that corresponds to field values for a specified time range may have a corresponding timeline graph visualization. Similarly, a set of notification messages included in data set 2054 may have a corresponding set of notification visualizations.

In some embodiments, visualization set 2052 includes one or more annotations 2062 previously generated by one or more users. For example, by pointing camera 1820 at tag 2012, XR application 1814 obtains unique asset ID 2014-1 of "10245" from tag 2012, and sends a request to data intake and query system 108 that includes unique asset ID 2014-1. Host device 1804 and/or remote device 1810 may receive dashboard 2050 that includes visualizations 2052-1, 2052-2, 2052-3 based on field values associated with asset 2011 for a specific time period. Host device 1804 and/or remote device 1810 may also receive the corresponding XR workspace 2030. XR workspace 2030 associated with asset 2011 may include multiple panels 2031-1, 2031-2 and/or annotation panel(s) 2061 positioned relative to tag position 2013. XR application 1814 then presents XR workspace 2030 via display device 1824, where panels 2031, 2061 of XR workspace 2030 include the visualizations included in visualization set 2052.

In various embodiments, after generating XR workspace 2030, along with any visualizations 2052 and/or annotations 2062 included in panels 2031, 2061, onto the image(s) acquired via camera 1820, XR application 1814 may store the enhanced image in an enhanced image data store included in storage 1807 and/or in system memory 1812. In some embodiments, the enhanced image data store may be stored within database 1818. In some embodiments, XR application 1814 generates and populates XR workspace 2030 onto a VR scene rather than onto an image acquired from camera 1820. In such instances, the images stored in the enhanced image data store represent VR images augmented with AR overlays, rather than acquired images augmented with AR overlays.

FIGS. 21A-F are example user interfaces for a host user initiating a remote collaboration session via host device 1804, in accordance with example implementations. In general, host device 1804 scans a physical space within a real-world environment. XR application 1814 receives 2D surface data and 3D depth data of the physical space and generates an XR stream that host device 1804 transmits to one or more recipients. In various embodiments, host device 1804 may receive a selection of one or more recipients that are to participate with host device 1804 in a remote collaboration session. In such instances, the selected recipients each receive the XR stream produced by host device 1804. During setup of the remote collaboration session, XR application 1814 generates various views 2100, 2110, 2120, 2130, 2140, 2150 on host device 1804.

As shown in FIG. 21A, view 2100 presents a menu with selectable icons to conduct various operations associated with the real-world environment and/or data processing service 1902. Such icons include remote collaboration icon 2102, non-AR dashboard history icon 2103, nearby dashboards icon 2104, settings icon 2105, start a new scan icon 2106, and cancel icon 2107. In various embodiments, XR application 1814 may present view 2100 to provide a host user with options to scan a physical space within the real-world environment (e.g., selecting remote collaboration icon 2102, settings icon 2105, or start a new scan icon 2106) and/or perform various operations associated with dashboards provided by data processing service 1902 (e.g., selecting non-AR dashboard history icon 2103 or nearby dashboards icon 2104).

Figures 22A, 22B:
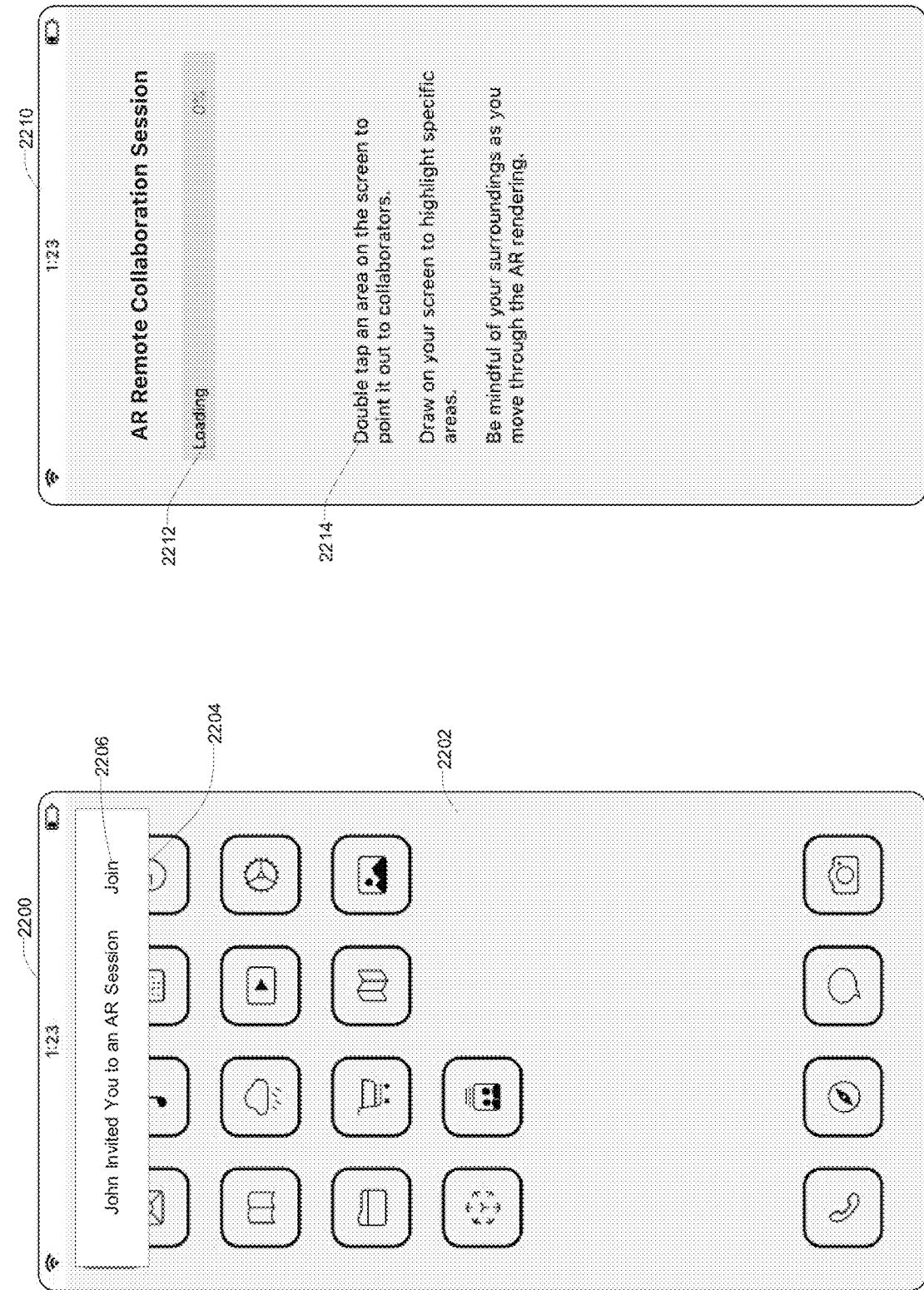
FIG. 22A illustrates a menu with selectable icons to initiate a remote collaboration, in accordance with example implementations.
FIG. 22B illustrates a splash page describing the remote collaboration session, in accordance with example implementations.

In various embodiments, upon receiving a user input corresponding to a user selection of remote collaboration icon 2102, XR application 1814 may respond by presenting view 2110. As shown in FIG. 22B, view 2110 illustrates a menu with selectable icons to initiate a remote collaboration. Such icons include a share my screen icon 2112, share my environment icon 2114, and cancel icon 2116. In some embodiments, host device 1804 may respond to a selection of share my screen icon 2112 by initiating a remote collaboration session by sharing the screen of host device 1804.

In various embodiments, host device 1804 may respond to a selection of share my environment icon 2114 by determining whether host device 1804 has recently scanned a physical space (e.g., performed a scan in response to a selection of the start a new scan icon 2106). In such instances, host device 1804 may prepare the recent scan for sharing by generating an XR stream that includes 2D surface data and 3D depth data from the recent scan. Alternatively, when host device 1804 determines that host device 1804 has not performed a recent scan, XR application 1814 proceeds by presenting view 2120.

Although not required in order to enable remote collaboration, in some embodiments, the host device 1804 may provide prompts to the user to scan more of the physical space, to enable the remote device to view different areas of the physical space at the remote location. For example, as shown in FIG. 21C, XR application 1814 presents view 2120 to scan a physical space within a real-world environment. View 2120 includes prompt 2122, scanning region 2124, and scanned region(s) 2126 (e.g., 2126-1, 2126-2, etc.). In some embodiments, XR application 1814 may provide prompt 2122 that instructs a host user to scan a particular asset or collection of assets within the physical space (e.g., scanning a particular server device). Alternatively, XR application 1814 may provide prompt 2122 that instructs the host user to scan a region of the real-world environment (e.g., one or more portions of an open space, building, room, etc.).

In various embodiments, XR application 1814 may present view 2120 while host device 1804 scans a physical space. For example, XR application 1814 may present scanning region 2124 that corresponds to a specific region or a specific object within the physical space. When XR application 1814 determines that a portion of the physical space has been successfully scanned, XR application 1814 presents one or more scanned regions 2126. In some embodiments, XR application 1814 may lock the scanned region and store 3D texture data and/or 2D surface data for the scanned region while host device 1804 scans other portions of the physical space. In some embodiments, the host user may change the position of host device 1804 in order to scan other regions of the physical space. Alternatively, XR application 1814 may expand a given scanned region as host device 1804 changes position (e.g., the host user moves and/or rotates host device 1804).

Figure 21D:
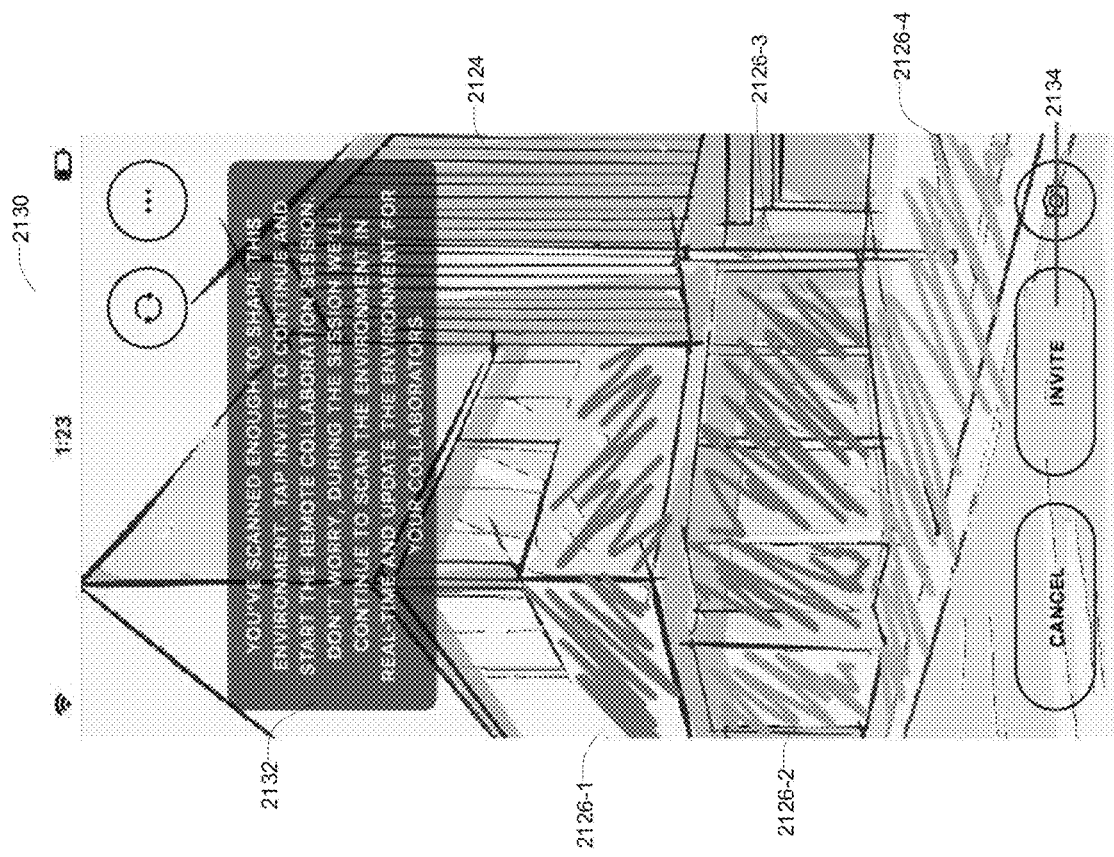
FIG. 21D illustrates the extendable application completing a scan of a physical space, in accordance with example implementations.
Figure 21C:
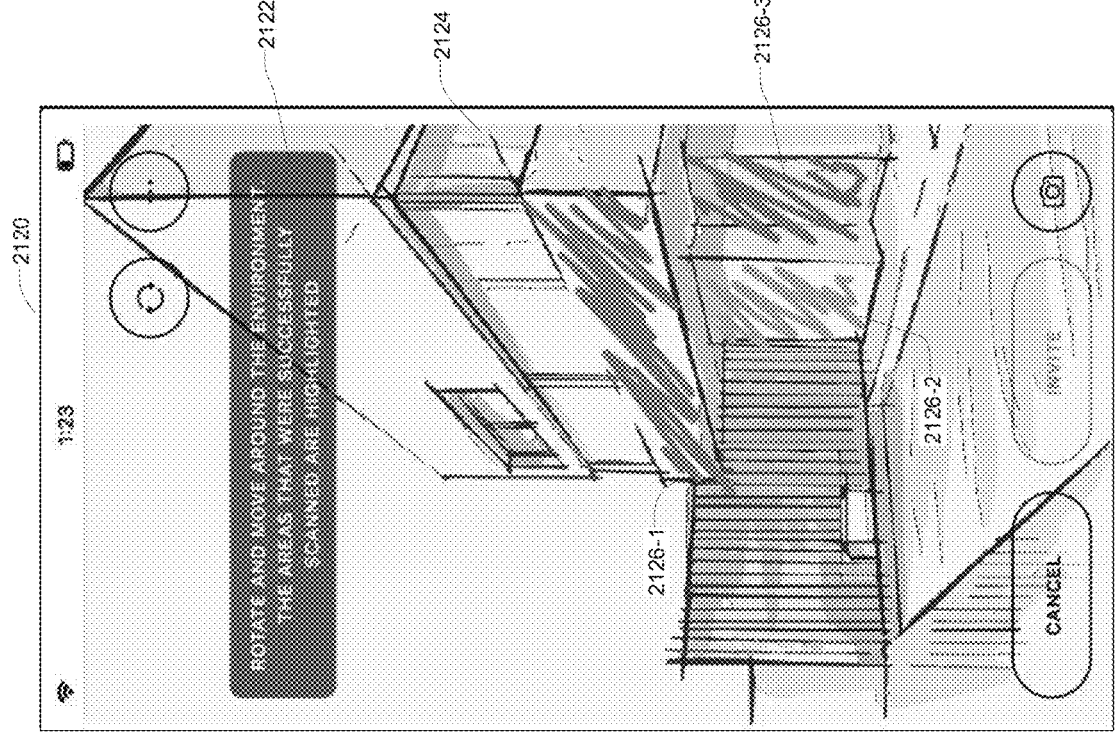
FIG. 21C, illustrates the extendable application scanning a physical space within a real-world environment, in accordance with example implementations.

As shown in FIG. 21D, view 2130 includes prompt 2132, scanning region 2124, scanned regions 2126, and invitation icon 2134. As XR application 1814 determines that a set of scanned regions 2126 have been successfully scanned, XR application 1814 may update prompt to specify that a sufficient amount of the physical space has been scanned to share in a remote collaboration session. In some embodiments, prompt 2132 may also specify that the scanned region may be updated during the remote collaboration session. When XR application determines that enough of the physical space has been successfully scanned, XR application 1814 may provide invitation icon 2134 to invite others to the remote collaboration session.

As shown in FIG. 21E, view 2140 displays an invitation menu for potential participants in the remote collaboration session. View 2140 includes invitation menu 2442, selected participants 2144 (e.g., 2144-1, 2144-2, etc.), and invitation icon 2146. Once the host user selects one or more participants for the remote collaboration session, the host user selects invitation icon 2146. XR application 1814 responds to the selection of the invitation icon by retrieving address information for each of the selected participants 2144 and sending invitations to each of the selected participants.

As each selected participant accepts the invitation, host device 1804 may receive an indication of a remote device 1810 used by the selected participant. In some embodiments, XR application 1814 may identify each remote device 1810 as an intended recipient of the XR stream and may send separate messages to each respective recipient. Additionally or alternatively, each selected participant may register with workspace service 1908 included in data processing service 1902. In such instances, data processing service 1902 may direct the XR stream to each intended recipient during the remote collaboration session.

As shown in FIG. 21F, view 2150 includes host XR environment portion 2152, asset 2154, and record icon 2156. In various embodiments, XR application 1814 included in host device 1804 presents view 2150 during a remote collaboration with one or more remote devices 1810.

Host XR environment portion 2152 corresponds to a view of host XR environment 1910 based on a position of host device 1804 relative to the physical space. In some embodiments, host XR environment portion 2152 includes one or more assets 2154. In such instances, XR application 1814 may highlight asset 2154 within host XR environment portion 2152 may identify asset 2154. Additionally or alternatively, XR application 1814 may display one or more display panels, including various dashboards, playbooks, and so forth, within host XR environment 2152.

In various embodiments, host device 1804 may change position within the real-world environment. In such instances, XR application 1814 may update host XR environment portion 2152 to reflect the position change of host device 1804. Additionally or alternatively, the position change of host device 1804 does not modify the view seen by the remote participants via the one or more remote devices 1810.

In some embodiments, XR application 1814 may present record icon 2156. In such instances, XR application 1814 may respond to a selection of record icon 2156 by recording the remote collaboration session. Recording the remote collaboration session may include storing the XR stream, an activity log of actions performed by host device 1804 and/or the one or more remote devices 1810, and/or AR elements displayed by host device 1804 and/or the one or more remote devices 1810 within the respective host XR environment 1910, or remote XR environment 1930, and/or remote environment 1940. In some embodiments, XR application 1814 may also store an audio recording from each respective device included in the remote collaboration session, or other additional annotation or information, as is relevant to the particular use case.

FIGS. 22A-D are example user interfaces for a remote user joining a remote collaboration session via remote device 1810, in accordance with example implementations. In general, remote device 1810 joins a remote collaboration session, where host device 1804 shares a screen or an environment with remote device 1810. Remote device 1810 presents views 2200, 2210, 2220, 2230 to enable the remote user to join the remote session as a participant and view portions of a physical space scanned by host device 1804. In various embodiments, remote device 1810 may navigate a representation of the physical space independent of the host device 1804.

As shown in FIG. 22A, view 2200 presents a prompt to join a remote session. View 2200 includes home screen 2202, prompt 2204, and link 2206. In various embodiments, remote device 1810 may receive an invitation to join a remote collaboration session. In such instances, remote device 1810 may present prompt 2204 indicating that the remote user has been invited to join a remote collaboration session as a participant. In such instances, prompt 2204 may include link 2206 to join the remote collaboration session. In some embodiments, link 2206 may cause remote device 1810 to register with workspace service 1908 as a participant for the specific remote collaboration session. Upon registration, workspace service 1908 may direct the XR stream for the remote collaboration session, as generated by host device 1804, to remote device 1810.

As shown in FIG. 22B, view 2210 presents a splash page describing the remote collaboration session. View 2210 includes loading progress bar 2212 and instructional panel 2214. In operation, XR application 1814 included in remote device 1810-1 receives the XR stream and generates remote XR environment 1930 that includes an adaptable 3D representation of the physical space. In some embodiments, XR application 1814 may present view 2210 while initially generating the remote XR environment 1930 by rendering the adaptable 3D representation.

View 2210 presents a progress bar based on XR application generating remote XR workspace 1930. In some embodiments, generating remote XR workspace 1930 includes rendering the adaptable 3D representation of the physical space and separately transmitting requests for data associated with one or more assets included in the adaptable 3D representation (e.g., asset 2154). Additionally or alternatively, view 2210 may include instructional panel 2214. Instructional panel 2214 provides information about the remote collaboration session. For example, instructional panel 2214 may instruct the remote user to be mindful of the surroundings of at the remote location when moving remote device 1810-1. Instructional panel 2214 may also include instructions about using one or more collaboration tools (e.g., graphical pointers, pins, highlighters, etc.) that the remote user can implement to navigate within remote XR environment 1930 and/or interact with the rendered asset within remote XR environment 1930.

Figure 22D:
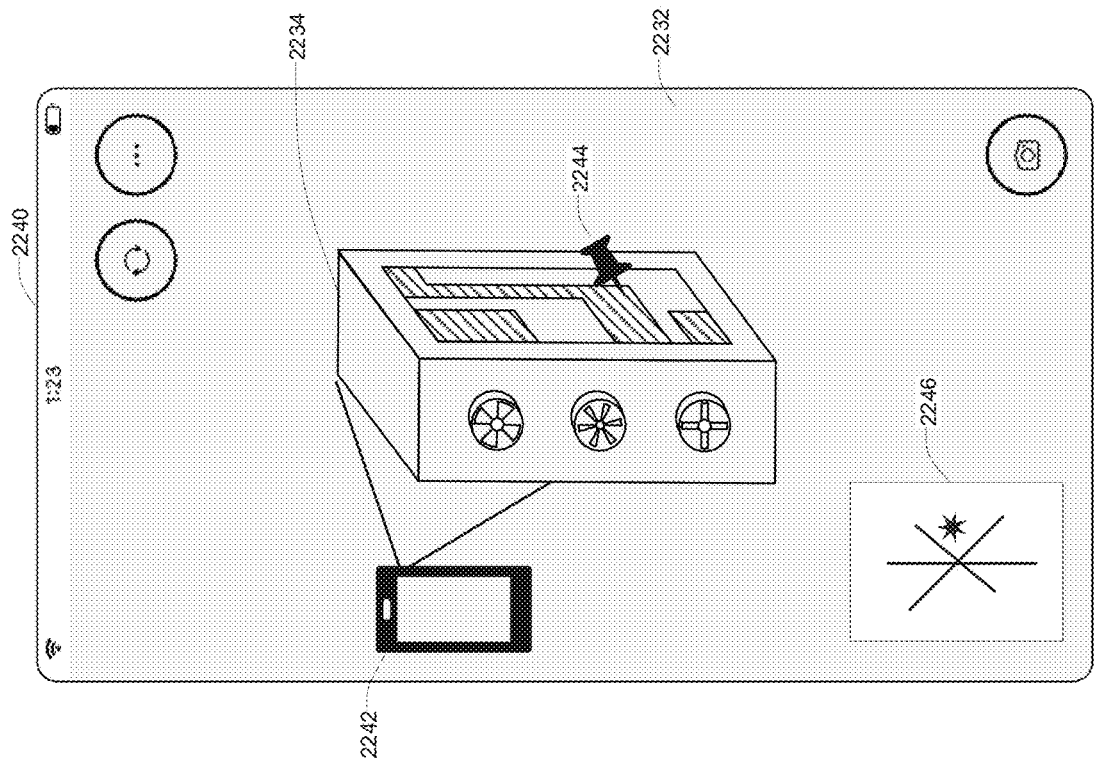
FIG. 22D illustrates a portion of remote XR environment portion at a later time during the remote collaboration session, in accordance with example implementations.
Figure 22C:
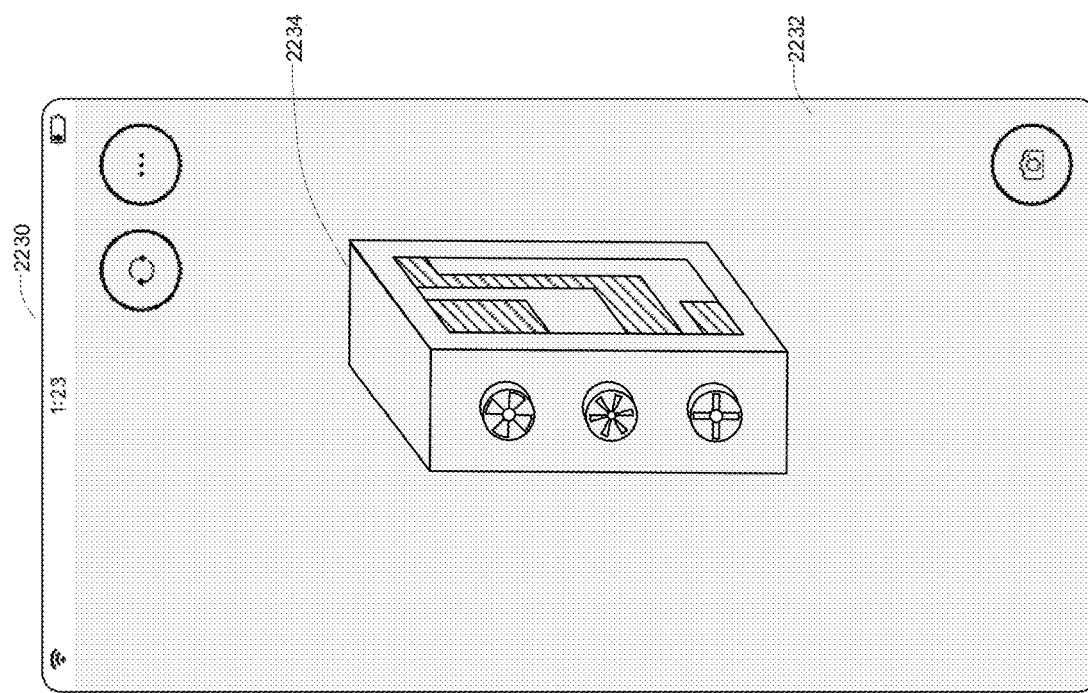
FIG. 22C illustrates a portion of the remote XR environment portion, in accordance with example implementations.

As shown in FIG. 22C, view 2220 presents remote XR environment portion 2232. View 2220 includes remote XR environment portion 2152 and rendered asset 2234. Remote XR environment portion 2232 corresponds to a view of remote XR environment 1930 based on a position of remote device 1810-1. Remote XR environment 1930 renders the XR stream, corresponding to the scene scanned by host device 1804, as an adaptable 3D representation of the physical space.

In some embodiments, remote device 1810-1 may determine an anchor position for the scene and may render portions of the scene relative to the anchor position. In such instances, XR application 1814 included in remote device 1810-1 may determine the position of remote device 1810-1 relative to the anchor position in order to determine the position of remote device 1810-1 relative to portions of the scene. Upon determining the position of remote device 1810-1 relative to the portions of the scene, XR application 1814 may present remote XR environment portion 2232 to reflect the position of remote device 1810-1. In some embodiments, an XR representation of remote device 1810-1 may appear in the host XR environment 1910 of the host device 1804. For example, if remote device 1810 is a cellular phone of a particular brand, a 3D model representing that cellular phone brand may be rendered in host XR environment 1910 according to the position of remote device 1810 relative to rendered asset 1932. In other implementations, remote device 1810 may be represented by a symbol or simple object, such as a cube or sphere. In still other implementations, remote device 1810 may be represented as a line or ray, with the line or ray pointing in the direction representing the orientation of the remote device 1810 relative to the rendered asset 1932.

For example, XR application 1814 may determine that, based on the anchor position for the scene, remote device 1810-1 is at a position and orientation that is to the right of rendered asset 2234. XR application may then respond by generating remote XR environment portion 2232 to reflect that position of remote device 1810-1 relative to rendered asset 2234.

In various embodiments, remote device 1810-1 may change position within the real-world location of remote device 1810-1. In such instances, XR application 1814 may update remote XR environment portion 2232 to reflect the position change of remote device 1810-1. Additionally or alternatively, the position change of remote device 1810-1 does not modify the view of the scene as seen by other remote participants or by the host user.

As shown by FIG. 22D, view 2240 displays remote XR environment portion 2232 at a later time during the remote collaboration session. View 2240 includes remote XR environment portion 2232, asset 2234, host device avatar 2242, pin 2244, and map 2246. During the remote collaboration session, the remote user may implement one or more collaboration tools in order to navigate through remote XR environment 1930 and/or interact with portions of the adaptable 3D representation of the physical space.

For example, the remote user may toggle avatars of other participants in the remote collaboration session to determine the position of each participant's device relative to the physical space. In one example, the remote user may turn on host avatar 2242 in order to see the position of host device 1804 and determine what portion of real-world asset 2154 (corresponding to rendered asset 2234) that the host user is viewing. The remote user may then tell the user to move to a different position in order to view a different portion of the real-world asset 2154.

In some embodiments, the remote user may implement collaboration tools that are displayed in the environments of other participants. For example, the remote user may add a pin 2244 to flag a particular portion of rendered asset 2234 throughout the remote collaboration session. In such instances, other participants may see pin 2244 within the respective environments. For example, when host device 1804 changes position to be located to the right side of real-world asset 2154, host device 1804 may present pin 2244 for display within host XR application portion 2152.

In various embodiments, XR application 1814 may generate a map 2246 of the scene within view 2240. In such instances, the remote user may move remote device 1810-1 to change the position of remote device 1810-1 within the map of the scene. In some embodiments, the remote device may be presented with navigation controls. For example, when mobile operations application 1816 generates a non-XR remote environment 1940 for a remote collaboration session, mobile operations application 1816 may present navigation controls to change the position of remote device 1810-2 within the scene.

Figure 23:
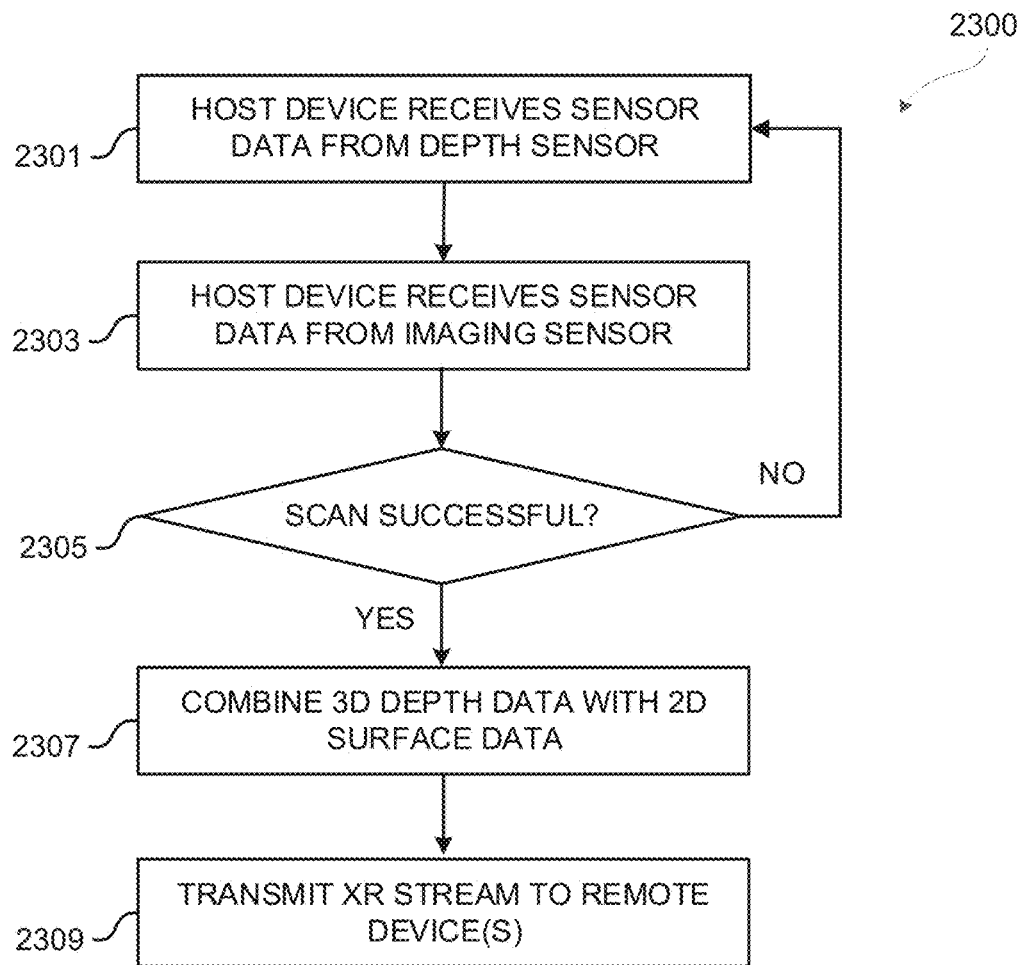
FIG. 23 sets forth a flow diagram of method steps for providing an extended reality stream for a remote collaboration session, in accordance with example implementations.

FIG. 23 sets forth a flow diagram 2300 of method steps for providing an extended reality stream for a remote collaboration session, in accordance with example implementations. Although the method steps are described in conjunction with FIGS. 1-22, persons of ordinary skill in the art will understand that any system configured to perform this method and/or other methods described herein, in any order, and in any combination not logically contradicted, is within the scope of the present invention.

As shown in by method 2300, at step 2301, host device 1804 receives sensor data from a depth sensor 1924. In various embodiments, host device 1804 may receive depth sensor data that was acquired by a depth sensor 1924 (e.g., one or more LiDAR sensors) that are associated with host device 1804. For example, a LiDAR sensor included in host device 1804 may scan a physical space and acquire depth sensor data for the physical space. XR application 1814 included in host device 1804 may receive the depth sensor data and generate 3D depth data that is based on the depth sensor data.

At step 2303, host device 1804 receives sensor data from an imaging sensor 1926. In various embodiments, host device 1804 may receive image sensor data that was acquired by an imaging sensor 1926 (e.g., one or more RGB cameras) that are associated with host device 1804. For example, an RGB camera included in host device 1804 may scan the physical space and acquire image sensor data for the physical space. XR application 1814 included in host device 1804 may receive the image sensor data and generate 2D surface data that is based on the image sensor data.

At step 2305, host device 1804 determines whether a scan of the physical space was successful. In some embodiments, XR application 1814 may determine whether host device 1804 successfully acquired both image sensor data and depth sensor data for the physical space. In some embodiments, XR application 1814 may perform a series of successive checks to determine whether host device 1804 successfully acquired both image sensor data and depth sensor data for specific regions of the physical space. When host device 1804 determines that host device 1804 did not successfully complete the scan of the physical space, host device returns to step 2301, where XR application 1814 prompts the host user to rescan at least a portion of the physical space. Otherwise, XR application determines that host device 1804 successfully scanned the physical space and proceeds to step 2307.

At step 2307, host device 1804 combines the 3D depth data and 2D surface data to generate an XR stream. In some embodiments, host device 1804 may generate the 3D depth data and 2D surface data as a discrete scene that can be produced in a non-XR environment. In various embodiments, XR application 1814 may combine correlated portions of the 3D depth data and the 2D surface data to generate the XR stream. In some embodiments, XR application 1814 may determine a correlation between portions of 2D surface data and 3D depth data (e.g., determining related sets of coordinate data between a portion of 2D surface data and a portion of 3D depth data).

At step 2309, host device 1804 transmits the XR stream to one or more remote devices 1810. In various embodiments, XR application 1814 may transmit the XR stream to one or more recipients (e.g., remote devices 1810, remote storage 1904, etc.) for use in a remote collaboration session. In some embodiments, XR application 1814 may transmit the XR stream as a stream of the combined 2D surface data and 3D depth data. In such instances, the recipient (e.g., remote device 1810-1) may extract the 2D surface data and 3D depth data to generate an adaptable 3D representation of the physical space corresponding to a scene of the physical space. Alternatively, host device 1804 may initially generate the adaptable representation of the physical space and may transmit the adaptable 3D representation to one or more recipients. In various embodiments, remote device 1810 may generate a remote environment that includes at least a portion of the adaptable 3D representation of the physical space.

Figure 24:
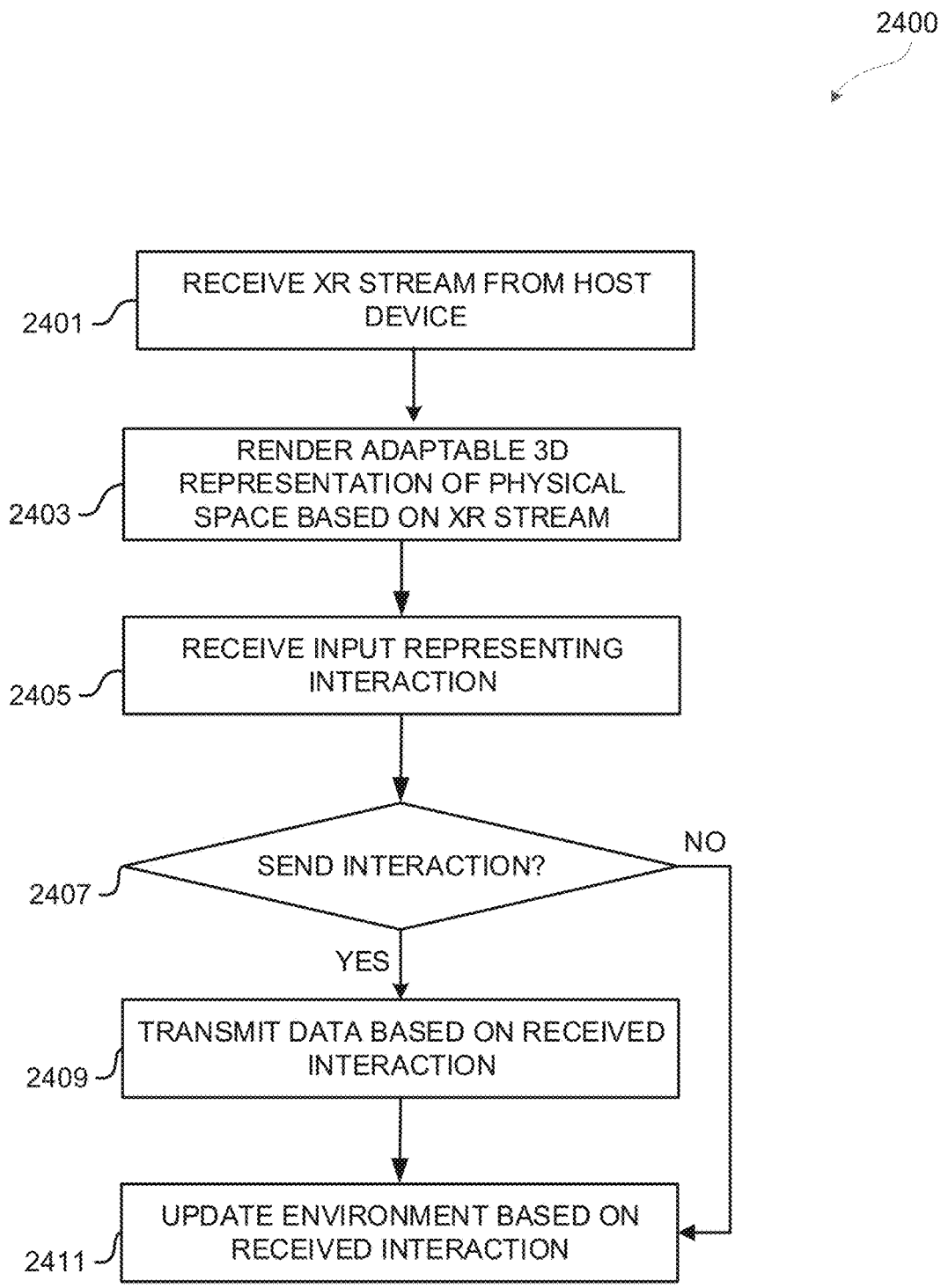
FIG. 24 sets forth a flow diagram of method steps for generating and interacting with a digital representation of a physical space, in accordance with example implementations.

FIG. 24 sets forth a flow diagram 2400 of method steps for generating and interacting with a digital representation of a physical space, in accordance with example implementations. Although the method steps are described in conjunction with FIGS. 1-22, persons of ordinary skill in the art will understand that any system configured to perform this method and/or other methods described herein, in any order, and in any combination not logically contradicted, is within the scope of the present invention.

As shown in method 2400, at step 2401, remote device 1810 receives an XR stream originating from host device 1804. In various embodiments remote device 1810 receives an XR stream via tunnel bridge 1906. In some embodiments, the XR stream may include continual chunks of combined 3D depth data and/or 2D surface data. Additionally or alternatively, the XR stream may include a discrete set of data that corresponds to a scene at a particular time (e.g., an initial set of geometry data at the start of the remote collaboration session). In some embodiments, workspace service 1908 may specify that remote device is an intended recipient of the XR stream. In such instances, data processing service 1902 may direct a copy of the XR stream, originating at host device 1804, to remote device 1810.

At step 2403, remote device 1810 renders an adaptable 3D representation of the physical space based on the XR stream. In various embodiments, remote device 1810 may render at least a portion of an adaptable representation of the physical space that is to be used during the remote collaboration session. For example, XR application 1814 included in remote device 1810-1 may generate the adaptable 3D representation for inclusion in remote XR environment 1930. In another example, remote operations application 1816 included in remote device 1810-2 may generate the adaptable 3D representation for inclusion in remote environment 1940. In various embodiments, when rendering adaptable 3D representation, remote device 1810 may extract the 2D surface data and 3D depth data that is included in the XR stream to generate an adaptable 3D representation of the physical space corresponding to a scene of the physical space.

At step 2405, remote device 1810 receives an input representing an interaction. In various embodiments, remote device 1810 may receive an input from a remote user during the remote collaboration session. For example, remote device 1810 may receive an input corresponding to the remote user highlighting a portion of the remote environment. In such instances, remote device 1810 may determine the interaction corresponding to the input.

At step 2407, remote device 1810 determines whether to send an interaction to a recipient. In various embodiments, remote device 1810 may determine whether to publish the interaction corresponding to the received input to other participants in the remote collaboration session. For example, XR application 1814 may determine whether the input corresponding to highlighting a portion of the remote XR environment 1930 to be seen by other participants. When remote device 1810 determines that the interaction is to be published to other participants, remote device 1810 may proceed to step 2409. Otherwise, remote device 1810 determines that the interaction is not to be published to other participants and proceeds to step 2411.

At step 2409, remote device 1810 transmits data based on the received interaction. In various embodiments, remote device 1810 transmits one or more messages that corresponds to the interaction received by remote device 1810. In such instances, remote device 1810 may send the message that includes the interaction and associated data (e.g., type of interaction, coordinates for the interaction, etc.) via tunnel bridge 1906 to workspace service 1908 and/or host device 1804. In such instances, other participants may update a corresponding workspace to reflect the interaction (e.g., host device 1804 updating host XR environment 1910 to highlight a corresponding portion of XR workspace 1914).

At step 2411, remote device 1810 updates the remote environment based on the received interaction. In various embodiments, remote device 1810 updates the remote environment to reflect the interaction corresponding to the received input. For example, XR application 1814 may update XR workspace 1934 included in remote XR workspace 1930 to highlight a specific portion corresponding to the user input.

In various embodiments, remote device 1810 may continually update the remote workspace based on the updated XR stream and/or additional inputs provided by the remote user. In such instances, remote device 1810 may update the remote workspace to reflect the updates.

3.2 Mesh Updates in an Augmented Reality Environment

As mentioned above, extended reality application 1814 on host device 1804 and/or one or more remote devices 1810 may generate a 3D representation of an object or environment. This 3D representation may include one or more polygon meshes of 3D data produced by depth sensor 1924, as well as textures that include pixel values from 2D data captured by image sensor 1926, which are applied to vertices and/or other components of the mesh(es). As additional 3D data and 2D data of the object or environment are generated by depth sensor 1924 and image sensor 1926, respectively, extended reality application 1814 may update one or more portions of the mesh(es) to reflect the latest 2D and 3D representations of the object or environment, as described in further detail below.

Figure 25:
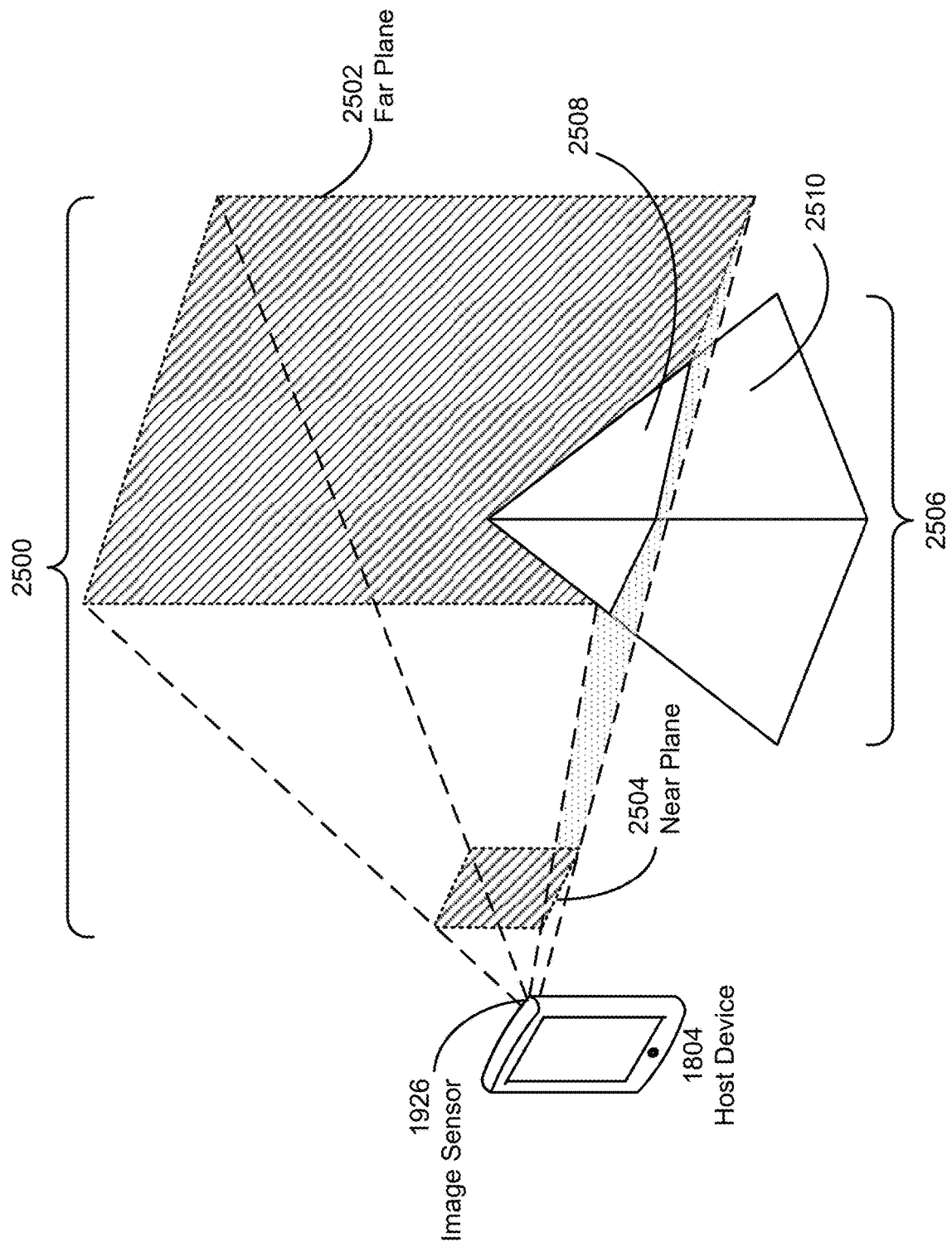
FIG. 25 illustrates the capture of a 3D environment by the host device and/or remote devices of FIG. 18, in accordance with one or more examples or implementations.

FIG. 25 illustrates the capture of sensor data associated with a 3D environment by host device 1804 and/or remote devices 1810 of FIG. 18, in accordance with one or more examples or implementations. In the example shown in FIG. 25, a 2D image of the environment is captured by image sensor 1926 on host device 1804 (but can also, or instead, be captured by a different image sensor on one or more remote devices 1810). As shown, the field of view associated with the 2D image is represented by a view frustum 2500 that is partially bounded by a near plane 2504 and a far plane 2502. In one or more examples or implementations, view frustum 2500 includes a 3D volume within the environment that is visible in one or more frames captured by image sensor 1926. This 3D volume may be represented by the portion of a rectangular pyramid that lies between near plane 2504 and far plane 2502, with near plane 2504 and far plane 2502 indicating boundaries of visibility in view frustum 2500 with respect to distance from image sensor 1926. Additional boundaries of view frustum 2500 may be represented by line segments connecting the top, left, bottom, and right corners of near plane 2504 and far plane 2504 and/or planes formed using the line segments, edges of near plane 2504, and edges of far plane 2502.

Objects or portions of objects inside view frustum 2500 may be visible within the frame(s) captured from image sensor 1926, while objects or portions of objects outside view frustum 2500 may not be visible in the frame(s). Further, an object 2506 that is intersected by view frustum 2500 may include a first portion 2508 that lies within view frustum 2500 and is thus visible in frames captured by image sensor 1926, as well as a second portion 2510 that lies outside of view frustum 2500 and is not shown in frames captured by image sensor 1926.

In some implementations, meshes generated based on 3D data captured by depth sensor 1924 and/or extended reality application 1814 are larger than 2D images of the same environment captured by image sensor 1926, such that each mesh is textured using a limited number of images from image sensor 1926. For example, depth sensor 1924 and/or extended reality application 1814 may generate a single mesh of a large object and/or portion of the environment (e.g., a car, a portion of a room etc.). This mesh is textured using a single 2D frame that is acquired by image sensor 1926 concurrently with or within a threshold time period of generating least a portion of the mesh. When the mesh is larger than the frame captured by image sensor 1926, extended reality application 1814 and/or another component of host device 1804 may texture the mesh by "wrapping" the frame around the mesh (e.g., using a clamp, repeat, clamp to border, mirror, and/or another wrapping mode).

As a result, the portion of the mesh that maps directly to 2D pixel locations in the frame may include an accurate depiction of the object or environment, while other portions of the mesh that fall outside the frame may fail to be textured correctly. Referring to the 3D environment of FIG. 25, a mesh that includes all 3D points in object 2506 may be textured with the visual representation of portion 2508 that lies within a frame associated with view frustum 2500. Thus, portion 2508 may be accurately represented in the mesh, while wrapping of the texture associated with portion 2508 around portion 2510 may result in an inaccurate representation of portion 2510 in the mesh.

To improve the accuracy of meshes and/or textures applied to the meshes, extended reality application 1814 includes functionality to selectively divide, add, and/or remove meshes in the 3D representation based on the latest frames captured by image sensor 1926. In turn, the 3D representation is updated with 3D points and/or textures that reflect the latest data generated by depth sensor 1924 and/or image sensor 1926 instead of requiring textures associated with frames from image sensor 1926 to wrap around large meshes.

Figure 26:
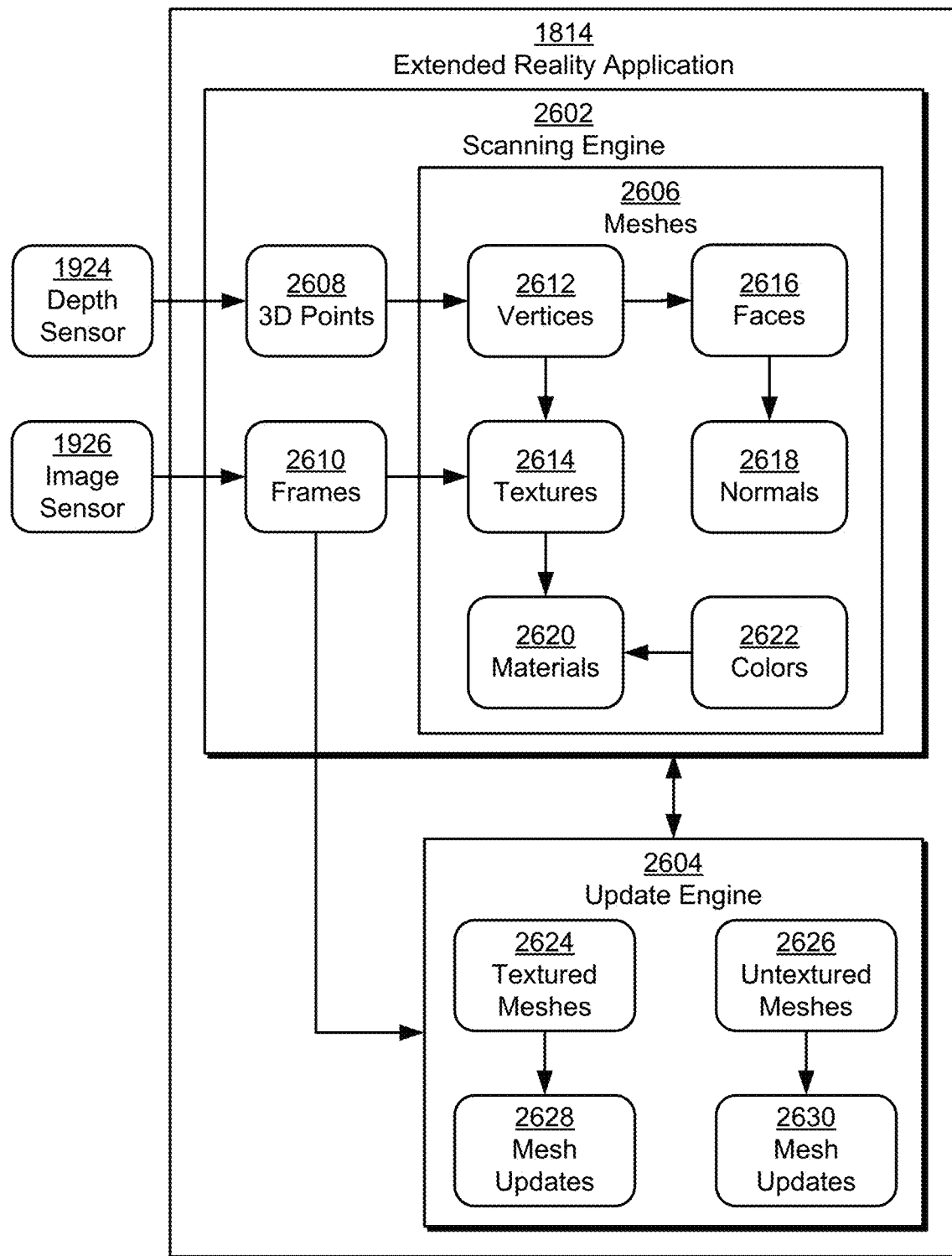
FIG. 26 is an illustration of the extended reality application of FIG. 18, in accordance with one or more examples or implementations.

FIG. 26 is an illustration of extended reality application 1814 of FIG. 18, in accordance with one or more examples or implementations. As shown, extended reality application 1814 includes a scanning engine 2602 and an update engine 2604. Each of these components is described in further detail below.

Scanning engine 2602 generates one or more meshes 2606 based on 3D data ("3D points 2608") from depth sensor 1924 and 2D data ("2D frames 2610") from image sensor 1926. In particular, scanning engine 2602 maps 3D points 2608 to vertices 2612 of meshes 2606 and connects pairs of neighboring vertices 2612 with edges to form faces 2616 in meshes 2606. For example, scanning engine 2602 may generate vertices 2612 in meshes 2606 that reflect surfaces, shapes, and/or contours represented by 3D points 2608 and form triangular faces 2616 in meshes 2606 by connecting groups of three spatially proximate vertices 2612 in 3D points 2608. These faces 2616 may be generated in a way that produces smooth surfaces when a plane is detected in 3D points 2608 (e.g., by depth sensor 1924, scanning engine 2602, and/or another component). Scanning engine 2602 also calculates normals 2618 for vertices 2612 in meshes 2606. For example, scanning engine 2602 may calculate the normal for a vertex in a mesh as the average of normals of the planes of triangles (or other polygons) in which the vertex is found.

Scanning engine 2602 additionally maps 2D points (e.g., pixel locations) in frames 2610 onto 3D vertices 2612 in meshes 2606 to define textures 2614 used in meshes 2606. For example, scanning engine 2602 may project some or all vertices 2612 in each mesh onto 2D pixel locations in a corresponding frame from image sensor 1926. When a vertex is projected onto a valid pixel location in the frame (e.g., a pixel location that falls within the dimensions of the frame), a texture coordinate for the vertex is set to the pixel location. The mesh is then textured by "covering" triangular (or other polygon-shaped) faces 2616 of the mesh with corresponding triangular (or other polygon-shaped) portions of the frame that spatially overlap with the faces, where a given face is textured using a portion of the frame that is represented by the texture coordinates of vertices 2612 in the face. Any remaining faces 2616 of the mesh that do not spatially overlap with the frame are then textured by stretching and/or copying portions of the frame onto those faces.

When a mesh is not associated with a texture (e.g., if vertices 2612 in the mesh do not map to 2D points in available frames 2610 from image sensor 1926), scanning engine 2602 may apply one or more colors 2622 to the mesh to facilitate visualization and/or rendering of the mesh. For example, scanning engine 2602 may assign a different color to each mesh in the 3D representation to allow the 3D regions represented by meshes 2606 to be visually identified. Consequently, meshes 2606 created by scanning engine 2602 may include textured meshes 2624 that include textures 2614 obtained from frames 2610 of the corresponding portions of the environment, as well as untextured meshes 2626 that are assigned colors 2622 in the absence of available textures 2614.

In turn, textures 2614, colors 2622, and/or other attributes that affect rendering of meshes 2606 may be included in materials 2620 associated with meshes 2606. For example, scanning engine 2602 may specify a material as a lighting model, shader, reflectivity, texture, color, and/or another attribute that affects the rendering of a surface. Each mesh may be assigned a single material, while one material may be shared across multiple meshes 2606.

After scanning engine 2602 produces one or more textured meshes 2624 and/or untextured meshes 2626 of the environment, update engine 2604 generates mesh updates 2628-2630 that trigger the addition of new textures 2614 to meshes 2606 as frames 2610 are captured by image sensor 1926. In one or more examples or implementations, mesh updates 2628-2630 include dividing a mesh into two or more sub-meshes, replacing a textured mesh with a different textured mesh, overlaying an untextured mesh with a textured mesh, removing a portion of a mesh, and/or other changes to meshes 2606 that result in the creation of new meshes 2606 using the latest 3D points from depth sensor 1924 and/or texturing of meshes 2606 using the latest frames 2610 from image sensor 1926.

Moreover, update engine 2604 may use a number of techniques to generate mesh updates 2628-2630. As illustrated in FIG. 26, update engine 2604 may generate one set of mesh updates 2628 for textured meshes 2624 and a different set of mesh updates 2630 for untextured meshes 2626. Mesh updates 2628 and/or 2630 may also, or instead, be produced using a mesh splitting technique and/or a mesh frustum cutting technique, as described in further detail below with respect to FIGS. 27 and 28.

Figure 27:
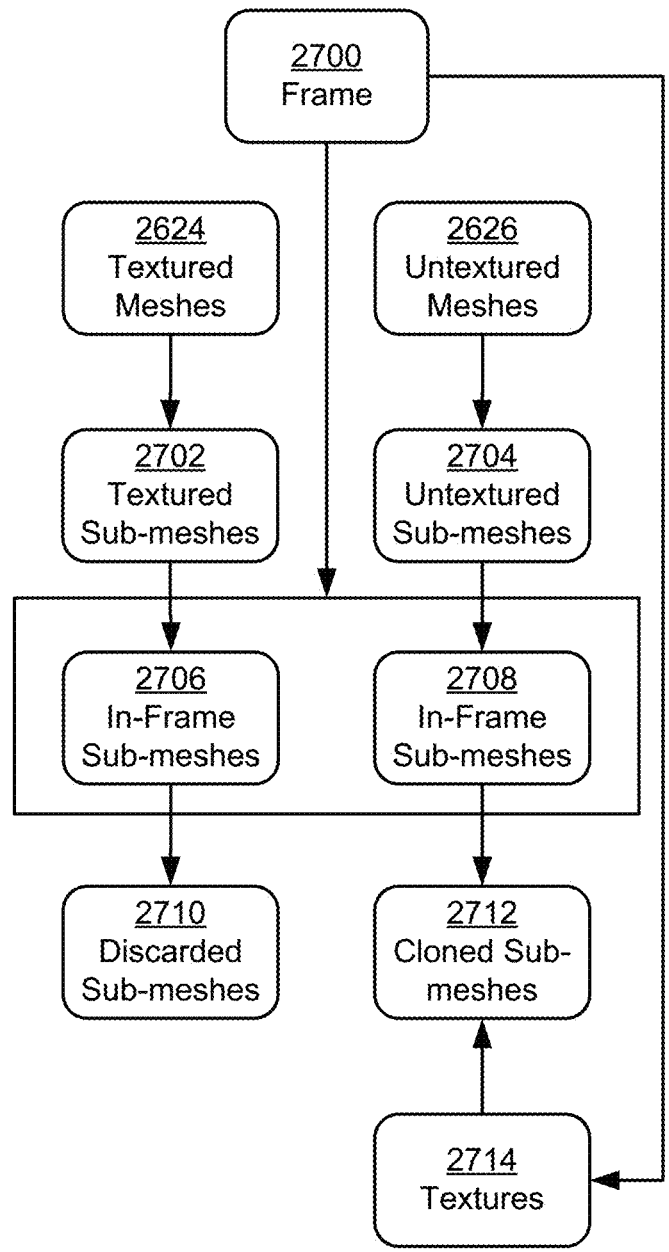
FIG. 27 illustrates a mesh splitting technique performed by the update engine of FIG. 26 to update one or more meshes in a 3D representation of an environment, in accordance with one or more examples or implementations.

FIG. 27 illustrates a mesh splitting technique performed by update engine 2604 of FIG. 26 to update one or more meshes in a 3D representation of an environment, in accordance with one or more examples or implementations. As mentioned above, the meshes may include textured meshes 2624 that are rendered using one or more portions of 2D frames 2610 captured by image sensor 1926, as well as untextured meshes 2626 that lack image-based textures and are rendered using colors 2622 assigned by scanning engine 2602.

As shown, update engine 2604 divides textured meshes 2624 into multiple textured sub-meshes 2702 and divides untextured meshes 2626 into multiple untextured sub-meshes 2704. For example, update engine 2604 may divide a mesh with N faces into D sub-meshes, each with N/D faces. These sub-meshes may be created by copying consecutive sequences of N/D faces from an original face array for the mesh into D new face arrays representing the sub-meshes and maintaining the ordering of faces in the original face array in the new face arrays. When faces in the original face array are ordered to be contiguous, this division of faces from the original face array into new face arrays that maintain the ordering of faces in the original face array results in sub-meshes that are also contiguous.

After a given frame 2700 (e.g., a "current" frame) is generated by image sensor 1926, update engine 2604 identifies one or more textured sub-meshes 2702 as in-frame sub-meshes 2706 that fall within frame 2700. Similarly, update engine 2604 identifies one or more untextured sub-meshes 2704 as in-frame sub-meshes 2708 that fall within frame 2700.

In one or more examples or implementations, update engine 2604 determines that a sub-mesh is in frame 2700 if any vertex in the sub-mesh is found in frame 2700. Alternatively, update engine 2604 may determine that a sub-mesh is in frame 2700 if all vertices in the sub-mesh are found in frame 2700. In other words, update engine 2604 may identify in-frame sub-meshes 2706 and 2708 as "partially in frame" (i.e., having at least one vertex in frame 2700) or "fully in frame" (i.e., having all vertices in frame 2700).

To determine if a given vertex in 3D space is in frame 2700, update engine 2604 may project the 3D location of the vertex onto a 2D point. For example, update engine 2604 may use camera parameters (e.g., camera pose, camera model, focal length, distortion coefficients, reference frame offsets, etc.) associated with image sensor 1926 with a perspective transformation to convert 3D coordinates of the vertex into a 2D location in the image plane of image sensor 1926. If the 2D location falls outside the boundaries of frame 2700 in the image plane, the vertex is not in frame 2700. If the 2D location is found within the boundaries of frame 2700 in the image plane, the vertex is in frame 2700.

After in-frame sub-meshes 2706 and 2708 are identified as "fully in frame" or "partially in frame," update engine 2604 generates mesh updates that cause one or more textures associated with frame 2700 to be applied to in-frame sub-meshes 2706 and 2708. In particular, update engine 2604 converts textured in-frame sub-meshes 2706 into discarded sub-meshes 2710 by removing in-frame sub-meshes 2706 from the 3D representation. These discarded sub-meshes 2710 allow scanning engine 2602 to generate new textured meshes 2624 from 3D points 2608 captured by depth sensor 1924 concurrently with the capture of frame 2700 by image sensor 1926. Update engine 2604 also generates cloned sub-meshes 2712 that are duplicates of untextured in-frame sub-meshes 2708 and applies one or more textures 2714 from one or more portions of frame 2700 to cloned sub-meshes 2712. These cloned sub-meshes 2712 may be given precedence over the corresponding untextured in-frame sub-meshes 2708 in the 3D representation, thereby resulting in the rendering of cloned sub-meshes 2712 with textures 2714 within the 3D representation.

Figure 28:
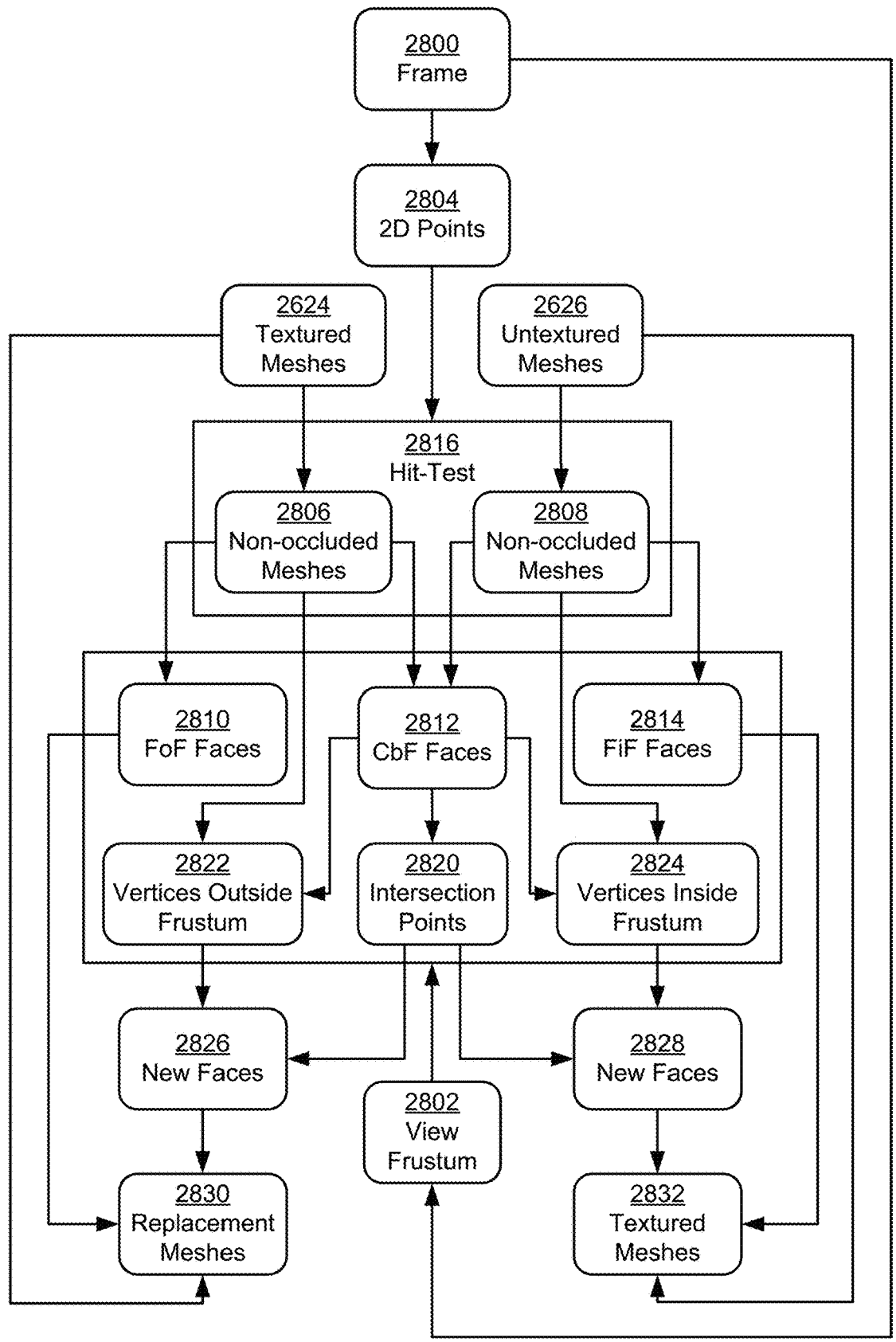
FIG. 28 illustrates a mesh frustum cutting technique performed by the update engine of FIG. 26 to update one or more meshes in a 3D representation of an environment, in accordance with one or more examples or implementations.

FIG. 28 illustrates a mesh frustum cutting technique performed by update engine 2604 of FIG. 26 to update one or more meshes in a 3D representation of an environment, in accordance with one or more examples or implementations. As with the mesh splitting technique of FIG. 27, the mesh frustum cutting technique is performed with respect to textured meshes 2624 and untextured meshes 2626 in the 3D representation.

As shown, update engine 2604 performs a hit-test 2816 that identifies one or more textured meshes 2624 as non-occluded meshes 2806 of objects that are visible in a given frame 2800 captured by image sensor 1926. Update engine 2604 also uses hit-test 2816 to identify one or more untextured meshes 2626 as non-occluded meshes 2808 of objects that are visible in frame 2800.

In one or more examples or implementations, update engine 2604 performs hit-test 2816 by creating a grid (e.g., 10×10, 15×20, 20×20, 100×100, etc.) of 2D points 2804 in frame 2800 (e.g., as (x, y) pixel locations in frame 2800). Next, update engine 2604 converts each point in the grid into clip space (e.g., a value bounded by −1 and 1 in the x- and y-axes) by calculating the coordinates of the point in clip space as ((2*x/width)−1, 1−(2*y/height)), where "x" is the x-coordinate of the point in frame 2800, "y" is the y-coordinate of the point in frame 2800, "width" is the pixel width of frame 2800, and "height" is the pixel height of frame 2800. Next, update engine 2604 multiplies the inverse of the projection matrix for image sensor 1926 by the point in clip space to generate a ray in the "view space" of image sensor 1926 and subsequently multiplies the inverse of the view matrix associated with image sensor 1926 by the ray in view space to obtain the ray in the 3D "world space" of the 3D representation. Update engine 2604 identifies one or more textured meshes 2624 and/or untextured meshes 2626 that intersect the ray (e.g., by determining whether or not individual faces of textured meshes 2624 and/or untextured meshes 2626 intersect the ray) and sorts the intersecting meshes by distance from image sensor 1926. Update engine 2604 then identifies, within the sorted meshes, a mesh that is the closest to image sensor 1926 and adds the mesh to non-occluded meshes 2806 (if the mesh is a textured mesh) or non-occluded meshes 2808 (if the mesh is an untextured mesh).

Update engine 2604 additionally includes functionality to perform hit-test 2816 in an efficient, parallelizable manner. More specifically, update engine 2604 may perform operations related to converting individual 2D points 2804 in the grid into clip space, generating rays from the grid points to image sensor 1926, identifying and sorting meshes that intersect the rays, and selecting the closest meshes for inclusion in non-occluded meshes 2806 and/or 2808 concurrently. For example, update engine 2604 may spawn multiple threads executing in parallel on multiple processors or processor cores to perform hit-test 2816 and use a different thread to perform operations related to converting a corresponding point in the grid into a ray, identifying meshes that intersect the ray, and identify a non-occluded mesh intersected by the ray. To further reduce latency associated with performing hit-test 2816, update engine 2604 may execute some or all of these threads on one or more GPUs and/or GPU cores.

After non-occluded meshes 2806 and 2808 in frame 2800 are identified for textured meshes 2624 and untextured meshes 2626, respectively, update engine 2604 "cuts" a view frustum 2802 associated with frame 2800 from non-occluded meshes 2806 and 2808 and performs mesh updates associated with frame 2800 using the cut portion. First, update engine 2604 groups faces in each of non-occluded meshes 2806 and 2808 into fully-outside-frustum (FoF) faces 2810, cut-by-frustum (CbF) faces 2812, and fully-inside-frustum (FiF) faces 2814. FoF faces 2810 include faces in non-occluded meshes 2806 and 2808 with vertices that are all outside view frustum 2802, FiF faces 2814 include faces in non-occluded meshes 2806 and 2808 with vertices that are all inside view frustum 2802, and CbF faces 2812 include faces in non-occluded meshes 2806 and 2808 with one or more vertices that are inside view frustum 2802 and one or more vertices that are outside view frustum 2802.

In one or more examples or implementations, update engine 2604 divides each mesh in non-occluded meshes 2806 and 2808 into groups of FoF faces 2810, CbF faces 2812, and FiF faces 2814 by determining, for each face in non-occluded meshes 2806 and 2808, whether the vertices of the face are in the negative or positive half-space of each plane in view frustum 2802. Update engine 2604 then adds the face to FoF faces 2810, CbF faces 2812, or FiF faces 2814 based on the positions of the vertices with respect to the negative and positive half-spaces of all planes in view frustum 2802.

For example, view frustum 2802 may be represented by four planes that represent the top, bottom, left, and right "sides" of the rectangular pyramid between the near and far planes. The positive half-space of each plane is represented by the side of the plane toward which the normal for the plane points. In this example, all four planes include normals that point toward the center of view frustum 2802, so that a point is inside view frustum 2802 if the point is in the positive half-space of all four planes.

Continuing with the above example, each plane may be represented using the following formula:

$$ax+by+cz=d$$

In turn, the half-space in which a given 3D point $(x_1, y_1, z_1)$ is located can be determined using the following inequalities:

positive half-space: $ax_1+by_1+cz_1 >= d$ negative half-space: $ax_1+by_1+cz_1 < d$ Thus, update engine 2604 may add a triangular face to FoF faces 2810 when all three vertices are in the negative half-space of at least one of the four planes representing view frustum 2802. If one or two vertices are in the negative half-space of at least one of the four planes, update engine 2604 may add the face to CbF faces 2812. If all three vertices are in the positive half spaces of all four planes, update engine 2604 may add the face to FiF faces 2814.

Next, update engine 2604 "cuts" each face in CbF faces 2812 by one or more planes bounding view frustum 2802 that intersect the face to divide the face into one or more new faces 2826 that are outside view frustum 2802 and/or one or more new faces 2828 that are inside view frustum 2802.

Figure 29:
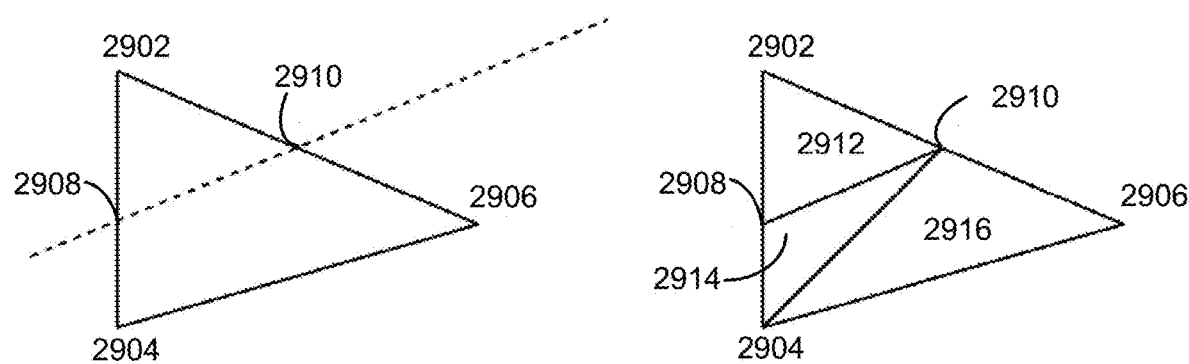
FIG. 29 illustrates the cutting of a polygon face used in the mesh frustum cutting technique of FIG. 28, in accordance with one or more examples or implementations.

More specifically, FIG. 29 illustrates the cutting of a polygon face used in the mesh frustum cutting technique of FIG. 28, in accordance with one or more examples or implementations. As shown, the polygon face includes a triangle with vertices 2902, 2904, and 2906. The triangle is intersected by a plane at a point 2908 along an edge between vertices 2902 and 2904 and another point 2910 along an edge between vertices 2902 and 2906.

The intersection points 2908 and 2910 can then be used to divide the triangle into multiple new triangles. In particular, a plane that cuts a triangle will include two vertices of the triangle on one side and one vertex of the triangle on the other side. The side with two vertices from the original triangle may be used to create two new triangles, while the side with one vertex from the original triangle may be used to create one new triangle. As shown in FIG. 29, the division of the triangle along a line represented by intersection points 2908 and 2910 results in one triangle 2912 on one side of the line that includes vertex 2902 and points 2908 and 2910. The division also produces two triangles 2914 and 2916 on the other side of the line; triangle 2914 includes points 2908 2910 and vertex 2904, and triangle 2916 includes vertices 2904 and 2906 and point 2910.

In one or more examples or implementations, update engine 2604 determines whether or not a plane intersects a line segment using the following plane intersection formula:

$$s=((P-A)*n)/((B-A)*n)$$

where s represents the "proportion" of the line segment along which the intersection point with the plane lies and AB represents the line segment. The plane is represented by $P*n=0$, where P is any point on the plane and n is the normal vector to the plane. Given $P=(x_p, y_p, z_p)$, the $P*n=0$ representation is related to the $ax+by+cz=d$ representation of the plane above by $n=(a, b, c)$ and $d=ax_p+by_p+cz_p$. If s is in the range of (0, 1), the line segment is intersected by the plane at a point representing s part of the way between the A and B ends of the line segment (e.g., if s=0.5, the plane intersects the line segment at the midpoint of the line segment). The point of intersection Y is then calculated by interpolating between the coordinates of the endpoints of the line segment:

$$Y=Bs+A(1-s)$$

The same formula can be used to linearly interpolate the texture coordinate of the point of intersection by replacing A and B with the texture coordinates of the endpoints of the line segment.

The formulas above may be used to "cut" a triangle into multiple triangles on different sides of the triangle's intersection with a plane. For example, update engine 2604 may calculate s for edges of the triangle in parallel. When 0<s<1 for a given edge, update engine 2604 may calculate the 3D and texture coordinates of the intersection point of the plane with the edge using the linear interpolation formula. When the triangle is intersected by the plane, update engine 2604 may calculate the 3D and texture coordinates of two intersection points of the plane with the triangle. Conversely, update engine 2604 may omit the calculation of intersection points (or texture coordinates) when s≤0 or s≥1 for all edges of the triangle.

Returning to the discussion of FIG. 28, update engine 2604 uses intersection points 2820 of CbF faces 2812 with the boundaries of view frustum 2802 to create new faces 2826 and 2828. New faces 2826 are formed using intersection points 2820 and vertices outside frustum 2822 (i.e, vertices that fall outside view frustum 2802) from CbF faces 2812 in textured non-occluded meshes 2806, and new faces 2828 are formed using intersection points 2820 and vertices inside frustum 2824 (i.e., vertices that fall inside view frustum 2802) from CbF faces 2812 in untextured non-occluded meshes 2808.

To generate new faces 2826, update engine 2604 may iterate over CbF faces 2812 in each of non-occluded meshes 2806. For each face, update engine 2604 may iterate over the four planes denoting the boundaries of view frustum 2802. For each plane, update engine 2604 may attempt to "cut" the face using the plane (i.e., using the parallelized technique in the above example). When a face is not "cut" successfully by a plane (i.e., when the plane does not intersect the face), update engine 2604 continues iterating over remaining planes. When a face is cut successfully by a plane (i.e., when the plane does intersect the face), update engine 2604 obtains two intersection points 2820 (denoted by "X" and "Y") of the face with the plane and two new texture coordinates for the pair of intersection points 2820. Update engine 2604 also identifies one or more vertices outside frustum 2822 (e.g., vertices in the negative half-space of the plane) in the face and forms one or more new faces 2826 using intersection points 2820 and the identified vertices outside frustum 2822. If the face includes one vertex (denoted by "A") outside view frustum 2802, update engine 2604 creates a face that includes vertices "A," "X," and "Y" and adds the face to new faces 2826. If the face includes two vertices (denoted by "A" and "B") outside view frustum 2802, update engine 2604 creates two faces that include vertices "A," "X," and "Y" and "A," "Y," and "B," respectively, and adds the faces to new faces 2826.

To generate new faces 2828, update engine 2604 may iterate over CbF faces 2812 in each of non-occluded meshes 2808. For each face, update engine 2604 may iterate over the four planes denoting the boundaries of view frustum 2802. For each plane, update engine 2604 may attempt to "cut" the face using the plane (i.e., using the parallelized technique in the above example). When a face is not "cut" successfully by a plane (i.e., when the plane does not intersect the face), update engine 2604 continues iterating over remaining planes. When a face is cut successfully by a plane (i.e., when the plane does intersect the face), update engine 2604 obtains two intersection points 2820 (denoted by "X" and "Y") of the face with the plane and two new texture coordinates for the pair of intersection points 2820. Update engine 2604 also identifies one or more vertices inside frustum 2824 (e.g., vertices in the positive half-space of the plane) in the face and forms one or more new faces 2828 using intersection points 2820 and the identified vertices inside frustum 2824. If the face includes one vertex (denoted by "A") inside view frustum 2802, update engine 2604 creates a face that includes vertices "A," "X," and "Y" and adds the face to new faces 2828. If the face includes two vertices (denoted by "A" and "B") inside view frustum 2802, update engine 2604 creates two faces that include vertices "A," "X," and "Y" and "A," "Y," and "B," respectively, and adds the faces to new faces 2828.

In one or more examples or implementations, update engine 2604 generates, from FoF faces 2810 and new faces 2826 associated with textured non-occluded meshes 2806, one or more replacement meshes 2830 that lack portions of non-occluded meshes 2806 that fall within view frustum 2802. For example, update engine 2604 may add FoF faces 2810 in non-occluded meshes 2806 to replacement meshes 2830 by copying vertices, normals, faces, and texture coordinates of FoF faces 2810 to the corresponding data structures (e.g., arrays) for replacement meshes 2830. As new faces 2826 are formed from intersection points 2820 and vertices outside frustum 2822 of CbF faces 2812 in non-occluded meshes 2806, update engine 2604 may append vertices, normals, faces, and texture coordinates associated with new faces 2826 to the corresponding data structures for replacement meshes 2830. Update engine 2604 may then create replacement meshes 2830 by instantiating one or more objects representing new meshes using the vertices, normals, faces, and texture coordinates in the data structures and set the material of each replacement mesh to the material of a corresponding non-occluded mesh. As a result, replacement meshes 2830 may represent "clones" of non-occluded meshes 2806 that lack portions of non-occluded meshes 2806 that fall within view frustum 2802.

Update engine 2604 also removes non-occluded meshes 2806 from the 3D representation to allow scanning engine 2602 to generate new textured meshes 2624 from 3D points 2608 captured by depth sensor 1924 concurrently with the capture of frame 2800 by image sensor 1926. In other words, update engine 2604 replaces non-occluded meshes 2806 with replacement meshes 2830 that have view frustum 2802 cut out to trigger retexturing of the cut-out portion using frame 2800.

In one or more examples or implementations, update engine 2604 generates, from FiF faces 2814 and new faces 2828 associated with untextured non-occluded meshes 2808, one or more textured meshes 2832 that include only the portions of non-occluded meshes 2808 that are inside view frustum 2802. For example, update engine 2604 may add FiF faces 2814 in non-occluded meshes 2808 to textured meshes 2832 by copying vertices, normals, faces, and texture coordinates of FiF faces 2814 to the corresponding data structures for textured meshes 2832. As new faces 2828 are formed from intersection points 2820 and vertices inside frustum 2824 of CbF faces 2812 in non-occluded meshes 2808, update engine 2604 may append vertices, normals, faces, and texture coordinates associated with new faces 2828 to the corresponding data structures for textured meshes 2832. Update engine 2604 may then create textured meshes 2832 by instantiating one or more objects representing new meshes with vertices, normals, faces, and texture coordinates in the data structures and texturing each new mesh with frame 2800. As a result, textured meshes 2832 may include portions of non-occluded meshes 2808 that fall within view frustum 2802 and include frame 2800 as a texture. These textured meshes 2832 may be given precedence over the corresponding untextured non-occluded meshes 2808 in the 3D representation, thereby resulting in the rendering of textured meshes 2832 in the 3D representation in lieu of the corresponding non-occluded meshes 2808.

Figure 30:
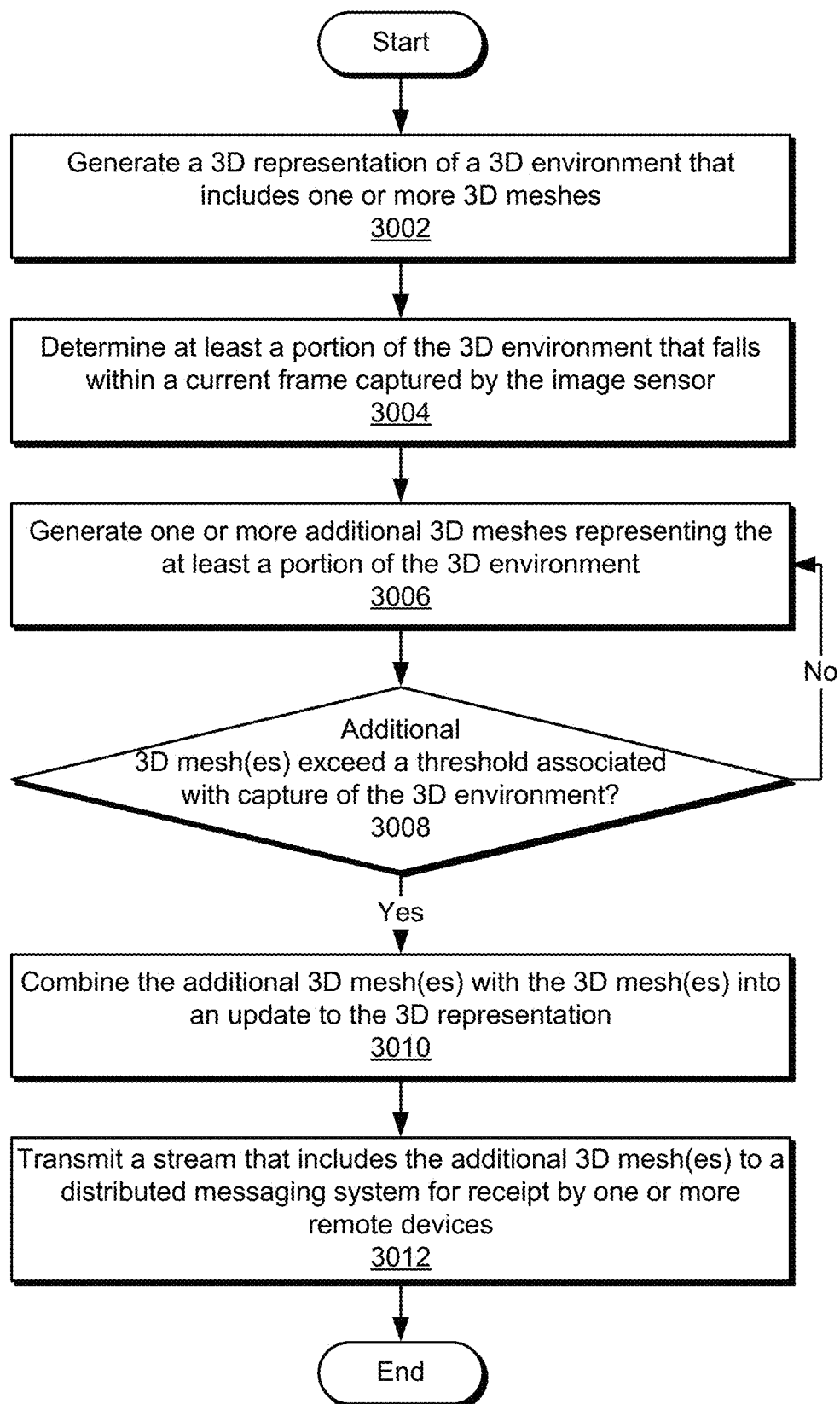
FIG. 30 is a flow chart of method steps for scanning a 3D environment, in accordance with one or more examples or implementations.

FIG. 30 is a flow chart of method steps for scanning a 3D environment, in accordance with one or more examples or implementations. Although the method steps are described in conjunction with FIGS. 1-29, persons of ordinary skill in the art will understand that any system configured to perform this method and/or other methods described herein, in any order, and in any combination not logically contradicted, is within the scope of the disclosed techniques.

As shown, scanning engine 2602 generates 3002 a 3D representation of the 3D environment that includes one or more 3D meshes. For example, each 3D mesh may include a set of vertices representing 3D points captured of the 3D environment by a depth sensor on a host device, a set of faces formed from edges between pairs of vertices in the set of vertices, and a set of textures generated using one or more previous frames captured of the 3D environment by an image sensor on the host device. When a given 3D mesh is large (e.g., larger than a frame captured by the image sensor), scanning engine 2602 and/or update engine 2604 may optionally update the 3D representation by dividing the mesh into multiple smaller sub-meshes.

In one or more examples or implementations, the depth sensor includes a LIDAR sensor, the image sensor includes a camera, and the host device includes a mobile device (e.g., a tablet, a mobile phone etc.). As a result, the 3D representation may be generated by using the mobile device to "scan" the 3D environment (e.g., for the purposes of constructing a 3D model of the environment and/or rendering the 3D model on a different device).

Next, update engine 2604 determines 3004 at least a portion of the 3D environment that falls within a current frame captured by the image sensor. For example, update engine 2604 may perform operation 3004 by projecting vertices of each 3D mesh onto pixel locations of a 2D "screen space" representing the dimensions of the current frame. If a vertex in a mesh includes screen-space coordinates that exceed the dimensions of the current frame, update engine 2604 may determine that the vertex does not fall within the current frame. If a vertex in a mesh includes screen-space coordinates that do not exceed the dimensions of the current frame, update engine 2604 may determine that the vertex falls within the current frame. In turn, update engine 2604 may determine that a given mesh falls within the current frame if at least one vertex in the mesh falls within the current frame. Alternatively, update engine 2604 may determine that a mesh falls within the current frame if all vertices in the mesh fall within the current frame.

In another example, update engine 2604 may perform operation 3004 as a hit-test that identifies, for a grid of points in the current frame, a set of non-occluded meshes intersected by a projection of rays from the image sensor to the points. Update engine 2604 may then divide each of the non-occluded meshes along one or more boundaries of a view frustum associated with the current frame to determine the portion of 3D environment that falls within the current frame as corresponding to the portion of the non-occluded meshes that falls within the view frustum.

Update engine 2604 generates 3006 one or more additional 3D meshes representing the at least a portion of the 3D environment that falls within the current frame. During generation of the additional 3D mesh(es), update engine 2604 compares the additional 3D mesh(es) with a threshold associated with the capture of the 3D environment to determine 3008 if the threshold is met. For example, update engine 2604 may iteratively add new vertices, faces, normals, and/or textures to each of the additional 3D mesh(es) as 3D points are collected by the depth sensor. After a given mesh has been generated or updated using operation 3006, update engine 2604 may compare the mesh to a threshold representing a certain density of vertices and/or faces, a pre-specified period over which the mesh has been updated (e.g., a certain number of frames collected by the image sensor), and/or another threshold representing a completeness of the capture of the 3D environment.

Once the additional 3D mesh(es) meet the threshold associated with operation 3008, update engine 2604 combines 3010 the additional 3D mesh(es) with the 3D mesh(es) into an update to the 3D representation. For example, update engine 2604 may discard one or more textured portions of the older 3D mesh(es) that overlap with a first mesh in the additional 3D mesh(es) to trigger replacement of the textured portion(s) with the first mesh in the 3D representation. Update engine 2604 may also, or instead, overlay one or more untextured portions of the older 3D mesh(es) with a second mesh in the additional 3D mesh(es) that is textured using the current frame. Because textured meshes may take precedence over untextured meshes in the 3D representation, the second mesh may be rendered in the 3D representation in lieu of the corresponding untextured portion(s).

Finally, update engine 2604 transmits 3012 a stream that includes the additional 3D mesh(es) to a distributed messaging system for receipt by one or more remote devices. For example, update engine 2604 may transmit the stream to a broker for the distributed messaging system. The stream may include vertices, faces, normals, textures, materials, and/or other components of each of the additional 3D mesh(es) and/or messages that identify any older 3D meshes to be discarded. In other words, the stream may include a series of updates that are applied to the 3D representation to reflect the latest 3D and/or 2D data captured by the depth and/or image sensors on the host device.

Continuing with the above example, the broker may store the additional 3D mesh(es) and/or messages from the stream in one or more message queues and/or backend data stores. The remote device(s) may include clients that subscribe to updates by the host device. These remote device(s) may thus receive the additional 3D mesh(es) from the broker, message queues, and/or backend data store(s) (e.g., after receiving links or URLs to files containing the additional 3D mesh(es) from the broker or message queues). The remote device(s) may additionally execute an extended reality application that renders the 3D representation in an augmented reality environment, thereby allowing users of the remote device(s) to view the 3D representation from various angles; interact or collaborate with the user of the host device with respect to one or more objects in the 3D representation; view schemas, dashboards, cards, visualizations, and/or other content related to the object(s) based on tags and/or field values associated with the object(s); and/or run playbooks or workflows related to the object(s).

Figure 31:
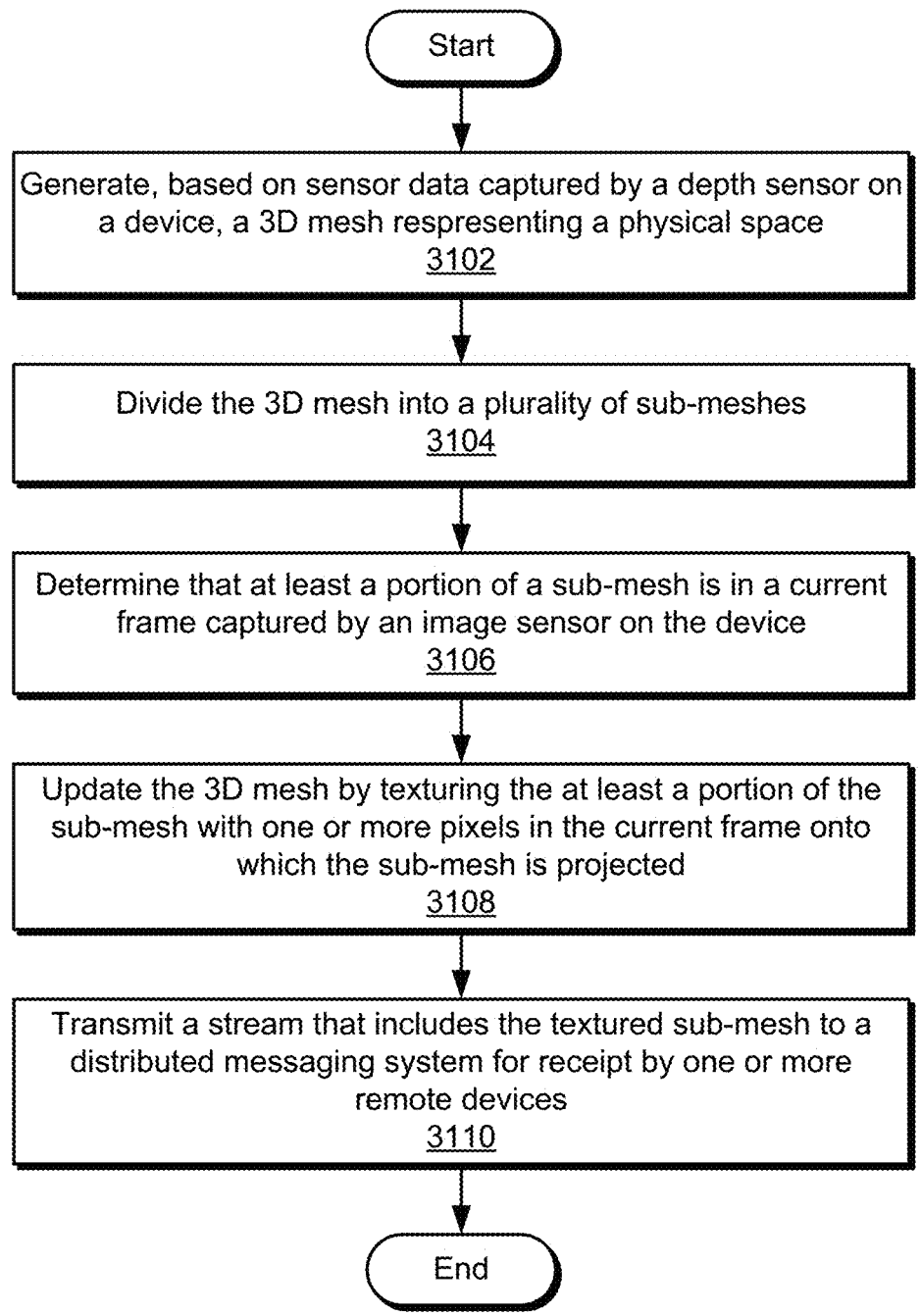
FIG. 31 is a flow chart of method steps for texturing a mesh using a mesh splitting technique, in accordance with one or more examples or implementations.

FIG. 31 is a flow chart of method steps for texturing a mesh using a mesh splitting technique, in accordance with one or more examples or implementations. Although the method steps are described in conjunction with FIGS. 1-29, persons of ordinary skill in the art will understand that any system configured to perform this method and/or other methods described herein, in any order, and in any combination not logically contradicted, is within the scope of the disclosed techniques.

As shown, scanning engine 2602 generates 3102, based on sensor data captured by a depth sensor on a device, a 3D mesh representing a physical space. For example, scanning engine 2602 may convert a 3D point cloud captured by the depth sensor into a set of vertices in the 3D mesh. Scanning engine 2602 may also connect pairs of vertices by edges to form triangular (or other polygon-shaped) faces in the 3D mesh.

Next, update engine 2604 divides 3104 the 3D mesh into a plurality of sub-meshes. For example, update engine 2604 may copy five contiguous sequences of faces in a "face array" for the 3D mesh into five new face arrays representing five sub-meshes, so that the sub-meshes are populated with disjoint subsets (around 20% each) of the faces from the 3D mesh and each of the sub-mesh face arrays maintains an ordering of a subset of faces from the original face array for the 3D mesh. Thus, when the original face array for the 3D mesh includes an ordering of contiguous faces, keeping the same ordering of faces in face arrays for the sub-meshes allows the sub-meshes to also be contiguous.

Update engine 2604 determines 3106 that at least a portion of a sub-mesh is in a current frame captured by an image sensor on the device. For example, update engine 2604 may project vertices of each sub-mesh onto pixel locations in the current frame. When a vertex is projected onto a pixel location that falls within the dimensions of the current frame, the vertex is determined to be within the current frame. In turn, update engine 2604 may determine that the sub-mesh is in the current frame if at least one vertex in the sub-mesh is projected onto a valid pixel location in the current frame (i.e., if the sub-mesh is at least partially in the current frame). Alternatively, update engine 2604 may determine that the sub-mesh is in the current frame if all vertices in the mesh are in the current frame (i.e., if the sub-mesh is fully in the current frame).

Update engine 2604 then updates 3108 the 3D mesh by texturing the at least a portion of the sub-mesh with one or more pixels in the current frame onto which the sub-mesh is projected. For example, update engine 2604 may discard an older version of the sub-mesh that is textured using a previous frame captured by the image sensor to trigger generation of a newer version of the sub-mesh that is textured using the current frame by scanning engine 2602. Update engine 2604 may also, or instead, generate a clone of an untextured version of the sub-mesh and texture the clone with the current frame, which causes the clone to be rendered in lieu of the untextured version (e.g., because textured meshes are prioritized over untextured meshes during rendering).

Finally, update engine 2604 transmits 3110 a stream that includes the textured sub-mesh to a distributed messaging system for receipt by one or more remote devices. The remote device(s) may then display the updated 3D mesh that includes the textured sub-mesh in an extended reality application and/or augmented reality environment.

Figure 32:
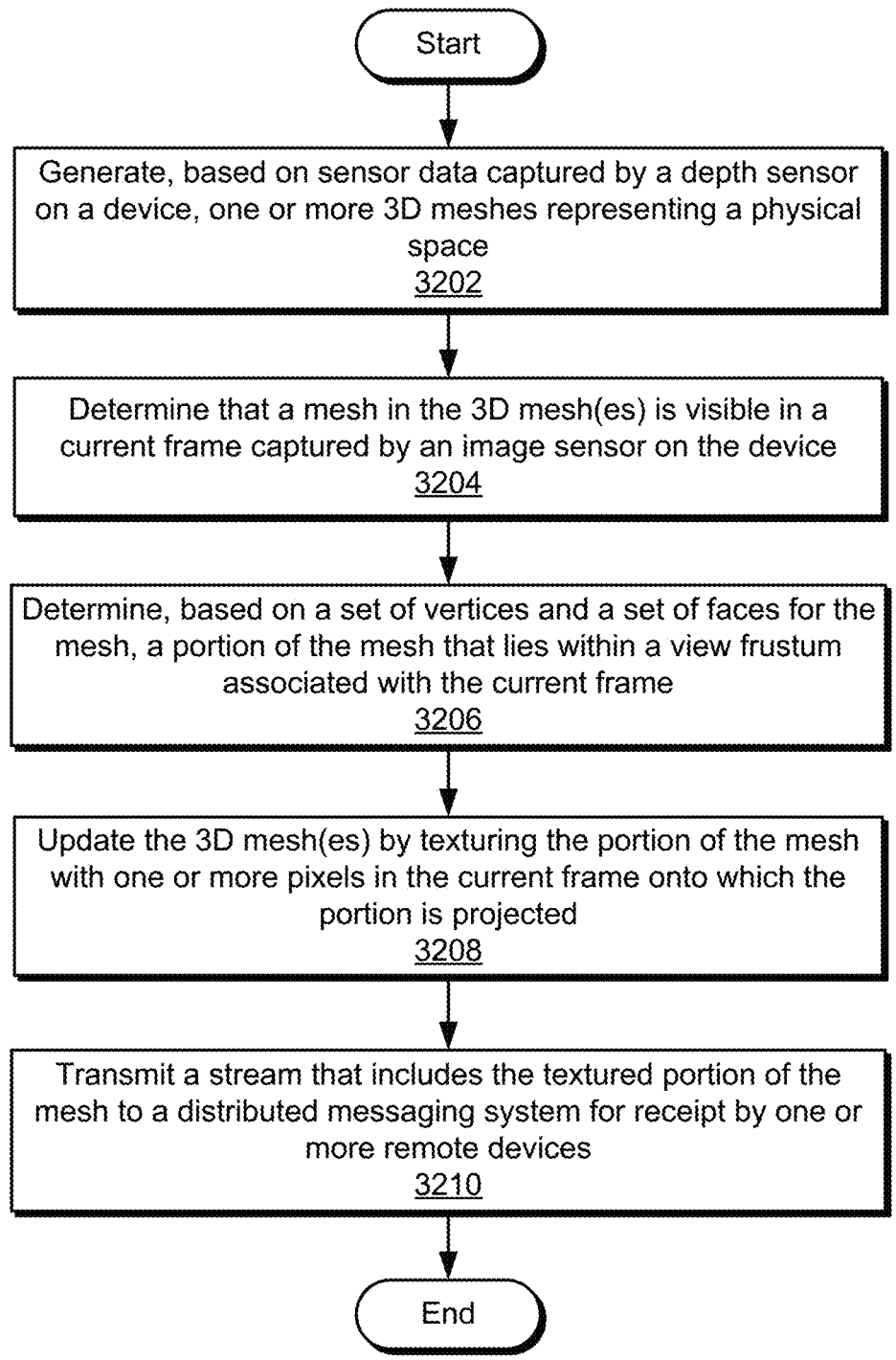
FIG. 32 is a flow chart of method steps for texturing a mesh using a mesh frustum cutting technique, in accordance with one or more examples or implementations.

FIG. 32 is a flow chart of method steps for texturing a mesh using a mesh frustum cutting technique, in accordance with one or more examples or implementations. Although the method steps are described in conjunction with FIGS. 1-29, persons of ordinary skill in the art will understand that any system configured to perform this method and/or other methods described herein, in any order, and in any combination not logically contradicted, is within the scope of the disclosed techniques.

As shown, scanning engine 2602 generates 3202, based on sensor data captured by a depth sensor on a device, one or more 3D meshes representing a physical space. For example, the depth sensor may include a LIDAR sensor that generates a 3D point cloud representing objects or surfaces in the physical space. Scanning engine 2602 may convert the 3D point cloud into a set of vertices in the 3D mesh(es) and connect pairs of vertices with edges to form faces in the 3D mesh(es).

Next, update engine 2604 determines 3204 that a mesh in the 3D mesh(es) is visible in a current frame captured by an image sensor on the device. For example, update engine 2604 may perform a hit-test that generates a grid of 2D points in the current frame and generates, in parallel for the grid of 2D points, a set of rays representing projection of the grid of 2D points into a 3D space in which the sets of vertices of the 3D mesh(es) are distributed. The hit-test also determines at least a subset of the 3D mesh(es) that intersect the set of rays and uses an ordering of meshes that intersect a given ray by distance from the image sensor to identify the mesh as visible in the current frame (e.g., because the mesh is closer to the image sensor than any other meshes in the order).

Update engine 2604 also determines 3206, based on a set of vertices and a set of faces for the mesh, a portion of the mesh that lies within a view frustum associated with the current frame, as described in further detail below with respect to FIG. 33. For example, update engine 2604 may generate the portion by "cutting" the view frustum out of the mesh.

Update engine 2604 then updates 3208 the 3D mesh(es) by texturing the portion of the mesh with one or more pixels in the current frame onto which the portion is projected. For example, update engine 2604 may create a clone of an older textured version of the mesh that lacks the portion of the mesh that lies within the view frustum. Update engine 2604 may also discard the older version of the mesh to trigger generation of a new mesh that includes the portion and texturing of the new mesh with the pixel(s) in the current frame by scanning engine 2602. In another example, update engine 2604 may create a clone of an untextured version of the mesh, where the clone includes the portion of the mesh that lies within the view frustum (and lacks any portions of the mesh that lie outside the view frustum) and is textured with the pixel(s) in the current frame. Update engine 2604 may then overlay an untextured version of the mesh with the clone.

Finally, update engine 2604 transmits 3210 a stream that includes the textured portion of the mesh to a distributed messaging system for receipt by one or more remote devices. The remote device(s) may then render the 3D mesh(es), which include the textured portion of the mesh, in an extended reality application and/or augmented reality environment, thereby providing users of the remote device(s) with a 3D representation of the physical space that is textured using the most recent frames captured by the image sensor.

Figure 33:
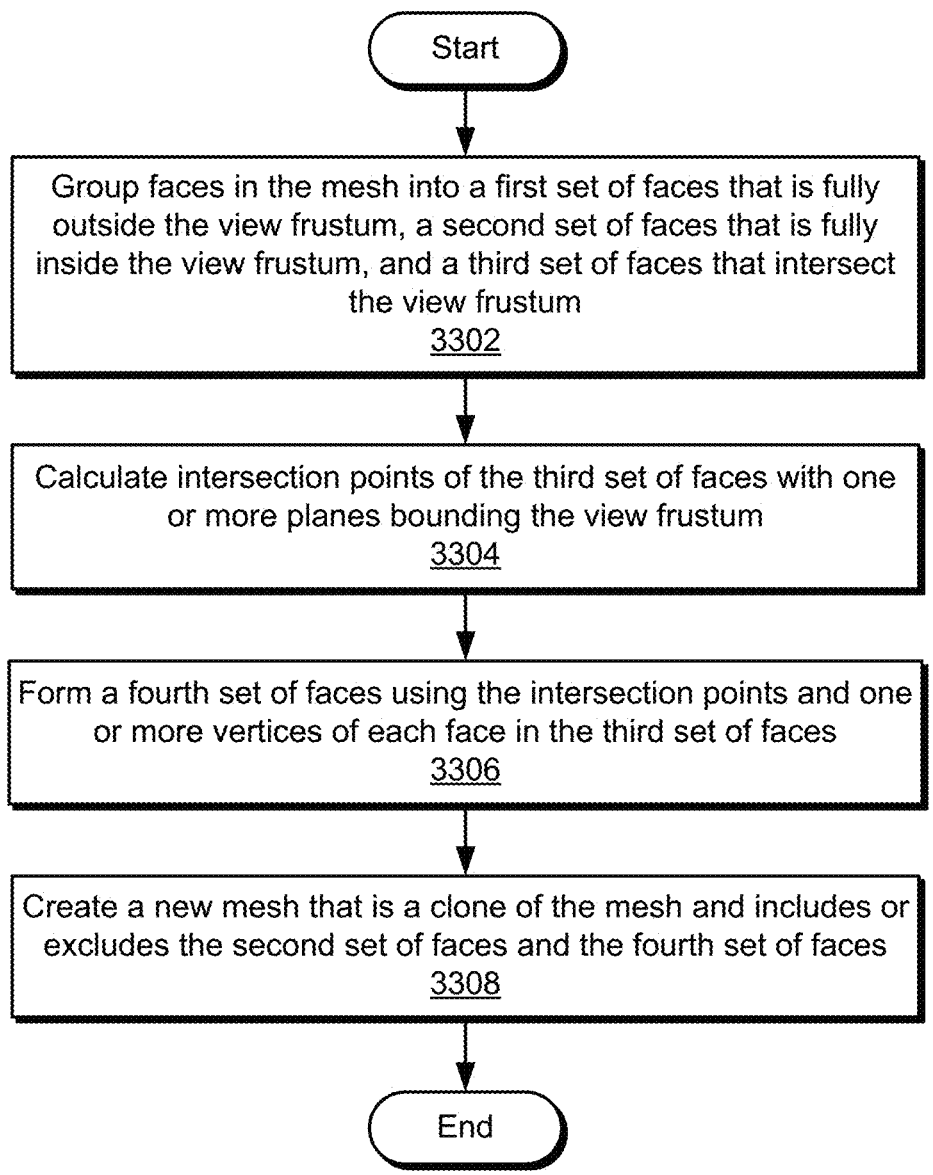
FIG. 33 is a flow chart of method steps for cutting a view frustum from a mesh, in accordance with one or more examples or implementations.

FIG. 33 is a flow chart of method steps for cutting a view frustum from a mesh, in accordance with one or more examples or implementations. Although the method steps are described in conjunction with FIGS. 1-29, persons of ordinary skill in the art will understand that any system configured to perform this method and/or other methods described herein, in any order, and in any combination not logically contradicted, is within the scope of the disclosed techniques.

As shown, update engine 2604 groups 3302 faces in the mesh into a first set of faces that is fully outside the view frustum, a second set of faces that is fully inside the view frustum, and a third set of faces that intersect the view frustum. For example, update engine 2604 may determine the positions of the vertices of each face in the positive or negative half-space of one or more planes bounding the view frustum. When all three vertices are in the negative half-space of a plane, the face is added to the first set of faces. When one or two vertices are in the negative half-space of a plane, the face is added to the third set of faces. When all three vertices are in the positive half-space of all planes bounding the view frustum, the face is added to the second set of faces.

Next, update engine 2604 calculates 3304 intersection points of the third set of faces with one or more planes bounding the view frustum. For example, update engine 2604 may calculate the "proportion" of a given edge in a face that represents the intersection of the edge with a plane. Update engine 2604 may also use linear interpolation between the two vertices (or texture coordinates associated with the vertices) connected by the edge to convert the proportion into 3D coordinates of the intersection (or a texture coordinate for the intersection). As a result, update engine 2604 may calculate, for each face in the third set of faces, two new vertices (and/or two new texture coordinates) representing the intersection points of the edges of the face with a plane bounding the frustum.

Update engine 2604 then forms 3306 a fourth set of faces using the intersection points and one or more vertices of each face in the third set of faces. For example, update engine 2604 may include, in the fourth set of faces, portions of the third set of faces that are outside the view frustum. As a result, update engine 2604 may add, to the fourth set of faces, new faces that include the intersection points of each face in the third set of faces with a boundary of the view frustum and one or more vertices of the face that fall outside the boundary. Conversely, update engine 2604 may include, in the fourth set of faces, portions of the third set of faces that are inside the view frustum. In turn, update engine 2604 may add, to the fourth set of faces, new faces that include the intersection points of each face in the third set of faces with a boundary of the view frustum and one or more vertices of the face that fall within the boundary.

Finally, update engine 2604 creates 3308 a new mesh that is a clone of the mesh and includes the fourth set of faces and either the first or second set of faces. For example, update engine 2604 may include, in the new mesh, the portion of the mesh that falls outside the view frustum by adding the first set of faces and a fourth set of faces formed from portions of the third set of faces that fall outside the view frustum to the mesh. In another example, update engine 2604 may include, in the new mesh, the portion of the mesh that falls inside the view frustum by adding the second set of faces and a fourth set of faces formed from portions of the third set of faces that fall within the view frustum to the mesh. The new mesh may then be textured and used to update a 3D representation of a physical space, as discussed above.

In sum, the disclosed techniques perform mesh updates in a augmented reality environment. The augmented reality environment includes a 3D representation of a physical space (e.g., an object, a room, etc.). This 3D representation includes one or more 3D meshes that include vertices and faces created from a 3D point cloud generated by a depth sensor on a host device. The 3D representation also includes textures generated from one or more frames captured by an image sensor on the host device of the physical space. The 3D representation is updated to reflect the latest 3D points generated by the depth sensor and/or the latest frames captured by the image sensor by periodically and/or continuously generating new 3D meshes that reflect the latest 3D points produced by the depth sensor, texturing the new 3D meshes using the latest frames from the image sensor, and adding the new 3D meshes to the 3D representation. The updated 3D representation and/or new 3D meshes may also be transmitted in a stream to a distributed messaging system for receipt by one or more remote devices. The remote device(s) may retrieve the updated 3D representation and/or new 3D meshes from the stream and render the updated 3D representation (including the new 3D meshes) in an extended reality application and/or augmented reality environment, thereby allowing users of the remote device(s) to view a substantially up-to-date rendering of the 3D representation from different perspectives and/or interact with a user of the host device to perform one or more operations related to the physical space.

One technique for updating the 3D representation with the latest 3D points from the depth sensor and/or the most recent frame captured by the image sensor includes dividing each of the 3D meshes into a number of sub-meshes and identifying one or more sub-meshes that fall (partially or entire) within the frame. The 3D representation is then updated by texturing one or more portions of the 3D representation represented by the identified sub-mesh(es) using pixel values from the frame.

Another technique for updating the 3D representation with the latest 3D points and/or the most recent frame captured by the image sensor includes identifying one or more meshes that are visible in the frame and determining, for each of the meshes, a portion of the mesh that falls within a view frustum associated with the frame. The 3D representation is then updated by texturing portions of the meshes that are inside the view frustum using pixel values from the frame.

Because the 3D representation includes meshes that are continuously textured using the latest frames from the image sensor, the 3D representation is more accurate and/or up-to-date than 3D representations that include large 3D meshes, where each mesh textured using a single image and wrapping or stretching of the image is performed to texture portions of the mesh that fall outside the image. Transmission of newly textured meshes in the 3D representation to a distributed messaging system and/or a remote device also allows the 3D representation to be shared with other users and/or rendered on an extended reality application on the remote device while reducing latency and/or resource overhead associated with generating and rendering accurate and/or up-to-date 3D representations of objects.

For example, a conventional technique for generating a 3D representation includes performing a 3D scan of a physical object to generate a 3D representation that includes a mesh of the object and one or more textures obtained from 2D images captured by a camera during the scan. The textured mesh is then saved in one or more files representing the 3D representation, and the files are copied or transmitted to one or more devices for rendering of the 3D representation on the device(s). When a change to the object is made (e.g., parts of the object are rearranged into a new configuration, the object is painted in a new color, etc.), processor, memory, and/or storage resources are consumed to perform a new 3D scan of the object and produce, from the new 3D scan, a new 3D representation that captures the change. Network resources may also be consumed during transmission of the new 3D representation to the device(s) to allow rendering of the new 3D representation on the device(s).

On the other hand, the disclosed techniques include functionality to perform selective retexturing of portions of a 3D representation of an object as new images of the object are captured, which involves lower resource consumption than performing a complete 3D scan of the same object. The selectively retextured portions are also transmitted to the remote device(s) to allow rendering of an up-to-date representation of the object on the remote device(s), which reduces network usage over techniques that generate and transmit new versions of 3D representations to remote device(s) to allow the remote device(s) to accurately render objects represented by the 3D representations. Consequently, by incrementally texturing portions of the 3D representation with the latest image sensor frames and transmitting newly textured portions of the 3D representation to the remote devices for rendering, the disclosed techniques provide technological improvements in the efficiency, accuracy, latency, and/or resource overhead of computer systems, applications, frameworks, and/or techniques for generating, sharing, and rendering 3D representations of objects.

The descriptions of the various implementations have been presented for purposes of illustration, but are not intended to be exhaustive or limited to the implementations disclosed. Many modifications and variations will be apparent to those of ordinary skill in the art without departing from the scope and spirit of the described implementations.

Aspects of the present implementations may be embodied as a system, method or computer program product. Accordingly, aspects of the present disclosure may take the form of an entirely hardware implementation, an entirely software implementation (including firmware, resident software, micro-code, etc.) or an implementation combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

1. In some implementations, a method for scanning a three-dimensional (3D) environment comprises generating a 3D representation of the 3D environment that includes one or more 3D meshes, wherein the one or more 3D meshes comprise (i) a first set of vertices representing 3D points captured of the 3D environment by a depth sensor on a host device, (ii) a first set of faces formed from edges between pairs of vertices in the first set of vertices, and (iii) a first set of textures generated based on one or more previous frames captured of the 3D environment by a image sensor on the host device; determining at least a portion of the 3D environment that falls within a current frame captured by the image sensor; generating one or more additional 3D meshes representing the at least a portion of the 3D environment, wherein the one or more additional 3D meshes comprise (i) a second set of vertices representing additional 3D points captured by the depth sensor concurrently with capture of the current frame by the image sensor, (ii) a second set of faces formed from edges between pairs of vertices in the second set of vertices, and (iii) a second set of textures generated based on the current frame; and combining the one or more additional 3D meshes with the one or more 3D meshes into an update to the 3D representation of the 3D environment.

2. The method of clause 1, further comprising transmitting a stream comprising the one or more additional 3D meshes to a distributed messaging system for receipt by one or more remote devices.

3. The method of any of clauses 1-2, further comprising transmitting the one or more additional 3D meshes for receipt by one or more remote devices executing an extended reality application that renders the 3D representation on the one or more remote devices.

4. The method of any of clauses 1-3, wherein generating the one or more additional 3D meshes comprises iteratively updating the one or more additional 3D meshes with additional vertices and faces associated with the 3D points captured by the depth sensor until a threshold associated with capture of the 3D environment is met.

5. The method of any of clauses 1-4, wherein determining the at least a portion of the 3D environment that falls within the current frame comprises projecting one or more vertices of the one or more 3D meshes onto one or more pixel locations in the current frame.

6. The method of any of clauses 1-5, wherein determining the at least a portion of the 3D environment that falls within the current frame comprises dividing a 3D mesh in the one or more 3D meshes into a plurality of sub-meshes; and determining that a sub-mesh in the plurality of sub-meshes includes at least one vertex that falls within the current frame.

7. The method of any of clauses 1-6, wherein determining the at least a portion of the 3D environment that falls within the current frame comprises dividing a 3D mesh in the one or more 3D meshes into a plurality of sub-meshes; and determining that all vertices of a sub-mesh in the plurality of sub-meshes fall within the current frame.

8. The method of any of clauses 1-7, wherein generating the one or more additional 3D meshes comprises dividing a 3D mesh in the one or more 3D meshes into a plurality of sub-meshes; and texturing a sub-mesh in the plurality of sub-meshes that falls within the current frame with one or more pixels in the current frame.

9. The method of any of clauses 1-8, wherein determining the at least a portion of the 3D environment that falls within the current frame comprises determining one or more portions of the one or more 3D meshes that lie within a view frustum associated with the current frame, and wherein generating the one or more additional 3D meshes comprises generating the one or more additional 3D meshes to include or exclude the one or more portions.

10. The method of any of clauses 1-9, wherein determining the at least a portion of the 3D environment that falls within the current frame comprises grouping faces in a 3D mesh into a first set of faces that are fully outside a view frustum associated with the current frame, a second set of faces that are fully inside the view frustum, and a third set of faces that intersect the view frustum; and dividing the third set of faces by one or more planes bounding the view frustum to generate a fourth set of faces that are fully outside the view frustum and a fifth set of faces that are fully inside the view frustum.

11. The method of any of clauses 1-10, wherein determining the at least a portion of the 3D environment that falls within the current frame comprises determining one or more faces in a 3D mesh that intersect a view frustum associated with the current frame; determining intersection points of the one or more faces with a plane representing a boundary of the view frustum; and forming one or more new faces using the intersection points and vertices of the one or more faces.

12. The method of any of clauses 1-11, wherein combining the one or more additional 3D meshes with the one or more 3D meshes comprises discarding one or more portions of the one or more 3D meshes that overlap with the one or more additional 3D meshes to trigger replacement of the one or more portions with the one or more additional 3D meshes in the 3D representation.

13. The method of any of clauses 1-12, wherein combining the one or more additional 3D meshes with the one or more 3D meshes comprises overlaying one or more untextured portions of the one or more 3D meshes with the one or more additional 3D meshes.

14. The method of any of clauses 1-13, wherein the host device comprises a mobile device and the depth sensor comprises a light detection and ranging (LIDAR) sensor.

15. In some implementations, a computing device comprises a memory that includes an application; and a processor that is coupled to the memory, and when executing the application, performs the steps of generating a 3D representation of a 3D environment that includes one or more 3D meshes, wherein the one or more 3D meshes comprise (i) a first set of vertices representing 3D points captured by a depth sensor on a host device of the 3D environment, (ii) a first set of faces formed from edges between pairs of vertices in the first set of vertices, and (iii) a first set of textures generated based on one or more previous frames captured by a image sensor on the host device of the 3D environment; determining at least a portion of the 3D environment that falls within a current frame captured by the image sensor; generating one or more additional 3D meshes representing the at least a portion of the 3D environment, wherein the one or more additional 3D meshes comprise (i) a second set of vertices representing additional 3D points captured by the depth sensor concurrently with capture of the current frame by the image sensor, (ii) a second set of faces formed from edges between pairs of vertices in the second set of vertices, and (iii) a second set of textures generated based on the current frame; and combining the one or more additional 3D meshes with the one or more 3D meshes into an update to the 3D representation of the 3D environment.

16. The computing device of clause 15, wherein the processor further performs the steps of generating a stream comprising the one or more additional 3D meshes; and transmitting the stream to a distributed messaging system for receipt by one or more remote devices.

17. The computing device of any of clauses 15-16, wherein determining the at least a portion of the 3D environment that falls within the current frame comprises at least one of determining that mesh in the one or more 3D meshes includes at least one vertex that falls within the current frame; and dividing the one or more 3D meshes along one or more boundaries of a view frustum associated with the current frame.

18. The computing device of any of clauses 15-17, wherein combining the one or more additional 3D meshes with the one or more 3D meshes comprises discarding one or more textured portions of the one or more 3D meshes that overlap with a first mesh in the one or more additional 3D meshes to trigger replacement of the one or more textured portions with the first mesh in the 3D representation; and overlaying one or more untextured portions of the one or more 3D meshes with a second mesh in the one or more additional 3D meshes.

19. In some implementations, a non-transitory computer readable medium stores instructions that, when executed by a processor, cause the processor to perform the steps of generating a 3D representation of the 3D environment that includes one or more 3D meshes, wherein the one or more 3D meshes comprise (i) a first set of vertices representing 3D points captured by a depth sensor on a host device of the 3D environment, (ii) a first set of faces formed from edges between pairs of vertices in the first set of vertices, and (iii) a first set of textures generated based on one or more previous frames captured by a image sensor on the host device of the 3D environment; determining at least a portion of the 3D environment that falls within a current frame captured by the image sensor; generating one or more additional 3D meshes representing the at least a portion of the 3D environment, wherein the one or more additional 3D meshes comprise (i) a second set of vertices representing additional 3D points captured by the depth sensor concurrently with capture of the current frame by the image sensor, (ii) a second set of faces formed from edges between pairs of vertices in the second set of vertices, and (iii) a second set of textures generated based on the current frame; and combining the one or more additional 3D meshes with the one or more 3D meshes into an update to the 3D representation of the 3D environment.

20. The non-transitory computer readable medium of clause 19, wherein the steps further comprise iteratively updating the one or more additional 3D meshes with additional vertices and faces associated with the 3D points captured by the depth sensor until a threshold associated with capture of the 3D environment is met;

and transmitting a stream comprising the one or more additional 3D meshes to a distributed messaging system for receipt by one or more remote devices.

Any and all combinations of any of the claim elements recited in any of the claims and/or any elements described in this application, in any fashion, fall within the contemplated scope of the present implementations and protection.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can include, or store a program for use by or in connection with an instruction execution system, apparatus, or device.

Aspects of the present disclosure are described above with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to implementations of the present disclosure, other and further implementations of the disclosure may be devised without departing from the basic scope thereof, and the scope thereof is determined by the claims that follow.

What is claimed is:

1. A method for scanning a three-dimensional (3D) environment, comprising:
    generating a 3D representation of the 3D environment that includes one or more 3D meshes, wherein the one or more 3D meshes comprise a first set of vertices representing 3D points captured of the 3D environment by a depth sensor on a host device;
    determining at least a portion of the 3D environment that falls within a current frame captured by an image sensor;
    generating one or more additional 3D meshes representing the at least a portion of the 3D environment, wherein the one or more additional 3D meshes comprise a second set of vertices representing additional 3D points captured by the depth sensor concurrently with the current frame being captured by the image sensor; and
    combining the one or more additional 3D meshes with the one or more 3D meshes into an update to the 3D representation of the 3D environment.

2. The method of claim 1, wherein the current frame is captured by the image sensor concurrently with or within a threshold time period of generating the one or more additional 3D meshes.

3. The method of claim 1, further comprising transmitting the one or more additional 3D meshes to one or more remote devices that are executing an extended reality application that renders the 3D representation on the one or more remote devices.

4. The method of claim 1, wherein generating the one or more additional 3D meshes comprises iteratively updating the one or more additional 3D meshes with at least one of additional vertices or additional faces associated with the 3D points captured by the depth sensor until a threshold associated with capture of the 3D environment is met.

5. The method of claim 1, wherein determining the at least a portion of the 3D environment that falls within the current frame comprises projecting one or more vertices of the one or more 3D meshes onto one or more pixel locations included in the current frame.

6. The method of claim 1, wherein determining the at least a portion of the 3D environment that falls within the current frame comprises:
    dividing a 3D mesh included in the one or more 3D meshes into a plurality of sub-meshes; and
    determining that a sub-mesh included in the plurality of sub-meshes includes at least one vertex that falls within the current frame.

7. The method of claim 1, wherein determining the at least a portion of the 3D environment that falls within the current frame comprises:
    dividing a 3D mesh included in the one or more 3D meshes into a plurality of sub-meshes; and
    determining that all vertices of a sub-mesh included in the plurality of sub-meshes fall within the current frame.

8. The method of claim 1, wherein determining the at least a portion of the 3D environment that falls within the current frame comprises determining one or more portions of the one or more 3D meshes that lie within a view frustum associated with the current frame, and wherein generating the one or more additional 3D meshes comprises generating the one or more additional 3D meshes to include or exclude the one or more portions.

9. The method of claim 1, wherein determining the at least a portion of the 3D environment that falls within the current frame comprises:
grouping faces in a 3D mesh included in the one or more 3D meshes into a first set of faces that are fully outside a view frustum associated with the current frame, a second set of faces that are fully inside the view frustum, and a third set of faces that intersect the view frustum; and
dividing the third set of faces by one or more planes bounding the view frustum to generate a fourth set of faces that are fully outside the view frustum and a fifth set of faces that are fully inside the view frustum.

10. The method of claim 1, wherein determining the at least a portion of the 3D environment that falls within the current frame comprises:
determining one or more faces in a 3D mesh included in the one or more 3D meshes that intersect a view frustum associated with the current frame;
determining intersection points of the one or more faces with a plane representing a boundary of the view frustum; and
forming one or more new faces using the intersection points and vertices of the one or more faces.

11. A non-transitory computer readable medium storing instructions that, when executed by a processor, cause the processor to perform the steps of:
generating a 3D representation of a 3D environment that includes one or more 3D meshes, wherein the one or more 3D meshes comprise a first set of vertices representing 3D points captured of the 3D environment by a depth sensor on a host device;
determining at least a portion of the 3D environment that falls within a current frame captured by an image sensor;
generating one or more additional 3D meshes representing the at least a portion of the 3D environment, wherein the one or more additional 3D meshes comprise a second set of vertices representing additional 3D points captured by the depth sensor concurrently with the current frame being captured by the image sensor; and
combining the one or more additional 3D meshes with the one or more 3D meshes into an update to the 3D representation of the 3D environment.

12. The non-transitory computer readable medium of claim 11, wherein the current frame is captured by the image sensor concurrently with or within a threshold time period of generating the one or more additional 3D meshes.

13. The non-transitory computer readable medium of claim 11, wherein the steps further comprise transmitting the one or more additional 3D meshes to one or more remote devices that are executing an extended reality application that renders the 3D representation on the one or more remote devices.

14. The non-transitory computer readable medium of claim 11, wherein generating the one or more additional 3D meshes comprises iteratively updating the one or more additional 3D meshes with at least one of additional vertices or additional faces associated with the 3D points captured by the depth sensor until a threshold associated with capture of the 3D environment is met.

15. The non-transitory computer readable medium of claim 11, wherein determining the at least a portion of the 3D environment that falls within the current frame comprises projecting one or more vertices of the one or more 3D meshes onto one or more pixel locations included in the current frame.

16. A computing device, comprising:
a memory that includes an application; and
a processor that is coupled to the memory, and when executing the application, performs the steps of:
generating a 3D representation of a 3D environment that includes one or more 3D meshes, wherein the one or more 3D meshes comprise a first set of vertices representing 3D points captured of the 3D environment by a depth sensor on a host device;
determining at least a portion of the 3D environment that falls within a current frame captured by an image sensor;
generating one or more additional 3D meshes representing the at least a portion of the 3D environment, wherein the one or more additional 3D meshes comprise a second set of vertices representing additional 3D points captured by the depth sensor concurrently with the current frame being captured by the image sensor; and
combining the one or more additional 3D meshes with the one or more 3D meshes into an update to the 3D representation of the 3D environment.

17. The computing device of claim 16, wherein the current frame is captured by the image sensor concurrently with or within a threshold time period of generating the one or more additional 3D meshes.

18. The computing device of claim 16, wherein the processor further performs the step of transmitting the one or more additional 3D meshes to one or more remote devices that are executing an extended reality application that renders the 3D representation on the one or more remote devices.

19. The computing device of claim 16, wherein generating the one or more additional 3D meshes comprises iteratively updating the one or more additional 3D meshes with at least one of additional vertices or additional faces associated with the 3D points captured by the depth sensor until a threshold associated with capture of the 3D environment is met.

20. The computing device of claim 16, wherein determining the at least a portion of the 3D environment that falls within the current frame comprises projecting one or more vertices of the one or more 3D meshes onto one or more pixel locations included in the current frame.

* * * * *